US00RE37784E

(19) United States
(12) Reissued Patent
Fitzgibbon et al.

(10) Patent Number: US RE37,784 E
(45) Date of Reissued Patent: Jul. 9, 2002

(54) BARRIER OPERATOR HAVING SYSTEM FOR DETECTING ATTEMPTED FORCED ENTRY

(75) Inventors: James J. Fitzgibbon, Batavia, IL (US); John V. Moravec, Egg Harbor, WI (US)

(73) Assignee: The Chamberlain Group, Inc., Elmhurst, IL (US)

(21) Appl. No.: 09/614,222

(22) Filed: Jul. 11, 2000

Related U.S. Patent Documents

Reissue of:
(64) Patent No.: 5,780,987
Issued: Jul. 14, 1998
Appl. No.: 08/888,836
Filed: Jul. 7, 1997

U.S. Applications:

(63) Continuation of application No. 08/443,178, filed on May 17, 1995, now abandoned.

(51) Int. Cl.[7] ..... E05F 15/10
(52) U.S. Cl. ..... 318/466; 318/16; 318/286; 318/468; 318/480; 318/563; 318/565
(58) Field of Search ..... 318/16, 286, 466, 318/467, 468, 469, 480, 452, 563, 565, 566, 264, 265, 266; 49/25, 26

(56) References Cited

U.S. PATENT DOCUMENTS 4,021,796 A * 5/1977 Fawcett, Jr. et al.
4,035,702 A * 7/1977 Pettersen et al. ..... 318/285
4,048,630 A * 9/1977 Deming et al.
4,247,806 A * 1/1981 Mercier ..... 318/267
4,274,227 A * 6/1981 Toenjes ..... 49/28
4,328,540 A * 5/1982 Matsuoka et al. ..... 318/266 X
4,338,553 A * 7/1982 Scott, Jr. ..... 318/266
4,357,564 A * 11/1982 Deming et al. ..... 318/282
4,360,801 A * 11/1982 Duhame ..... 318/16
4,383,206 A * 5/1983 Matsuoka et al. ..... 318/445
4,386,398 A * 5/1983 Matsuoka et al. ..... 318/266 X
4,404,558 A * 9/1983 Yen ..... 318/466 X
4,581,606 A * 4/1986 Mallory
4,638,292 A * 1/1987 Mochida et al.
4,638,433 A * 1/1987 Schindler ..... 364/400
4,750,197 A * 6/1988 Denekamp et al.
4,847,542 A * 7/1989 Clark et al. ..... 318/560
4,916,860 A 4/1990 Richmond et al. ..... 49/28
4,939,434 A * 7/1990 Elson ..... 318/285
5,076,012 A 12/1991 Richmond et al. ..... 49/28
RE33,873 E * 4/1992 Romano ..... 318/466 X
5,136,809 A 8/1992 Richmond et al. ..... 49/28
5,230,179 A 7/1993 Richmond et al. ..... 49/28
5,247,232 A * 9/1993 Lin ..... 318/468
5,285,136 A * 2/1994 Duhame ..... 318/266
5,444,440 A * 8/1995 Heydendahl ..... 340/825.32
5,510,686 A * 4/1996 Collier ..... 318/446
5,684,372 A 11/1997 Fitzgibbon et al. ..... 318/280
5,841,253 A 11/1998 Fitzgibbon et al. ..... 318/280
5,998,950 A 12/1999 Fitzgibbon et al. ..... 318/280

* cited by examiner

*Primary Examiner*—Bentsu Ro
(74) *Attorney, Agent, or Firm*—Fitch, Even, Tabin & Flannery

(57) ABSTRACT

A movable barrier or garage door operator has a barrier drive for moving the movable barrier or garage door between open and closed positions. Motion of the barrier is detected by a tachometer connected to the barrier drive or by upper and lower barrier travel limit switches. A test is made to determine if the barrier has been commanded to be in a closed state and to determine if a preselected time interval has elapsed following closure of the barrier. When both of those conditions are present and the door is moved upward without authorization an alarm signal is generated and can signal the barrier drive to apply a closing force. The timer prevents the barrier from being closed on a person or obstacle during normal operation and prevents injury. An obstacle detector also prevents unwanted closure on an obstacle.

41 Claims, 14 Drawing Sheets

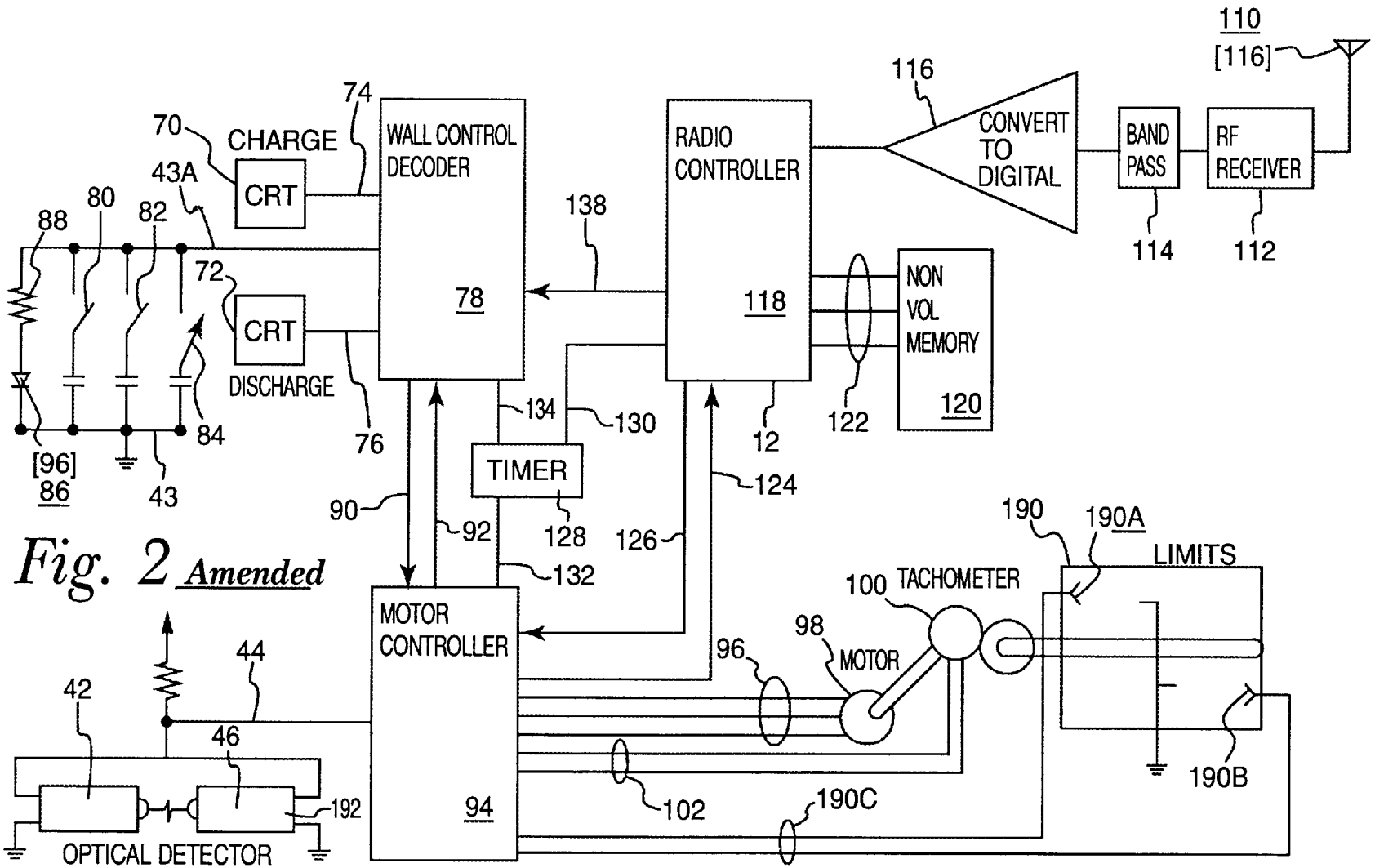
*Fig. 2* *Amended*

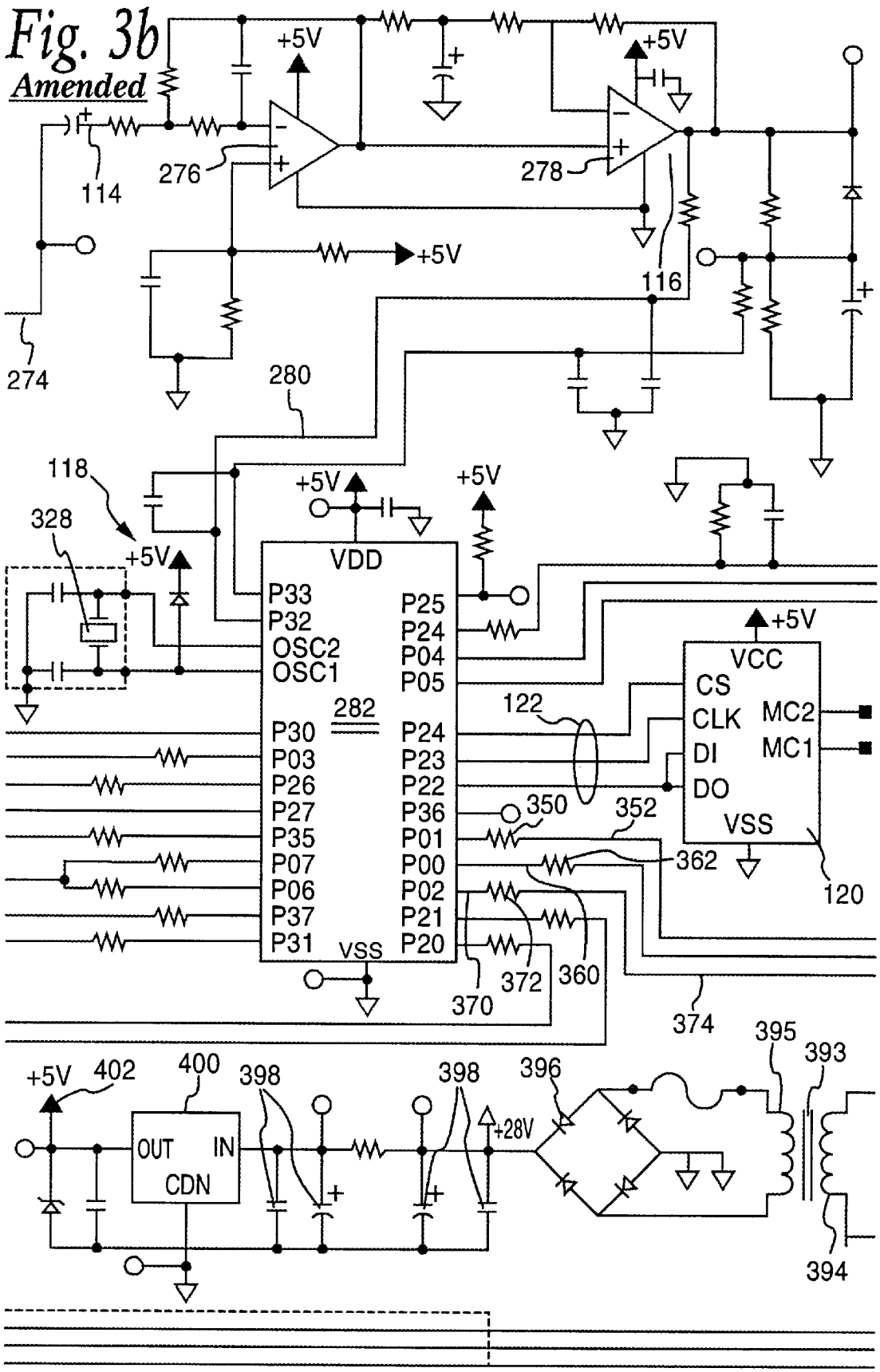
Fig. 3b
Amended
+5V
+5V
+5V
114
276
278
116
274
280
118
328
+5V
+5V
+5V
VDD
P33
P32
OSC2
OSC1
P30
P03
P26
P27
P35
P07
P06
P37
P31
VSS
P25
P24
P04
P05
P24
P23
P22
P36
P01
P00
P02
P21
P20
282
122
350
352
362
360
372
370
374
+5V
VCC
CS
CLK
DI
DO
MC2
MC1
VSS
120
+5V
402
400
OUT
IN
CDN
398
398
+28V
396
395
393
394

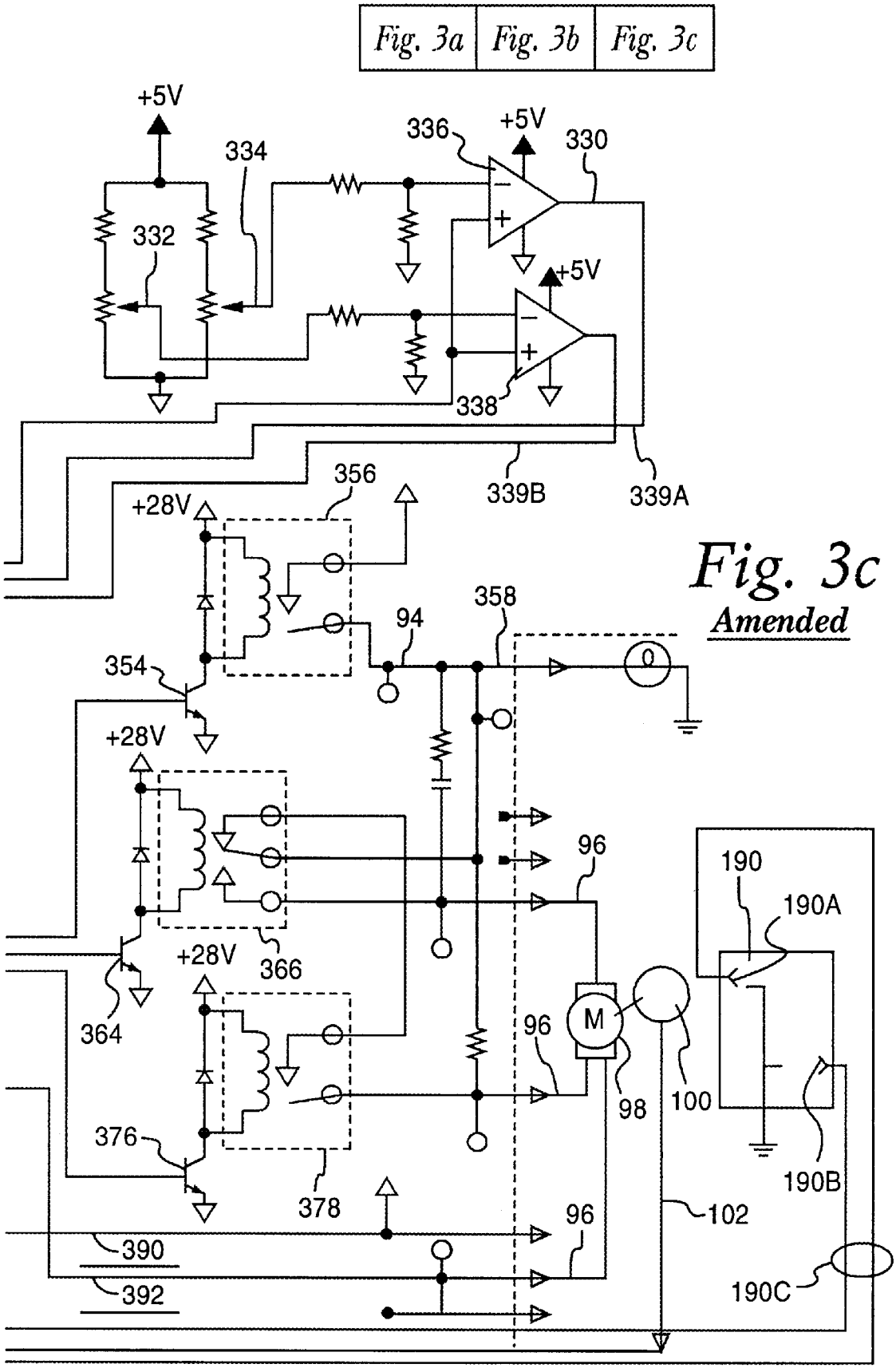
Fig. 3c
Amended

BARRIER OPERATOR HAVING SYSTEM FOR DETECTING ATTEMPTED FORCED ENTRY

Matter enclosed in heavy brackets [ ] appears in the original patent but forms no part of this reissue specification; matter printed in italics indicates the additions made by reissue.

This application is a continuation of application Ser. No. 08/443,178 filed May 17, 1995, now abandoned.

BACKGROUND OF THE INVENTION

The invention relates, in general, to barrier operators and, in particular to a garage door operator including a system for detecting when an attempt is made to force open a closed garage door.

Several garage door operator systems are available on the market for maintaining a garage door either in a closed or open position. It is clear that the systems should be relatively easy to use and should be able to open the door relatively rapidly to allow quick and easy access to the garage. In addition, many systems are provided which include detectors, pressure detectors and the like that sense when the garage door is being brought down and the bottom edge of the door comes in contact with an obstacle prior to the door reaching the fully closed position. These systems are important because they prevent the garage door from closing on people, pets or small objects and, therefore, prevent personal injury and property damage. One of the drawbacks of such systems, however, is that for some such systems, when the door has been closed, if a lifting force is applied to the door, or instance by an unwanted intruder grabbing the handle of the door and attempting to raise it by jacking the door or the like, some systems through a force measurement routine, automatically cause the door to be opened, in order to prevent what the garage door operator senses might be potential harm. Of course, if the person operating the door is attempting to break and enter the garage for nefarious purposes and it is important that while the system prevents harm, the system also be provided such that the door cannot be forced open if the operator does not want it to be and if no persons or property are in danger.

A system available from the Stanley Company provides a garage door operator having upper travel limit and lower travel limit switches associated therewith. The switches may be set or moved so that the limits of travel may be changed. In the Stanley system, for instance, if the door has reached a nominal closed position and the operator has its down limit switch position changed, the door will actually dynamically track changes in the switch position and open or close according to switch commands.

Mechanical systems may be available that in effect, jam the door closed; however, once these systems are placed in effect, if a person not knowing that the door is down and effectively mechanically locked attempts to open the door the garage door operator then attempts to lift the door against the locking mechanism and the garage door operator may be inadvertently damaged thereby or, at the very least, not open the door because it is locked.

What is needed then is a system which provides a sensing modality for a garage door or other barrier operator which, while maintaining all safety features to prevent personal injury or property damage due to unwanted closing of the door, nevertheless senses when an intruder attempts to open the door and prevents the door from being opened by a positive drive force provided by the garage door operator motor.

SUMMARY OF THE INVENTION

The invention relates, in general, to a barrier system operator and, in particular, to a garage door operator which while having all safety features for preventing personal injury and property damage due to inadvertent closing of the garage door, nevertheless provides a positively actuated door closure system which prevents forcing the door once it has closed without having detected any objects underneath it. The system includes a barrier drive including an electric motor which may be connected to a belt, chain or screw drive. Means are provided for detecting motion of the movable barrier. These means may include a motor tachometer, upper and lower limit switches and the like. Means are also provided for detecting when a barrier command signal has been given to the barrier drive so that when a door has been commanded by a radio frequency control, the keypad control, indoor wired control or the like to open, the door may be automatically opened. The system also includes a storage device for storing the commanded state of the barrier drive which may be a microcontroller or a microprocessor in combination with a memory or some other integrated circuit device capable of storing digital or analog information. The commanded state is stored and is then compared in a comparator means with the position indicated by the barrier detection. In the event that the comparison of the barrier state signal and the barrier position signal indicates that the system already has been in a lowered position, usually for given time intervals, such as 27 seconds and attempt is made to raise the door causing unwanted motion of the door when there has been no up command given, an alarm signal is generated which may be passed through electronic and electromechanical logic to the door motor causing the door motor to provide thrust to the door to hold the door in the closed position.

In the alternative, the system may also provide a signal to operate a visual or audio alarm or to call over a telephonic or other wired system to a police department or to a security service to indicate that the system is being broken into.

It is a principal object of the present invention to provide a barrier operator for opening and closing a movable barrier which includes an electronic system for detecting when forced entry is being attempted on the carrier and for preventing the barrier from being opened.

Other objects of this invention will become obvious to one of ordinary skill in the art upon a perusal of the following specification and claims in light of the accompanying drawings.

BRIEF DESCRIPTION OF THE DRAWINGS

FIG. 2 is a block diagram of a portion of the head unit and associated controls of the apparatus shown in FIG. 1;

[FIG. 3 is] *FIGS. 3A–3C are* a schematic diagram showing details of the circuit shown in FIG. 2;

DETAILED DESCRIPTION OF THE PREFERRED EMBODIMENT

Figure 1:
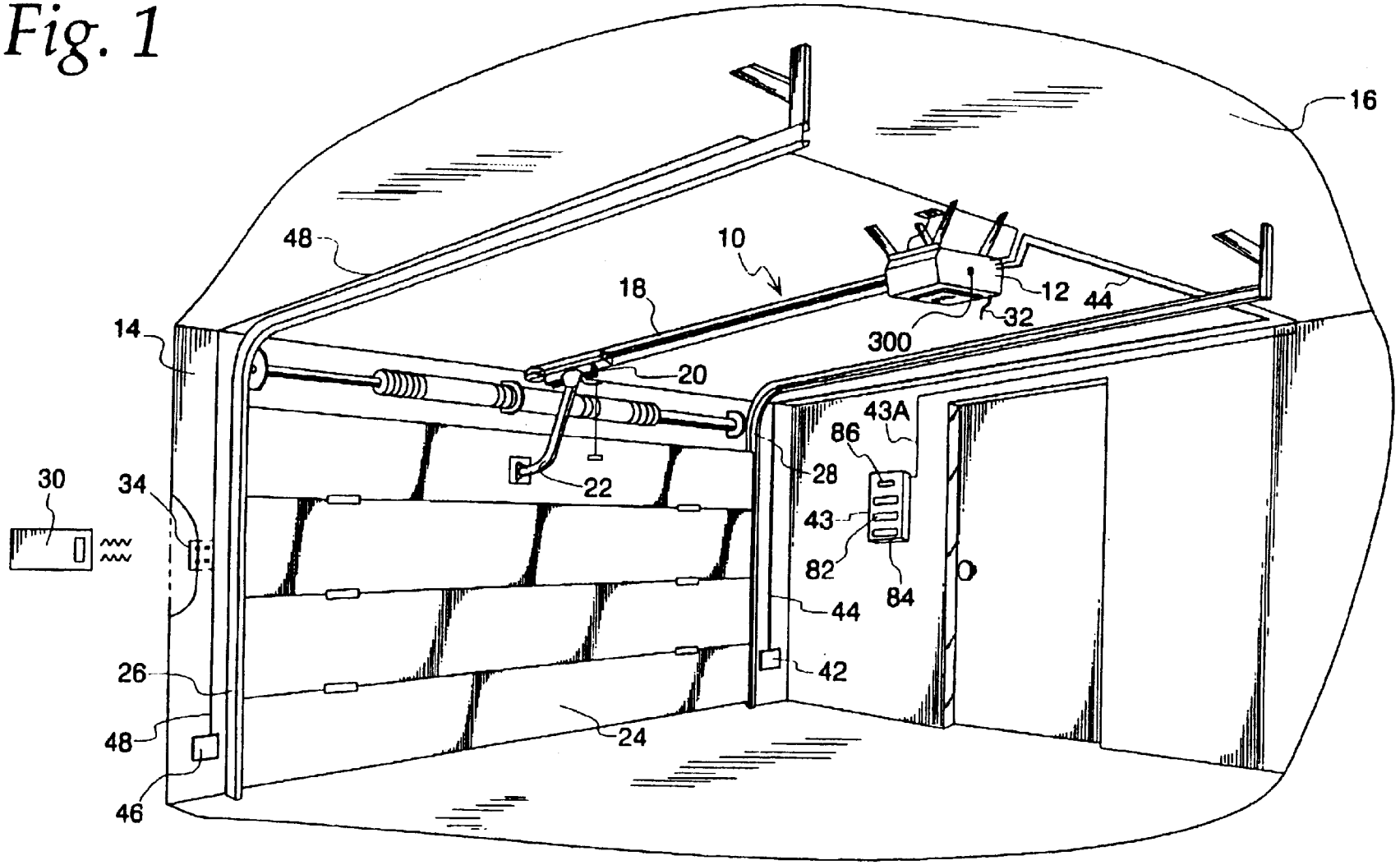
FIG. 1 is a perspective view of an apparatus comprising a garage door operator and embodying the present invention.

Referring now to the drawings and especially to FIG. 1, more specifically a movable barrier door operator or garage door operator is generally shown therein and includes a head unit 12 mounted within a garage 14. More specifically, the head unit 12 is mounted to the ceiling of the garage 14 and includes a rail 18 extending therefrom with a releasable trolley 20 attached having an arm 22 extending to a multiple paneled garage door 24 positioned for movement along a pair of door rails 26 and 28. The system includes a hand-held transmitter unit 30 adapted to send signals to an antenna 32 positioned on the head unit 12 and coupled to a receiver as will appear hereinafter. An external control pad 34 is positioned on the outside of the garage having a plurality of buttons thereon and disposed to communicate via radio frequency transmission with the antenna 32 of the head unit 12. An optical emitter 42 is connected via a power and signal line 44 to the head unit. An optical detector 46 is connected via a wire 48 to the head unit 12.

The head unit 12 has a wired wall control panel 43 connected to it via a line or wire 43*a*, as is shown in FIG. 2. More specifically, the wall control panel 43 is connected to a charging circuit 70 and a discharging circuit 72 coupled via respective lines 74 and 76 to a wall control decoder 78. The wall control decoder 78 decodes closures of a plurality of switches 80, 82 and 84 in the wall circuit. The wall control panel also includes a light emitting diode 86 connected by a resistor 88 to the line 43*a* and to ground. Switch 80 is the command switch, switch 82 is the work light switch and switch 84 is the vacation switch. Switch closures are decoded by the wall decoder 78 which sends signals along lines 90 and 92 to a motor control 94 coupled via motor control lines 96 to an electric motor 98 positioned within the head unit. A tachometer 100 receives a mechanical feed from the motor 98 and provides feedback signals on lines 102 to the motor controller.

Figure 3A:
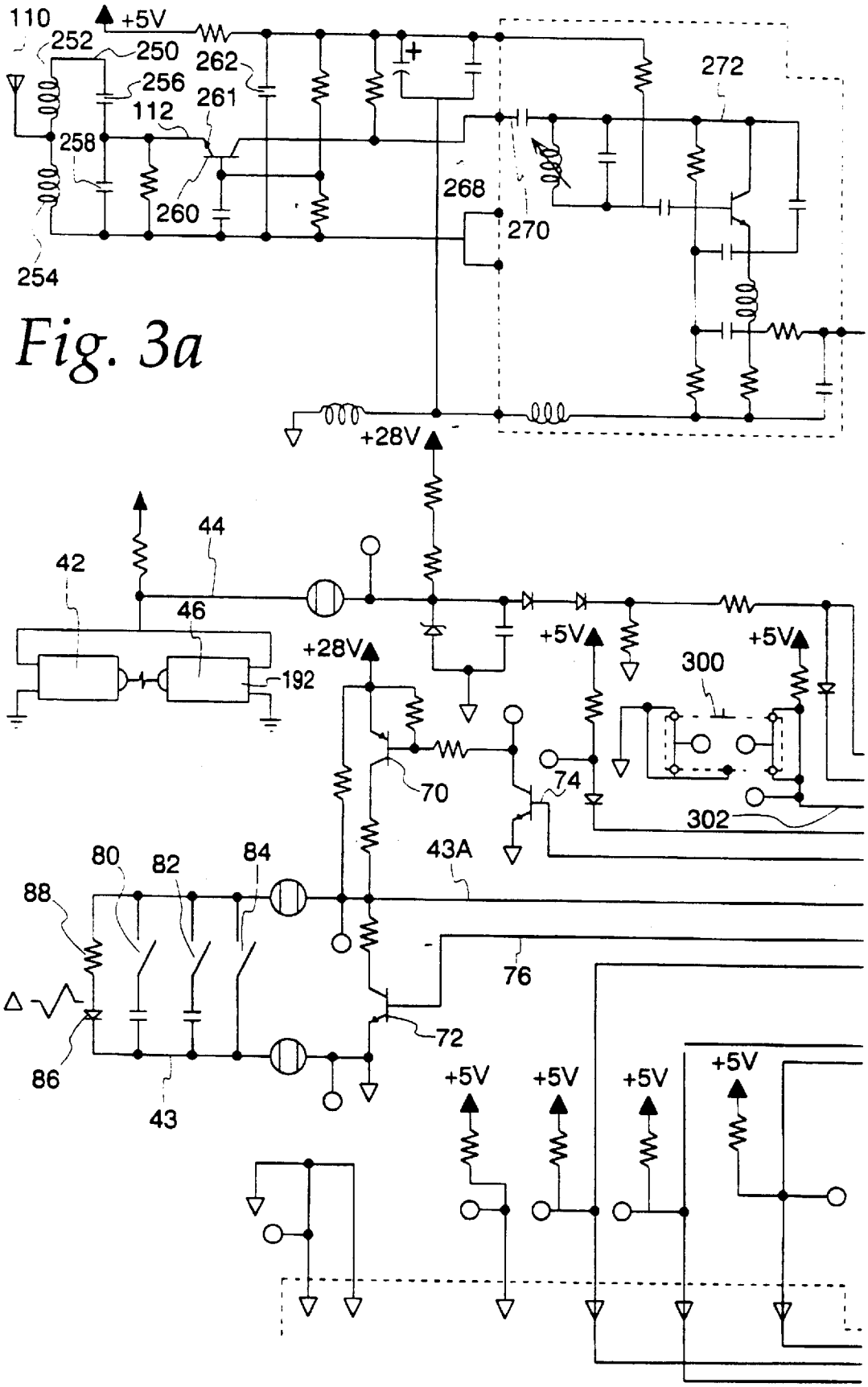

The receiver unit also includes an antenna 110 coupled to receive radio frequency signals either from the fixed RF keypad 34 or the hand-held transmitter 30. The RF signals are fed to a radio frequency receiver 112 where they are buffer amplified and supplied to a bandpass circuit 114 which outputs low frequency signals in the range of 1 Hz to 1 kHz. The low frequency signals are fed to an analog-to-digital converter 116 that sends digitized code signals to a radio controller 118. The radio controller 118 is also connected to receive signals from a non-volatile memory 120 over a non-volatile memory bus 122 and to communicate via lines 124 and 126 with the motor controller 94. A timer 128 is also provided, coupled via lines 130 with the radio controller, a line 132 with the motor controller and a line 134 with the wall control decoder 78. A barrier travel limit detection device 190 includes an up limit detector 190*a* and a down limit detector 190*b* that sends signals to pins P20 and P21 of the microcontroller 282 *(as depicted in FIG. 3b)*. The obstacle detector comprising the emitter 42 and detector 46 send signals to pins P03 and P30 of the microcontroller 282 *(as depicted in FIG. 3b)* indicating when an obstacle is blocking the path of the door.

Referring now to FIG. 3, the system shown in FIG. 3 is shown therein with the antenna 110 coupled to a reactive divider network 250, comprised of a pair of series connected inductances 252 and 254 and capacitors 256 and 258, which supplies an RF signal to the buffer amplifier 112 having an NPN transistor 260 connected to receive the RF signal at its emitter 261. The NPN transistor 260 has a capacitor 262 connected to it for power supply isolation. The buffer amplifier 112 provides a buffered radio frequency output signal on a lead 268. The buffered RF signal is fed to an input 270 which forms part of a super-regenerative receiver 272 having an output at a line 274 coupled to the bandpass filter 114 which provides output to a comparator 278. The bandpass filter 114 and analog-to-digital converter provide a digital level output signal at a lead 280 which is supplied to an input pin P32 of an 8-bit Zilog microcontroller 282.

The microcontroller 282 may have its mode of operation controlled by a programming or learning switch 300 positioned on the outside of the head unit 12 and coupled via a line 302 to the P26 pin of the microcontroller 282. The wired control panel 43 is connected via the lead 43*a* to input pins P06 and P07 The microcontroller 282 has a 4 MHz crystal 328 connected to it to provide clock signals. A force sensor 330 includes a bridge circuit having a potentiometer 332 for setting the up force and a potentiometer 334 for setting the down force, respectively connected to inverting terminals of a first comparator 336 and a second comparator 338. The comparator 336 sends an up force signal over a line 339*a*. The comparator 338 sends a down force signal over the line 339*b*, respectively to pins P04 and P05 of the 8-bit microcontroller 282. Although details of the operation of the microcontroller in conjunction with other portions of the circuit will be discussed hereinafter, it should be appreciated that the P01 pin of the microcontroller is connected via a resistor 350 to a line 352 which is coupled to an NPN transistor 354 that controls a light relay 356 which may supply current via a lead 358 to a fight in the head unit or the like. Similarly, the pin P000 feeds an output signal on a line 360 to a resistor 362 which biases a base of an NPN transistor 364 to cause the transistor 364 to conduct, drawing current through the coil of the relay an up relay 366 causing an up motor command to be sent over a line 90 to the motor 98. Finally, the P02 pin sends a signal through a line 370 to a resistor 372 via a line 374 to the base of an NPN transistor 376 connected to control current through a coil of a down control relay 378 which is coupled by one of the leads to the motor 98 to control motion of the motor 98.

Electric power is received on a hot AC line 390 and a neutral line AC line 392 which are coupled to a transformer 393 at its primary winding 394. The AC is stepped down at a secondary winding 395 and is full wave rectified by a full wave rectifier 3%. It may be appreciated that, in the alternative, a half wave rectifier may also be used.

A plurality of filter capacitors 398 receive the full wave rectified fluctuating voltage and remove some transients from the voltage supplying a voltage with reduced fluctuation to an input of a voltage regulator 400. The voltage regulator 400 produces a 5-volt output signal available at a lead 402 for use in other portions of the circuit.

Figure 4:
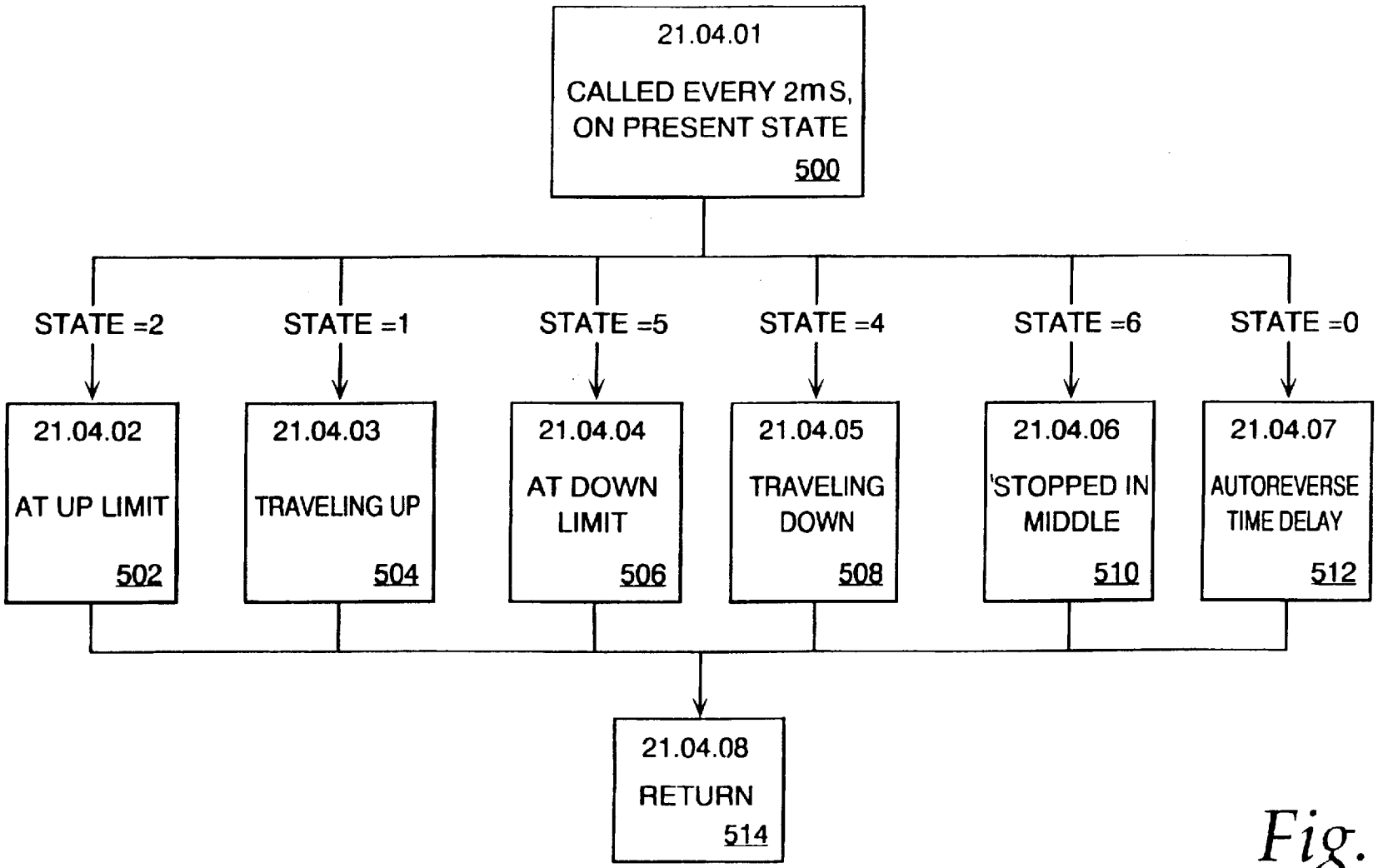
FIG. 4 is a flow chart of a top level flow diagram for the apparatus embodying the present invention.

Referring now to FIG. 4, a top level routine is shown therein which is entered every two milliseconds upon at timing interrupt in a step 500. The routine then enters a variety of other routines depending upon the value of a state number. When the state number is 2 an upper limit routine is entered in a step 502. If the state number is 1, a traveling up routine is entered in a state 504. If the state is 5, a down limit routine is entered in a step 506. If the state is 4, a traveling down routine is entered in a step 508. If the state is 6, a barrier halt or stopped in middle routine is entered in a step 510. If the state is 0, an auto-reverse time delay routine is entered in a step 512. When any of the aforementioned routines 502 through 512 are exited, a return step 514 is entered and other portions of code not pertinent to this invention are executed.

Figure 5:
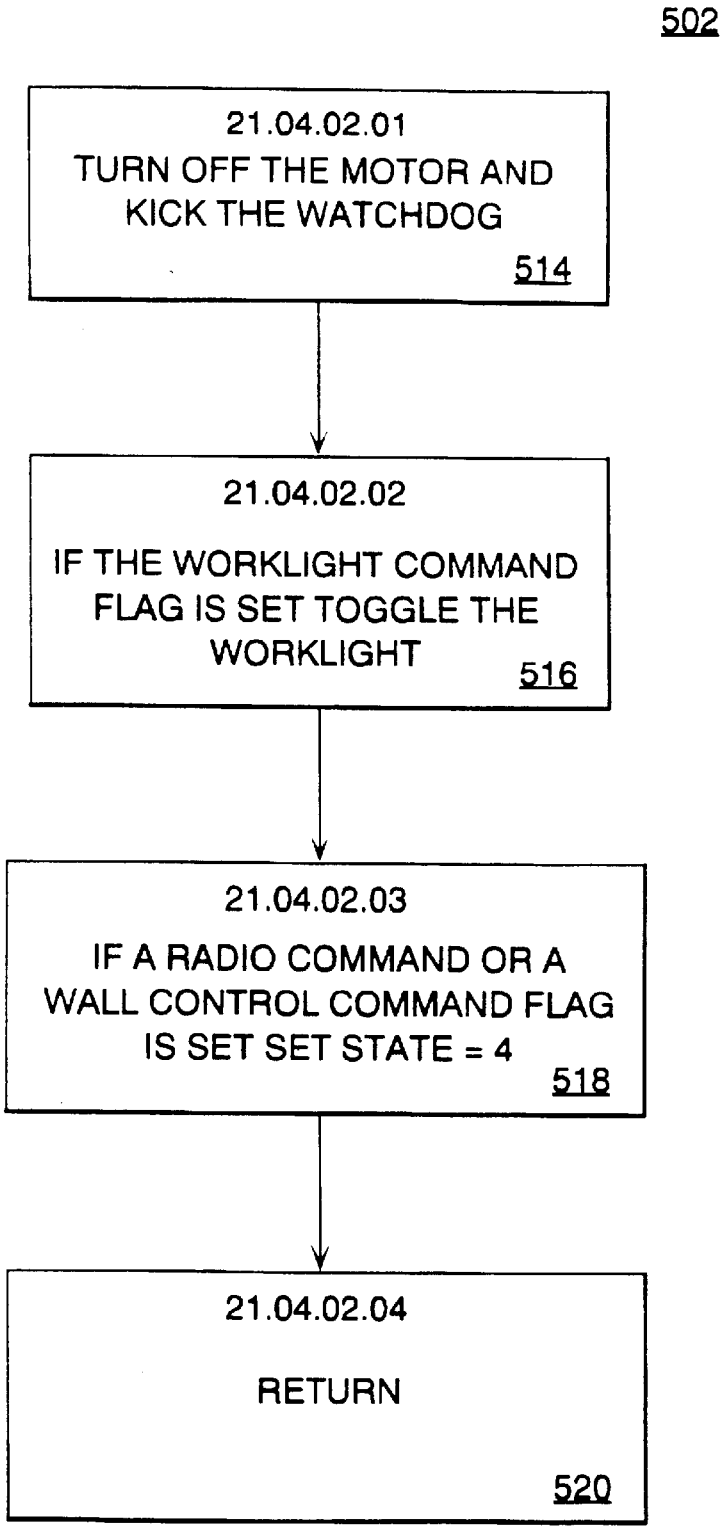
FIG. 5 is a flow diagram of an upper limit routine.

In the event that the state equals 2, the routine 502 is entered as may best be seen in FIG. 5 wherein the upper limit switch has indicated that the door has reached the upper end of its authorized travel, the motor is switched off and a watchdog timer is started in a step 514. The work light command flag is set in step 516 to toggle the work light on. In a step 518, a radio command or wall control command flag is tested for and, if set, the state is set to 4. In a step 520, the routine is exited and return is switched to the step 514. In the event that the state has been set equal to 4, in step 518 at the next 2 millisecond interval, control is transferred to the routine 508.

Figure 6A:
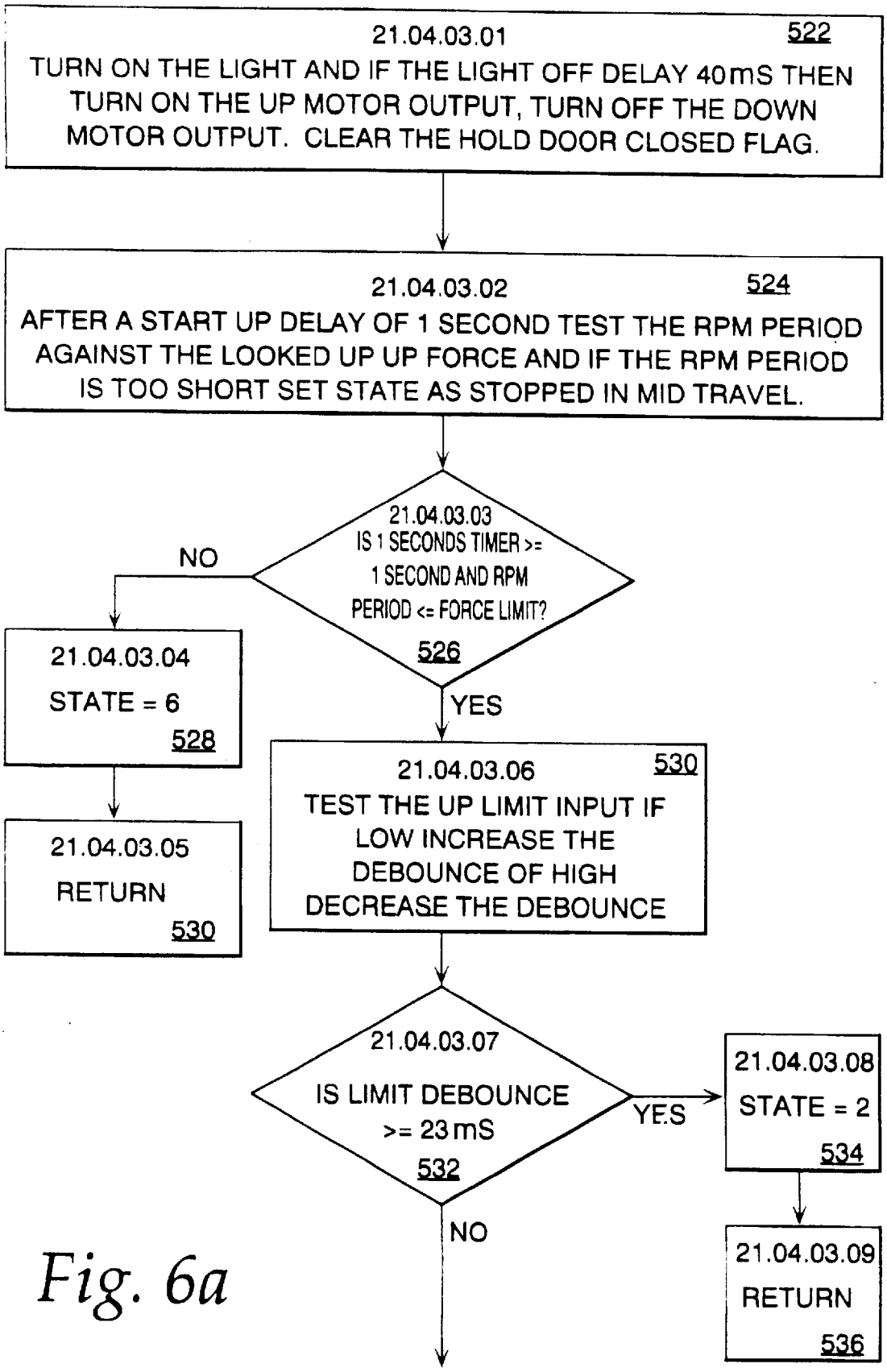
FIGS. 6A and 6B are a flow diagram controlling travel upward.
Figure 6B:
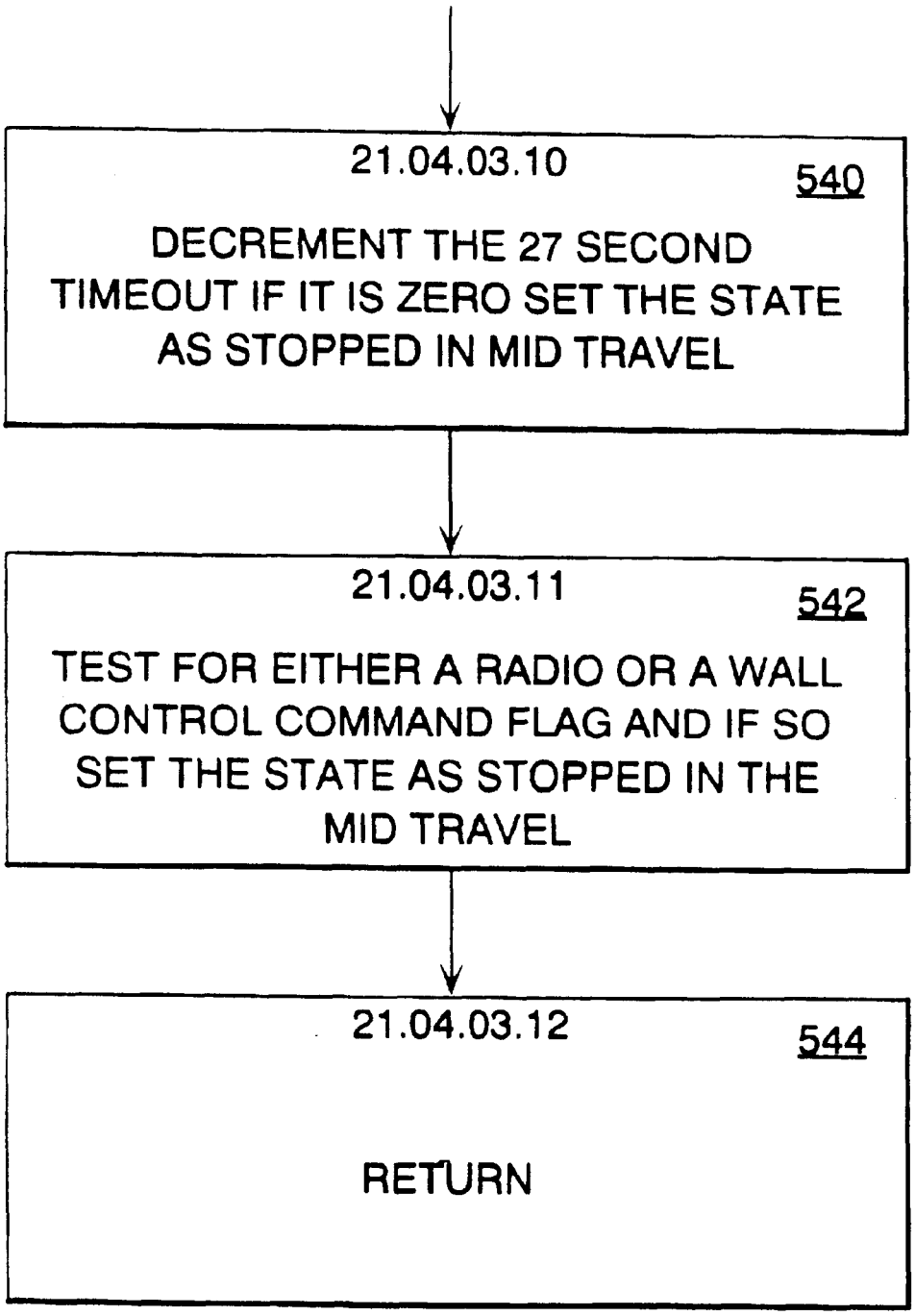

In the event that the state has been set equal to 1, control is transferred to a barrier traveling up or a barrier opening routine shown in FIGS. 6A and 6B. In a step 522, the work light is turned on and in the event that the light was off, a delay of 40 milliseconds is then provided to turn on the up motor output, the down motor output is turned off and the hold door closed flag is cleared. In a step 524, after a start up delay of 1 second the rpm period of the tachometer is tested against the look up force and if the rpm period is too brief, a state is set to indicate that the door has stopped in mid travel. In a step 526, a test is made to determine whether the one second timer has exceeded one second and whether the rpm period is below the set force limit indicating that the door has been halted in an unwanted manner. If it is not, control is transferred to a step 528 wherein the state variable is set to 6, following which the routine is exited in a step 530. In the event that the decision in step 526 is positive, the up limit input is tested. If the voltage is low, it is increased. If it is high, the debounce is decreased. Control is then transferred to a test step 532 to test whether the limit debounce is greater than 24 milliseconds. If it is, the state is set equal to 2 in a step 534 and the routine is exited in a step 536. If the limit debounce is less than 24 milliseconds, control is transferred to a step 540 where a 27 second time out is decremented and tested for. If the time out is zero, the state is set as indicating that the door has stopped in mid travel. A step 542 is executed to test for either a radio or wall control command flag having been set and, if so, the state is set as stop in mid travel. The routine is then executed in a step 544.

Figure 7:
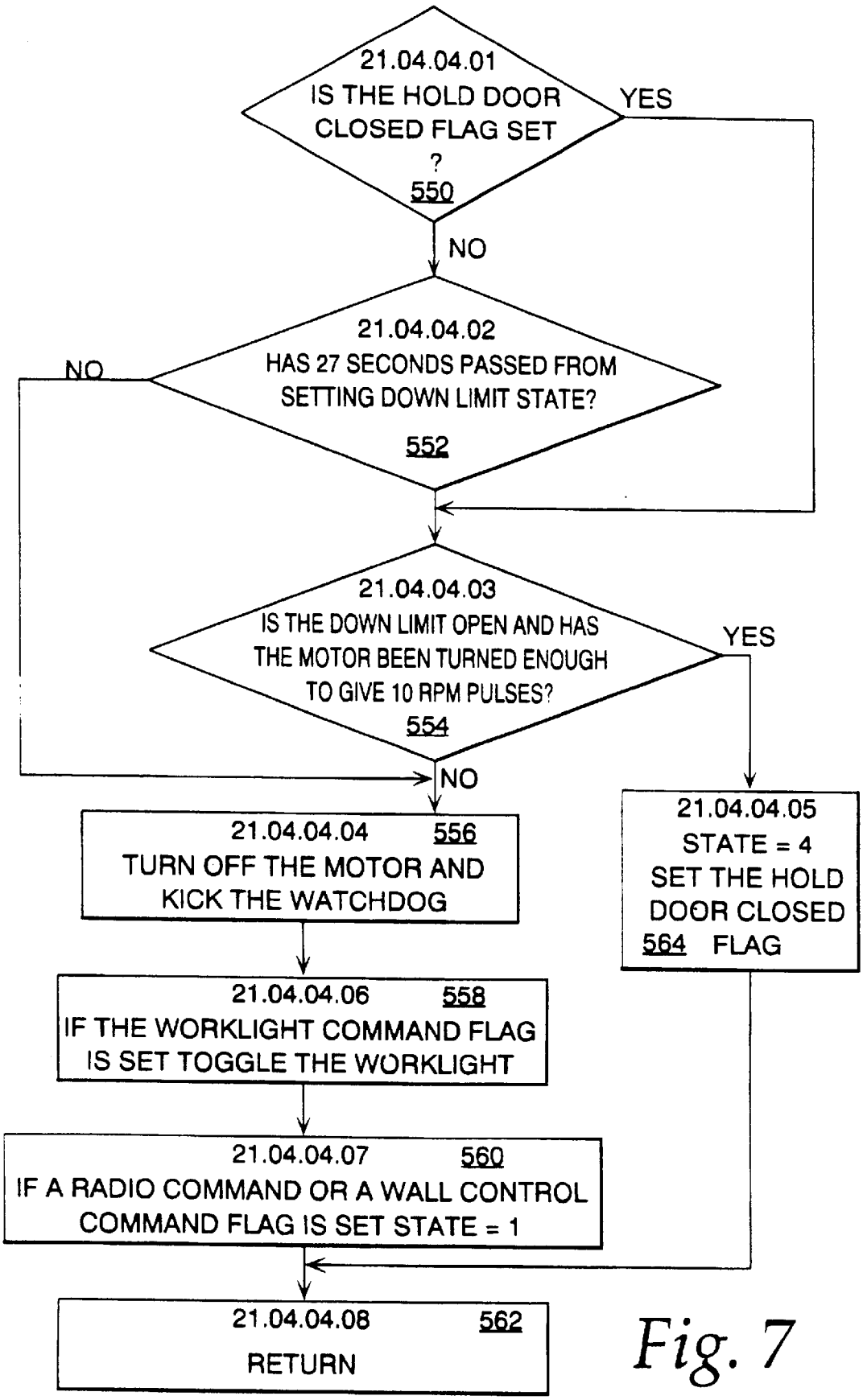
FIG. 7 is a flow diagram of a down limit routine.

In the event that the state has been set equal to 5, a routine 506 to handle down limits, as shown in FIG. 7, is entered. In a step 550, a hold door closed flag is tested to determine whether it is set or not. If it is not set, control is transferred to a step 552 to determine whether the 27 seconds timer has timed out following the down limit having been set, indicating that the door has safely closed and did not contact an obstruction or obstacle. In the event that the hold door closed flag has been set, as tested for in step 550, control is transferred to a step 554 testing whether the down limit indicates the door is open and whether the motor has been given enough current or turned on long enough to provide 10 rpm pulses. In the event that the 27 second clock has not been timed out as indicated by step 552, control is transferred to a step 556, switching the motor off, and starting a watchdog timer. Control is then transferred to a step 558 to determine if the work light command flag has been set and, if it has, the work light is toggled. Control is then transferred to a step 560, testing for whether there is a radio command or wall control command flag. If so, the state is set equal to 1 and the routine is exited in a return step 562. In the event that the down limit does not indicate that the door is open and the motor has been turned enough to give 10 rpm pulses, control is transferred to a step 564 setting the state equal to 4 and setting the hold door closed flag. The state equal 4 indicates that the door is to be traveling down, thereby causing the barrier to close after the 27 second limit has timed out.

Figure 8A:
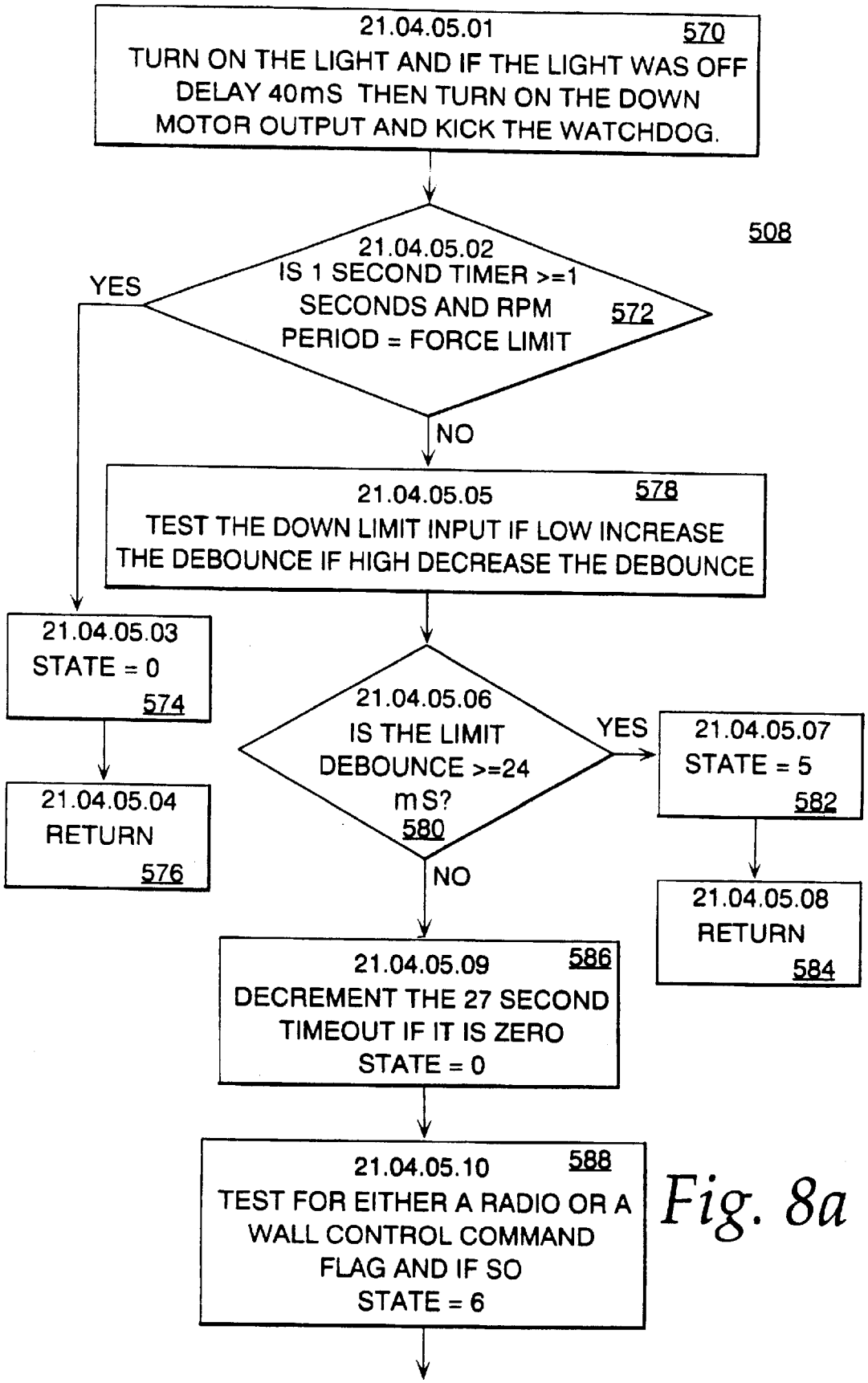
FIGS. 8A and 8B are a flow chart of a downward or closing movement routine.
Figure 8B:
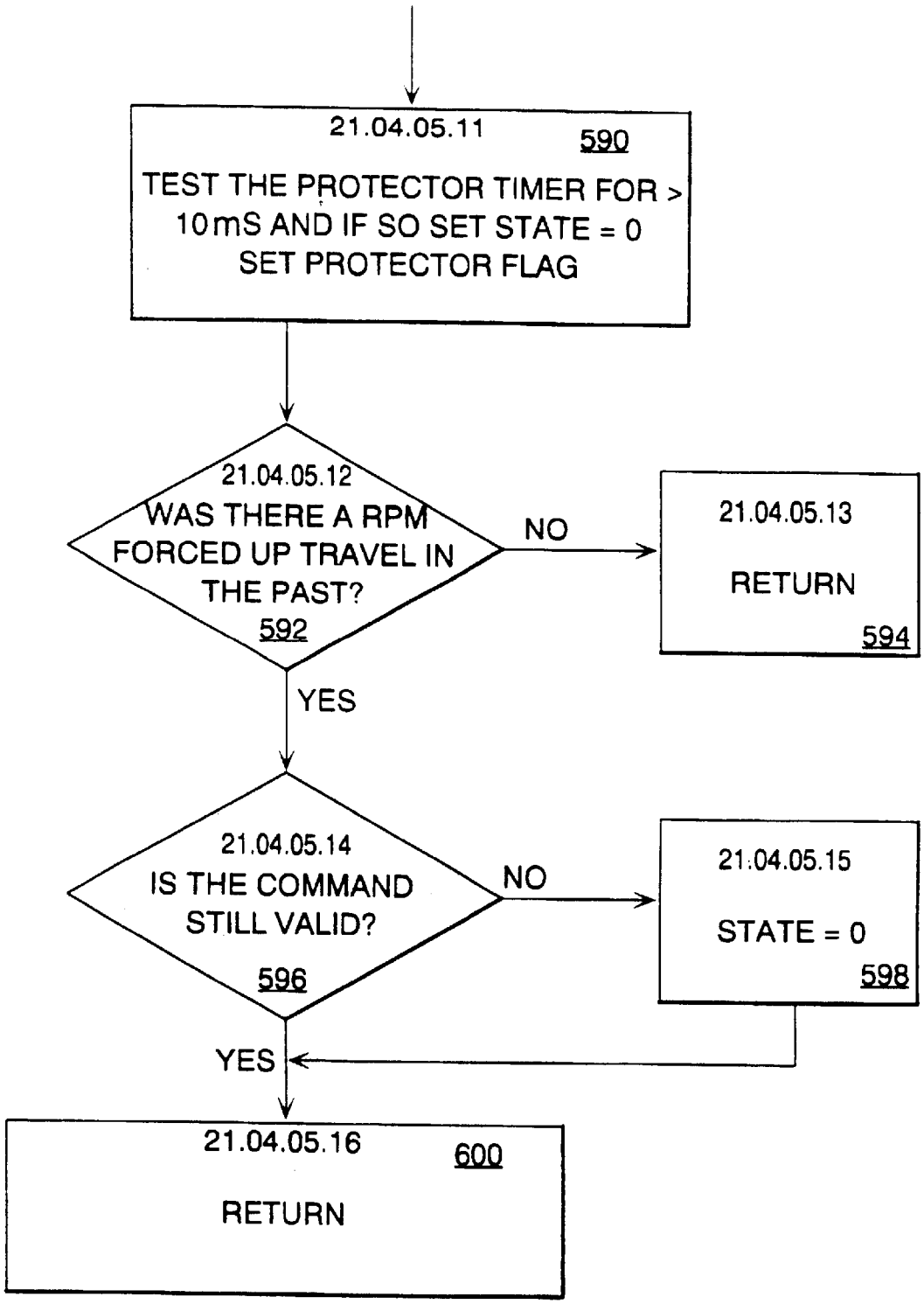

In the event the state has been set equal to 4 to command the door to travel down, the routine 508 is entered as shown in FIGS. 8A and 8B. In a step 570, the work light is turned on, and if the light had previously been off, a delay of 40 milliseconds occurs following which down motor output is turned on and the up motor output is turned off, the watchdog is also started. In a step 572, a test is made to determine whether the 1 second timer has exceeded 1 second and whether the rpm period is indicative of a force limit having been exceeded. If so, indicating that the door is stalled on an obstacle, control is transferred to a step 574, setting a state equal to zero and the routine is exited in a step 576. If the door has not been indicated to be stalled by the step 572, control is transferred to a step 578 testing the status of the down limit input. If it is low, the debounce is increased. If it is high, the debounce is decreased. In a step 580, the limit debounce is tested to determine whether it is greater than or equal to 24 milliseconds. If it is, the state is set equal to 5 in a step 582 and the routine is exited in a step 584. If it is not, the 27 second time out is decremented and tested to determine if it is zero. If it is zero, the state is set equal to zero in a step 586. In a step 588, a test is made to determine whether the radio or wall control command flag has been set and, if so, the state is then set equal to 6. In a step 590, as shown in FIG. 8B, the timer associated with the optical detector is tested to determine whether it is greater than 10 milliseconds and, if it is, indicating that an obstacle is blocking the light path, the state is set equal to zero to cause the auto-reverse routine 512 to be entered following exiting from this routine. It will be entered on the next interrupt which is in less than 2 milliseconds. Control is then transferred to a step 592, testing whether the motor speed indicated that the door had been forced upward. If it is not the routine is exited in a step 594. If the rpm sensing indicates that the door has been forced upward, a test is made in the step 596 to determine if the command is still valid, indicating the door is to move upward. If it is not, control is transferred to a step 598 setting the state equal to zero which will cause the door to auto reverse and move down. Control is then transferred to a step 600 exiting the routine.

Figure 9:
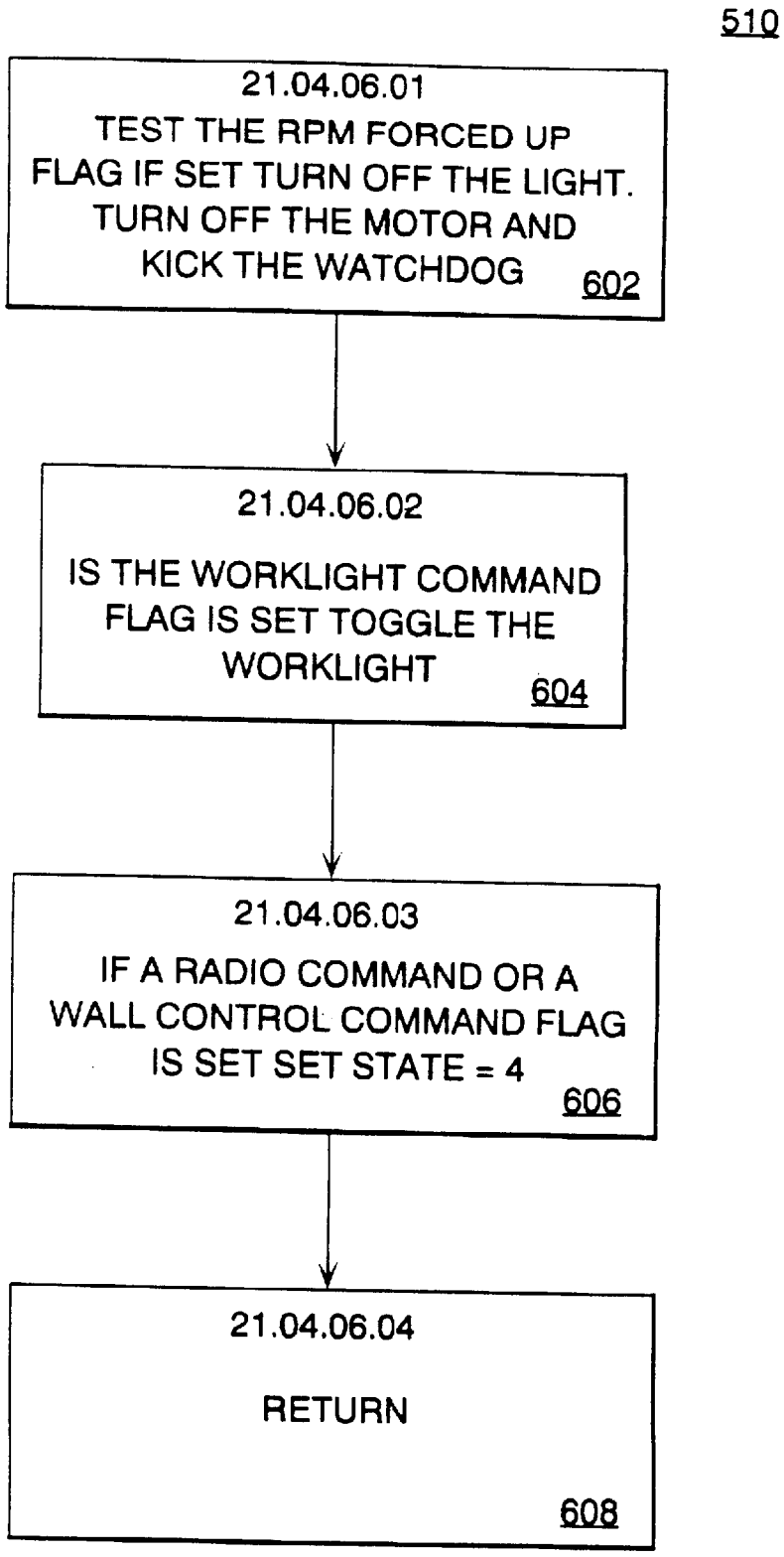
FIG. 9 is a flow chart of a barrier closed routine.
Figure 10:
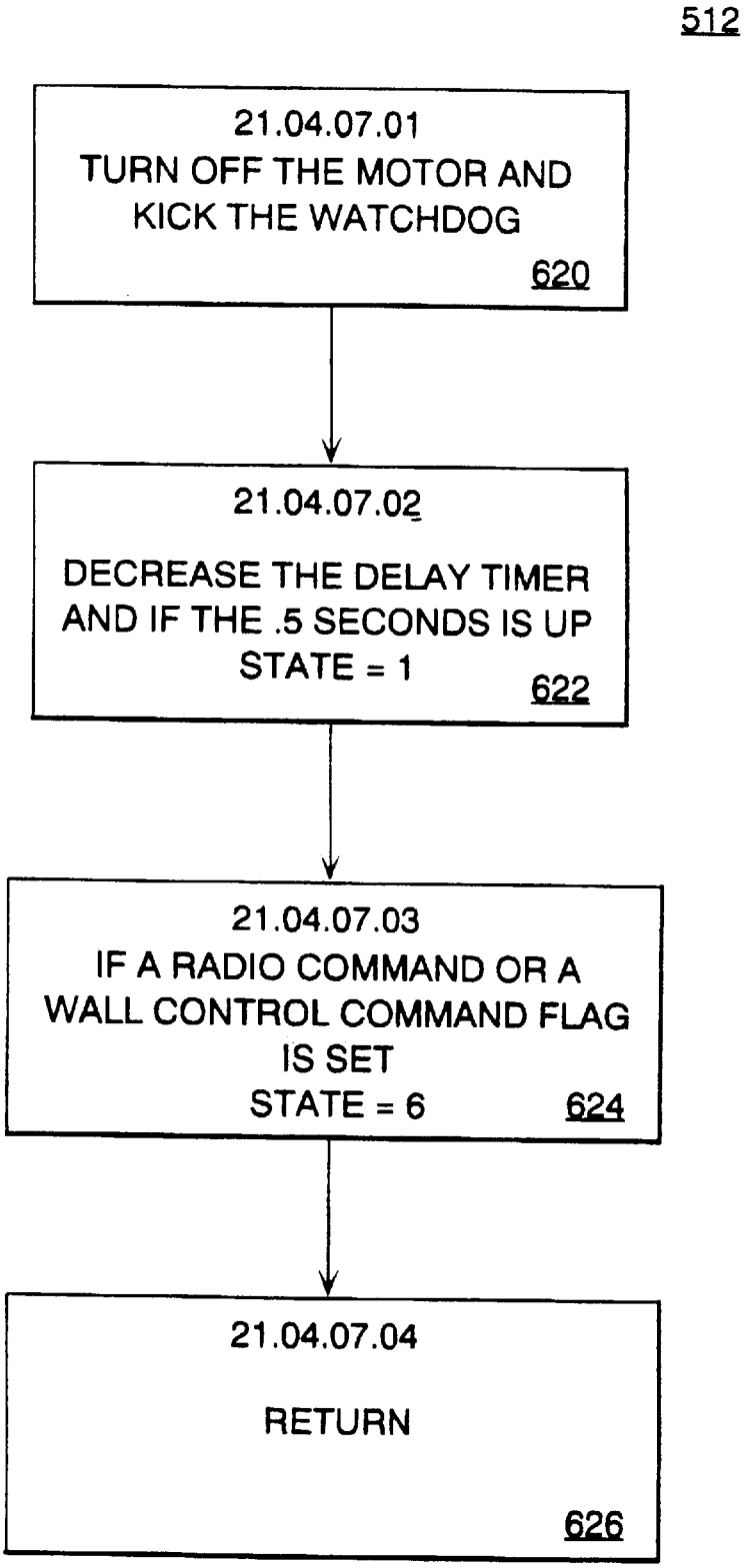
FIG. 10 is a flow chart of an auto-reverse time delay routine.

In the event that the state has been set equal to 6, the routine 510 shown in FIG. 9 is entered. A test is made to determine whether the motor motion indicates that the door has been forced upward. If so, a flag is set to turn off the light and the electric motor is switched off and the watchdog is started. If the worklight command flag has been set in a step 604, the work light is then toggled. In a step 606, a test is made to determine whether the radio command or wall control command flag has been set and, if it has, the state is then set equal to 4 which will cause entry of the traveling down routine 508. The routine is then exited in a step 608.

In the event that the state has been set equal to zero indicating that an auto reverse is to be commanded, the routine 512 is entered in a step 620, the motor is turned off and a watchdog timer is started. In the step 622, the delay timer is decreased and if 0.5 seconds has expired, the state is set equal to 1 to cause the door to travel upward on the next 2 millisecond interrupt. In a step 624, a test is made for the radio command or wall control command flag being set. If it has, the stopped in middle routine 510 will be entered on the next interrupt. The routine 512 is then exited in a step 626.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

5,780,987

7 8

Sheet 1-57/2

NON-VOL MEMORY MAP

| | |
|---|---|
| 00 | A1 |
| 01 | A1 |
| 02 | A2 |
| 03 | A2 |
| 04 | A3 |
| 05 | A3 |
| 06 | A4 |
| 07 | A4 |
| 08 | A5 |
| 09 | A5 |
| 0A | A6 |
| 0B | A6 |
| 0C | A7 |
| 0D | A7 |
| 0E | A8 |
| 0F | A8 |
| 10 | A9 |
| 11 | A9 |
| 12 | A10 |
| 13 | A10 |
| 14 | A11 |
| 15 | A11 |
| 16 | A12 |
| 17 | A12 |
| 18 | B |
| 19 | B |
| 1A | C |
| 1B | C |
| 1C | CYCLE COUNTER 1ST 16 BITS |
| 1D | CYCLE COUNTER 2ND 16 BITS |
| 1E | VACATION FLAG |
| 1F | A MEMORY ADDRESS LAST WRITTEN |

20-2F OPERATION BACK TRACK 30-3F FORCE BACK TRACE

RS232 DATA

| INPUT | OUTPUT | |
|---|---|---|
| 30H | SWITCH STATUS | |
| | XXXXXXX0 | UP LIMIT OPEN |
| | XXXXXXX1 | UP LIMIT CLOSED |
| | XXXXXX0X | DOWN LIMIT OPEN |
| | XXXXXX1X | DOWN LIMIT CLOSED |
| | XXXXX0XX | COMMAND OPEN |
| | XXXXX1XX | COMMAND CLOSED |
| | XXXX0XXX | WORKLIGHT OPEN |
| | XXXX1XXX | WORKLIGHT CLOSED |
| | XXX0XXXX | VACATION OPEN |
| | XXX1XXXX | VACATION CLOSED |
| 31H | SYSTEM STATUS | |
| | XXXXSSSS | STATE DATA |
| | XXX0XXXX | NOT IN LEARN MODE |
| | XXX1XXXX | IN LEARN MODE |
| | XX0XXXXX | NOT IN VACATION MODE |
| | XX1XXXXX | IN VACATION MODE |
| | X0XXXXXX | LIGHT OFF |
| | X1XXXXXX | LIGHT ON |
| | 0XXXXXXX | AOBS OK |
| | 1XXXXXXX | AOBS ERROR |
| 32H | RPM PERIOD | |
| | RETURNED HIGH BYTE | |
| | RETURNED LOW BYTE | |
| 33H | FORCE | |
| | RETURNED DOWN FORCE | |
| | RETURNED UP FORCE | |
| 34H | RADIO MEMORY CODES PAGE 00 | |
| | 32 BYTES | |
| 35H | RADIO MEMORY CODES PAGE 10 | |
| | 32 BYTES | |
| 36H | OPERATION HISTORY PAGE 20 | |
| | 32 BYTES | |
| 37H | FORCE HISTORY PAGE 30 | |
| 38H | MEMORY TEST AND ERASE ALL!! | |
| | 00 OK | |

5,780,987

11 12

FF ERROR

39H SET PROGRAM MODE

REASON

00 COMMAND
10 RADIO COMMAND
20 FORCE
30 AUX OBS
40 A REVERSE DELAY
50 LIMIT
60 EARLY LIMIT
70 MOTOR MAX TIME, TIME OUT
80 MOTOR COMMANDED OFF RPM CAUSING AREV
90 DOWN LIMIT WITH COMMAND HELD
A0 DOWN LIMIT WITH THE RADIO HELD
B0 RELEASE OF COMMAND OR RADIO AFTER A FORCED UP MOTOR ON DUE TO RPM PULSE WITHG MOTOR OFF

STATE

00 AUTOREVERSE DELAY
01 TRAVELING UP DIRECTION
02 AT THE UP LIMIT AND STOPED
03 ERROR RESET
04 TRAVELING DOWN DIRECTION
05 AT THE DOWN LIMIT
06 STOPPED IN MID TRAVEL

---

DIAG

---

1) AOBS SHORTED
2) AOBS OPEN / MISS ALIGNED
3) COMMAND SHORTED
4) PROTECTOR INTERMITTENENT
5) CALL DEALER
   A) NO RPM IN THE FIRST SECOND
   B) RPM FORCED A REVERSE
   C)

---

DOG 2

---

DOG 2 IS A SECONDARY WATCHDOG USED TO RESET THE SYSTEM IF THE LOWEST LEVEL "MAINLOOP" IS NOT REACHED WITHIN A 3 SECOND

---

EQUATE STATEMENTS

```
check_sum_value     .equ   09AH
TIMER_0             .EQU   10H
TIMER_0_EN          .EQU   03H
TIMER_1_EN          .EQU   0CH

MOTOR_HI            .EQU   034H
MOTOR_LO            .EQU   0BCH
PWM_CHARGE          .EQU   00H
PWM_DISCHARGE       .EQU   01H
LIGHT               .EQU   0FFH
LIGHT_ON            .EQU   02H
MOTOR_UP            .EQU   01H
MOTOR_DN            .EQU   04H
DN_LIMIT            .EQU   02H
UP_LIMIT            .EQU   01H
DIS_SW              .EQU   10000000B
CDIS_SW             .EQU   01111111B
SWITCHES            .EQU   01000000B
CHARGE_SW           .EQU   00100000B
CCHARGE_SW          .EQU   11011111B
PWM_HI              .EQU   10H
COMPARATORS         .EQU   30H
DOWN_COMP           .EQU   20H
UP_COMP             .EQU   10H
PWM_DIS             .EQU   20H
P01M_INIT           .EQU   01000100B    ; set mode p00-p03 out p04-p07in
P2M_INIT            .EQU   01100011B
P3M_INIT            .EQU   00000011B    ; set port3 p30-p33 input ANALOG mode
P01S_INIT           .EQU   00000010B
P2S_INIT            .EQU   10000011B
P3S_INIT            .EQU   00000000B

FLASH               .EQU   0FFH
WORKLIGHT           .EQU   02H

COM_CHARGE          .EQU   2
WORK_CHARGE         .EQU   20
VAC_CHARGE          .EQU   80

COM_DIS             .EQU   01
WORK_DIS            .EQU   04
VAC_DIS             .EQU   24

CMD_TEST            .EQU   00
WL_TEST             .EQU   01
VAC_TEST            .EQU   02
CHARGE              .EQU   03

AUTO_REV            .EQU   00H
UP_DIRECTION        .EQU   01H
UP_POSITION         .EQU   02H
DN_DIRECTION        .EQU   04H
```

```
DN_POSITION      .EQU  05H
STOP             .EQU  06H
CMD_SW           .EQU  01H
LIGHT_SW         .EQU  02H
VAC_SW           .EQU  04H

;-----------------------------------------------------------
;       PERIODS
;-----------------------------------------------------------

LIMIT_COUNT      .EQU  0FH                  ; limit debounce 1 way 32mS
AUTO_HI          .EQU  00H                  ; auto rev timer .5 sec
AUTO_LO          .EQU  0F4H
MIN_COUNT        .EQU  04H                  ; pwm start point
TOTAL_PWM_COUNT  .EQU  03FH                 ; pwm end = start + 4*total-1
FLASH_HI         .EQU  00H                  ; .25 sec flash
FLASH_LO         .EQU  07AH
SET_TIME_HI      .EQU  02H          ; 4.5 MIN
SET_TIME_LO      .EQU  02H          ; 4.5 MIN
SET_TIME_PRE     .EQU  0FBH         ; 4.5 MIN
ONE_SEC          .EQU  0F4H         ; WITH A /2 IN FRONT
CMD_MAKE         .EQU  8D                   ; cycle count *10mS
CMD_BREAK        .EQU  (255D-8D)
LIGHT_MAKE       .EQU  8D                   ; cycle count *11mS
LIGHT_BREAK      .EQU  (255D-8D)
VAC_MAKE_OUT     .EQU  4D                   ; cycle count *100mS
VAC_BREAK_OUT    .EQU  (255D-4D)
VAC_MAKE_IN      .EQU  2D
VAC_BREAK_IN     .EQU  (255D-2D)

VAC_DEL          .EQU  8D
CMD_DEL_EX       .EQU  4D
VAC_DEL_EX       .EQU  50D

;-----------------------------------------------------------
;       PREDEFINED REG
;-----------------------------------------------------------

;SP      .equ  255      ; stack pointer
;RP      .equ  253      ; register pointer
;FLAGS   .equ  252      ; cpu flags
;IMR     .equ  251      ; interrupt mask reg
;IRQ     .equ  250      ; interrupt request
;IPR     .equ  249      ; interrupt priority
;P01M    .equ  248      ; port 0 mode
;P3M     .equ  247      ; port 3 mode
;P2M     .equ  246      ; port 2 mode
;PRE0    .equ  245      ; prescaler for timer 0
;T0      .equ  244      ; timer 0
;PRE1    .equ  243      ; prescaler for timer 1
;T1      .equ  242      ; timer 1
;TMR     .equ  241      ; timer mode
;P3      .equ  3        ; port 3
```

5,780,987

17 18

```
;P2          .equ   2          ; port 2
;P0          .equ   0          ; port 0

ALL_ON_IMR   .equ   00111101b  ; turn on int for timers rpm auxobs radio
RETURN_IMR   .equ   00011101b  ; return on the IMR
;-----------------------------------------------------------------
        GLOBAL REGISTERS
;-----------------------------------------------------------------

STATUS              .EQU  04H  ; CMD_TEST 00
                               ; WL_TEST 01
                               ; VAC_TEST 02
                               ; CHARGE_03

STATE               .EQU  05H  ; state register
PWM_STATUS          .EQU  06H
PWM_OFF             .EQU  07H
AUTO_DELAY_HI       .EQU  08H
AUTO_DELAY_LO       .EQU  09H
AUTO_DELAY          .EQU  08H
MOTOR_TIMER_HI      .EQU  0AH
MOTOR_TIMER_LO      .EQU  0BH
MOTOR_TIMER         .EQU  0AH
LIGHT_TIMER_HI      .EQU  0CH
LIGHT_TIMER_LO      .EQU  0DH
LIGHT_TIMER         .EQU  0CH

PRE_LIGHT           .EQU  0FH
SW_DATA             .EQU  10H
ONEP2               .EQU  11H      . 1.2 SEC TIMER TICK .125
LAST_CMD            .EQU  12H      ; LAST COMMAND FROM
                                   ; = 55 WALL CONTROL
                                   ; = 00 RADIO
BCODEFLAG           .EQU  13H      ; B CODE FLAG
                                   ; 77 = b code
RPMONES             .EQU  14H      ; RPM PULSE ONE SECOND DISABLE
RPMCLEAR            .EQU  15H      ; RPM PULSE CLEAR AND TEST TIMER
FAREVFLAG           .EQU  16H      ; RPM FORCED AREV FLAG
                                   ; 88H FOR A FORCED REVERSE

FLASH_FLAG          .EQU  17H
FLASH_DELAY_HI      .EQU  18H
FLASH_DELAY_LO      .EQU  19H
FLASH_DELAY         .EQU  18H
FLASH_COUNTER       .EQU  1AH
REASON              .EQU  1BH      ;
                                   ; 00   COMMAND
                                   ; 10   RADIO COMMAND
                                   ; 20   FORCE
                                   ; 30   AUXOBS
                                   ; 40   AUTOREVERSE DELAY TIMEOUT
                                   ; 50   LIMIT
                                   ; 60   EARLY LIMIT
                                   ; 70   MOTOR MAX TIME OUT
                                   ; 80   FORCED AREV FROM RPM
                                   ; 90   CLOSED WITH COMMAND HELD
```

5,780,987

19 20

```
                                        ; A0    CLOSED WITH THE RADIO HELD
LIGHT_FLAG          .EQU  1CH
CMD_DEB             .EQU  1DH
LIGHT_DEB           .EQU  1EH
VAC_DEB             .EQU  1FH


TIMER_GROUP          EQU  20H
sw_address_hi       .equ  r0
sw_address_lo       .equ  r1
sw_address          .equ  rr0
t_address_hi        .equ  r2
t_address_lo        .equ  r3
t_address           .equ  rr2
switch_delay        .equ  r4
limit               .equ  r5
obs_count           .equ  r6
rs232do             .equ  r7
rs232di             .equ  r8
rscommand           .equ  r9
rs232docount        .equ  r10
rs232dicount        .equ  r11
rs232odelay         .equ  r12
rs232idelay         .equ  r13
rs232ccount         .equ  r14
rs232page           .equ  r15

SWITCH_DELAY        .EQU  TIMER_GROUP+4
LIMIT               .EQU  TIMER_GROUP+5
OBS_COUNT           .EQU  TIMER_GROUP+6
RS232DO             .EQU  TIMER_GROUP+7
RS232DI             .EQU  TIMER_GROUP+8
RSCOMMAND           .EQU  TIMER_GROUP+9
RS232DOCOUNT        .EQU  TIMER_GROUP+10
RS232DICOUNT        .EQU  TIMER_GROUP+11
RS232ODELAY         .EQU  TIMER_GROUP+12
RS232IDELAY         .EQU  TIMER_GROUP+13
RS232CCOUNT         .EQU  TIMER_GROUP+14
RS232PAGE           .EQU  TIMER_GROUP+15
;*****************************************************************
; LEARN EE GROUP FOR LOOPS ECT
;*****************************************************************
;
LEARNEE_GRP         .equ  30H           ;
TEMPH       .equ    LEARNEE_GRP         ;
TEMPL       .equ    LEARNEE_GRP+1       ;
TEMP        .equ    LEARNEE_GRP+2       ;
LEARNDB     .equ    LEARNEE_GRP+3       ; learn debouncer
LEARNT      .equ    LEARNEE_GRP+4       ; learn timer
ERASET      .equ    LEARNEE_GRP+5       ; erase timer
MTEMPH      .equ    LEARNEE_GRP+6       ; memory temp
MTEMPL      .equ    LEARNEE_GRP+7       ; memory temp
MTEMP       .equ    LEARNEE_GRP+8       ; memory temp
SERIAL      .equ    LEARNEE_GRP+9       ; serial data to and from nonvol memory
ADDRESS     .equ    LEARNEE_GRP+10      ; address for the serial nonvol memory
```

```
T0EXT       .equ   LEARNEE_GRP+11   ; timer 0 extend decremented every T0 int
T4MS        .equ   LEARNEE_GRP+12   ; 4 mS counter
T125MS      .equ   LEARNEE_GRP+13   ; 125mS counter
ZZWIN       .equ   LEARNEE_GRP+14   ; radio 00 code window
SKIPRADIO   .equ   LEARNEE_GRP+15   ; flag to skip the radio read and write if
                                    ; learn or vacation are talking to it

temph       .equ   r0               ;
templ       .equ   r1               ;
temp        .equ   r2               ;
learndb     .equ   r3               ; learn debouncer
learnt      .equ   r4               ; learn timer
eraset      .equ   r5               ; erase timer
mtemph      .equ   r6               ; memory temp
mtempl      .equ   r7               ; memory temp
mtemp       .equ   r8               ; memory temp
serial      .equ   r9               ; serial data to and from nonvol memory
address     .equ   r10              ; address for the serial nonvol memory
t0ext       .equ   r11              ; timer 0 extend decremented every T0 int
t4ms        .equ   r12              ; 4 mS counter
t125ms      .equ   r13              ; 125mS counter
zzwin       .equ   r14              ;
skipradio   .equ   r15              ; flag to skip the radio read and write if
                                    ; learn or vacation are talking to it


PWM_GROUP        .EQU   40H
dnforce          .equ   r0
upforce          .equ   r1
up_force_hi      .equ   r4
up_force_lo      .equ   r5
up_force         .equ   rr4
dn_force_hi      .equ   r6
dn_force_lo      .equ   r7
dn_force         .equ   rr6
force_add_hi     .equ   r8
force_add_lo     .equ   r9
force_add        .equ   rr8
up_temp          .equ   r10
dn_temp          .equ   r11
pulsewidth       .equ   r12
pwm_count        .equ   r13

DNFORCE          .equ   40H
UPFORCE          .equ   41H
AOBSTEST         .equ   42H
FAULTTIME        .equ   43H
UP_FORCE_HI      .equ   44H
UP_FORCE_LO      .equ   45H
DN_FORCE_HI      .equ   46H
DN_FORCE_LO      .equ   47H
PULSEWIDTH       .equ   4CH
PWM_COUNT        .equ   4DH
AOBSF            .equ   4EH
FAULTCODE        .equ   4FH
```

5,780,987

23 24

```
RPM_GROUP          .EQU   50H

stackreason        .equ   r0
stackflag          .equ   r1
rpm_temp_hi        .equ   r2
rpm_temp_lo        .equ   r3
rpm_past_hi        .equ   r4
rpm_past_lo        .equ   r5
rpm_past           .equ   rr4
rpm_period_hi      .equ   r6
rpm_period_lo      .equ   r7
rpm_period         .equ   rr6
rpm_count          .equ   r8
rpm_diff_hi        .equ   r9
rpm_diff_lo        .equ   r10
rpm_2past_hi       .equ   r11
rpm_2past_lo       .equ   r12
rpm_set_diff_hi    .equ   r13
rpm_set_diff_lo    .equ   r14
rpm_time_out       .equ   r15

STACKREASON        .EQU   RPM_GROUP+0
STACKFLAG          .EQU   RPM_GROUP+1
RPM_TEMP_HI        .EQU   RPM_GROUP+2
RPM_TEMP_LO        .EQU   RPM_GROUP+3
RPM_PAST_HI        .EQU   RPM_GROUP+4
RPM_PAST_LO        .EQU   RPM_GROUP+5
RPM_PERIOD_HI      .EQU   RPM_GROUP+6
RPM_PERIOD_LO      .EQU   RPM_GROUP+7
RPM_COUNT          .EQU   RPM_GROUP+8
RPM_DIFF_HI        .EQU   RPM_GROUP+9
RPM_DIFF_LO        .EQU   RPM_GROUP+10
RPM_2PAST_HI       .EQU   RPM_GROUP+11
RPM_2PAST_LO       .EQU   RPM_GROUP+12
RPM_SET_DIFF_HI    .EQU   RPM_GROUP+13
RPM_SET_DIFF_LO    .EQU   RPM_GROUP+14
RPM_TIME_OUT       .EQU   RPM_GROUP+15

;*****************************************************************
; RADIO GROUP
;*****************************************************************
RADIO_GRP   .equ   60H                  ;
RTEMP       .equ   RADIO_GRP            ; radio temp storage
RTEMPH      .equ   RADIO_GRP+1          ; radio temp storage high
RTEMPL      .equ   RADIO_GRP+2          ; radio temp storage low
RTIMEAH     .equ   RADIO_GRP+3          ; radio active time high byte
RTIMEAL     .equ   RADIO_GRP+4          ; radio active time low byte
RTIMEIH     .equ   RADIO_GRP+5          ; radio inactive time high byte
RTIMEIL     .equ   RADIO_GRP+6          ; radio inactive time low byte
RTIMEPH     .equ   RADIO_GRP+7          ; radio past time high byte
RTIMEPL     .equ   RADIO_GRP+8          ; radio past time low byte
RADIO3H     .equ   RADIO_GRP+9          ; 3 mS code storage high byte
```

```
RADIO3L     .equ  RADIO_GRP+10     ; 3 mS code storage low byte
RADIO1H     .equ  RADIO_GRP+11     ; 1 mS code storage high byte
RADIO1L     .equ  RADIO_GRP+12     ; 1 mS code storage low byte
RADIOC      .equ  RADIO_GRP+13     ; radio word count
RTIMEDH     .equ  RADIO_GRP+14     ; radio difference of active and inactive
RTIMEDL     .equ  RADIO_GRP+15     ; radio difference
rtemp       .equ  r0               ; radio temp storage
rtemph      .equ  r1               ; radio temp storage high
rtempl      .equ  r2               ; radio temp storage low
rtimeah     .equ  r3               ; radio active time high byte
rtimeal     .equ  r4               ; radio active time low byte
rtimeih     .equ  r5               ; radio inactive time high byte
rtimeil     .equ  r6               ; radio inactive time low byte
rtimeph     .equ  r7               ; radio past time high byte
rtimepl     .equ  r8               ; radio past time low byte
radio3h     .equ  r9               ; 3 mS code storage high byte
radio3l     .equ  r10              ; 3 mS code storage low byte
radio1h     .equ  r11              ; 1 mS code storage high byte
radio1l     .equ  r12              ; 1 mS code storage low byte
radioc      .equ  r13              ; radio word count
rtimedh     .equ  r14              ; radio difference of active and inactive
rtimedl     .equ  r15              ; radio difference

CHECK_GRP        .equ  70H
check_sum        .equ  r0           ; check sum pointer
rom_data         .equ  r1
test_adr_hi      .equ  r2
test_adr_lo      .equ  r3
test_adr         .equ  rr2
CHECK_SUM        .equ  CHECK_GRP+0      ; check sum reg for por
ROM_DATA         .equ  CHECK_GRP+1      ; data read
AUXLEARNSW       .equ  CHECK_GRP+2      ;
RRTO             .equ  CHECK_GRP+3      ;
RPM_ACOUNT       .equ  74H          ; to test for active rpm
RSCCOUNT         .equ  75H          ; rs232 byte counter
RSSTART          .equ  76H          ; rs232 start flag

RADIO_CMD        .equ  77H          ; radio command
R_DEAD_TIME      .equ  78H          ;
FAULT            .equ  79H          ;

VACFLAG          .equ  7AH          ; VACATION mode flag
VACFLASH         .equ  7BH
VACCHANGE        .equ  7CH
TASKSWITCH       .equ  7DH
FORCE_IGNORE     .equ  7EH
FORCE_PRE        .equ  7FH
SDISABLE         .equ  80H          ; system disable timer
PRADIO3H         .equ  81H          ; 3 mS code storage high byte
PRADIO3L         .equ  82H          ; 3 mS code storage low byte
PRADIO1H         .equ  83H          ; 1 mS code storage high byte
PRADIO1L         .equ  84H          ; 1 mS code storage low byte
RTO              .equ  85H          ; radio time out
RFLAG            .equ  86H          ; radio flags
RINFILTER        .equ  87H          ; radio input filter
```

```
LIGHT1S         .equ   88H          ; light timer for 1second flash
DOG2            .equ   89H          ; second watchdog
FAULTFLAG       .equ   8BH          ; flag for fault blink stops radio blink
MOTDEL          .equ   8CH          ; motor time delay
LIGHTS          .equ   8DH          ; light state
DELAYC          .equ   8EH          ; for the time delay for command
COUNTER         .equ   8FH          ; delay counter

BACKUP_GRP      .equ   90H
ForcedDown      .equ   BACKUP_GRP
BRPM_COUNT      .equ   BACKUP_GRP+1
BRPM_TIME_OUT   .equ   BACKUP_GRP+2
BFORCE_IGNORE   .equ   BACKUP_GRP+3
BAUTO_DELAY_HI  .equ   BACKUP_GRP+4
BAUTO_DELAY_LO  .equ   BACKUP_GRP+5
BAUTO_DELAY     .equ   BACKUP_GRP+4
BCMD_DEB        .equ   BACKUP_GRP+6
BSTATE          .equ   BACKUP_GRP+7

STACKTOP   .equ   238          ; start of the stack
STACKEND   .equ   0A0H         ; end of the stack

;P3        .equ   3            ; port 3
;P2        .equ   2            ; port 2
;P0        .equ   0            ; port 0

RS232OS    .equ   01000000B    ; RS232 output bit set
RS232OC    .equ   10111111B    ; RS232 output bit clear
RS232OP    .equ   P3           ; RS232 output port
RS232IP    .equ   P2           ; RS232 input port
RS232IM    .equ   00100000B    ; RS232 mask
csh        .equ   00010000B    ; chip select high for the 93c46
csl        .equ   11101111B    ; chip select low for 93c46
clockh     .equ   00001000B    ; clock high for 93c46
clockl     .equ   11110111B    ; clock low for 93c46
doh        .equ   00000100B    ; data out high for 93c46
dol        .equ   11111011B    ; data out low for 93c46
ledh       .equ   10000000B    ; turn the led pin high "on"
ledl       .equ   01111111B    ; turn the led pin low "off"
psmask     .equ   01000000B    ; mask for the program switch
csport     .equ   P2           ; chip select port
dioport    .equ   P2           ; data i/o port
clkport    .equ   P2           ; clock port
ledport    .equ   P2           ; led port
psport     .equ   P2           ; program switch port

WATCHDOG_GROUP .EQU   0FH
pcon           .equ   r0
smr            .equ   r11
wdtmr          .equ   r15

WDT        .macro
           .byte  5fh
```

5,780,987

29 30

```
            .endm

FILL        .macro
            .byte   0FFh
            .endm

TRAP        .macro
            jp      start
            jp      start
            jp      start
            jp      start
            jp      start
            .endm
TRAP10      .macro
            TRAP
            TRAP
            TRAP
            TRAP
            TRAP
            TRAP
            TRAP
            TRAP
            TRAP
            TRAP
            .endm

;*****************************************************************
;
;           Interrupt Vector Table
;*****************************************************************

            .org    0000H

            .word   RADIO_INT       ;IRQ0
            .word   000CH           ;IRQ1, P3.3
            .word   RPM             ;IRQ2, P3.1
            .word   AUX_OBS         ;IRQ3, P3.0
            .word   TIMERUD         ;IRQ4, T0
            .word   PWM             ;IRQ5, T1

            .page
            .org    000CH
            jp      START           ; start jmps to start at location 0101 or 0202 ect

;-----------------------------------------------------------------
;           FORCE TABLE
;-----------------------------------------------------------------
force_table_50:
F_0:        .word   107FH
F_1:        .word   107FH
F_2:        .word   109DH
F_3:        .word   10BBH
F_4:        .word   10D9H
```

5,780,987

31 32

```
F_5:        .word    10F8H
F_6:        .word    1116H
F_7:        .word    1134H
F_8:        .word    1152H
F_9:        .word    1168H
F_10:       .word    117DH
F_11:       .word    1193H
F_12:       .word    119FH
F_13:       .word    11ABH
F_14:       .word    11B7H
F_15:       .word    11C3H
F_16        .word    11CFH
F_17:       .word    11DFH
F_18:       .word    11E8H
F_19:       .word    11F4H
F_20        .word    1200H
F_21:       .word    120CH
F_22:       .word    1218H
F_23:       .word    1224H
F_24:       .word    1230H
F_25:       .word    123CH
F_26:       .word    1248H
F_27:       .word    1254H
F_28:       .word    1260H
F_29:       .word    126CH
F_30:       .word    1278H
F_31:       .word    1284H
F_32:       .word    1291H
F_33:       .word    129DH
F_34:       .word    12BBH
F_35:       .word    12D9H
F_36:       .word    12F7H
F_37:       .word    1315H
F_38:       .word    1333H
F_39:       .word    1352H
F_40:       .word    1370H
F_41:       .word    138EH
F_42:       .word    13ACH
F_43:       .word    13CAH
F_44:       .word    1407H
F_45:       .word    1443H
F_46:       .word    147FH
F_47:       .word    14BCH
F_48:       .word    14F8H
F_49        .word    1534H
F_50:       .word    1571H
F_51:       .word    15E9H
F_52:       .word    1626H
F_53:       .word    169EH
F_54:       .word    1717H
F_55:       .word    17D5H
F_56:       .word    1951H
F_57:       .word    1B8DH
F_58:       .word    1E86H
F_59        .word    223EH
F_60        .word    26B4H
```

```
F_61:       .word       2BE9H
F_62:       .word       31DDH
F_63:       .word       388EH
F_64:       .word       388EH

;-----------------------------------------------------------------
;       RS232 DATA ROUTINES
;-----------------------------------------------------------------

;       enter rs232 start with word to output in rs232do

RS232OSTART:
            push    rp                          ; save the rp
            srp     #TIMER_GROUP                ; set the group pointer
            clr     RSSTART                     ; one shot
            ld      rs232odelay,#6d             ; set the time delay to 3. mS
            clr     rs232docount                ; start with the counter at 0
            and     RS232OP,#RS232OC            ; clear the output
            jr      NORSOUT                     ;

RS232:
            cp      RSSTART,#0FFH               ; test for the start flag
            jr      z,RS232OSTART
RS232OUTPUT:
            push    rp                          ; save the rp
            srp     #TIMER_GROUP                ; set the group pointer
            cp      rs232docount,#11d           ; test for last
            jr      nz,RS232R
            or      RS232OP,#RS232OS            ; set the output idle
            JR      NORSOUT
RS232R:
            djnz    rs232odelay,NORSOUT         ; cycle count time delay
            inc     rs232docount                ; set the count for the next cycle
            scf                                 ; set the carry flag for stop bits
            rrc     rs232do                     ; get the data into the carry
            jr      c,RS232SET                  ; if the bit is high then set
            and     RS232OP,#RS232OC            ; clear the output
            jr      SETTIME
RS232SET:
            or      RS232OP,#RS232OS            ; set the output
SETTIME:
            ld      rs232odelay,#6d             ; set the data output delay
            tm      rs232docount,#00000001b     ; test for odd words
            jr      z,NORSOUT                   ; if even done
            ld      rs232odelay,#7d             ; set the delay to 7 for odd
                                                ; this gives 6.5 *.512mS

NORSOUT:
RS232INPUT:
            cp      rs232dicount,#0FFH          ; test  mode
            jr      nz,RECEIVING                ; if receiving then jump
            tm      RS232IP,#RS232IM            ; test the incoming data
            jr      nz,NORSIN                   ; if the line is still idle then skip
            clr     rs232dicount                ; start at 0
            ld      rs232idelay,#3              ; set the delay to mid
```

```
RECEIVING:
            djnz    rs232idelay,NORSIN          ; skip till delay is up
            inc     rs232dicount                ; bit counter
            cp      rs232dicount,#10d           ; test for last timeout
            jr      z,DIEVEN
            tm      RS232IP,#RS232IM            ; test the incoming data
            rcf                                 ; clear the carry
            jr      z,SKIPSETTING               ; if input bit not set skip setting carry
            scf                                 ; set the carry
SKIPSETTING:
            rrc     rs232di                     ; save the data into the memory
            ld      rs232idelay,#6d             ; set the delay
            tm      rs232dicount,#00000001b     ; test for odd
            jr      z,NORSIN                    ; if even skip
            ld      rs232idelay,#7              ; set the delay
            jr      NORSIN
DIEVEN:
            ld      rs232dicount,#0FFH          ; turn off the input till next start
            ld      rscommand,rs232di           ; save the value
            clr     RSCCOUNT                    ; clear the counter
NORSIN:
            pop     rp                          ; return the rp
            ret
            FILL
            FILL

;*****************************************************************
; REGISTER INITILIZATION
;*****************************************************************

            .org    0101H                       ; address has both bytes the same
start
START:      di                                  ; turn off the interrupt for init
            ld      RP,#WATCHDOG_GROUP
            ld      wdtmr,#00001111B            ; rc dog 100mS
            WDT                                 ; kick the dog
            clr     RP                          ; clear the register pointer

;*****************************************************************
; PORT INITILIZATION
;*****************************************************************

            ld      P0,#P01S_INIT               ; RESET all ports
            ld      P2,#P2S_INIT-2              ; Set the up limit high , down limit low
            ld      P3,#P3S_INIT                ;
            ld      P01M,#P01M_INIT             ; set mode p00-p03 out p04-p07in
            ld      P3M,#P3M_INIT               ; set port3 p30-p33 input analog mode
                                                ; p34-p37 outputs
            ld      P2M,#(P2M_INIT-3)           ; set port 2 mode setting the limits as
                                                ; outputs for fema of open

;*****************************************************************
;*      Internal RAM Test and Reset All RAM =   mS              *
;*****************************************************************
```

5,780,987

37 38

```
            srp     #0FCh                       ; point to control group use stack
            ld      r15,#4                      ;r15= pointer (minimum of RAM)
write_again:
            WDT                                 ; KICK THE DOG
            ld      r14,#1
write_again1:
            ld      @r15,r14                    ;write 1,2,4,8,10,20,40,80
            cp      r14,@r15                    ;then compare
            jr      ne,system_error
            rl      r14
            jr      nc,write_again1
            clr     @r15                        ;write RAM(r5)=0 to memory
            inc     r15
            cp      r15,#240
            jr      ult,write_again


;*****************************************************************
;*          Checksum Test
;*****************************************************************
CHECKSUMTEST:
            srp     #CHECK_GRP
            ld      test_adr_hi,#0FH
            ld      test_adr_lo,#0FFH           ;maximum address=fffh
add_sum:
            WDT                                 ; KICK THE DOG
            ldc     rom_data,@test_adr          ;read ROM code one by one
            add     check_sum,rom_data          ;add it to checksum register
            decw    test_adr                    ;increment ROM address
            jr      nz,add_sum                  ;address=0 ?
            cp      check_sum,#check_sum_value
            jr      z,system_ok                 ;check final checksum = 00 ?
system_error:
            and     ledport,#led!               ; turn on the LED to indicate fault
            jr      system_error

            .byte   256-check_sum_value
system_ok:

            WDT                                 ; kick the dog

            ld      STACKEND,#STACKTOP          ; start at the top of the stack
SETSTACKLOOP:
            ld      @STACKEND,#01H              ; set the value for the stack vector
            dec     STACKEND                    ; next address
            cp      STACKEND,#STACKEND          ; test for the last address
            jr      nz,SETSTACKLOOP             ; loop till done

CLEARDONE:

            ld      STATE,#06d                  ; set the state to stop
            ld      BSTATE,#06d                 ;
            ld      STATUS,#CHARGE              ; set start to charge
```

```
        ld      SWITCH_DELAY,#CMD_DEL_EX        ; set the delay time to cmd
        ld      LIGHT_TIMER_HI,#SET_TIME_HI     ; set the light period
        ld      LIGHT_TIMER_LO,#SET_TIME_LO     ; for the 4.5 min timer
        ld      PRE_LIGHT,#SET_TIME_PRE         ;
        ld      PULSEWIDTH,#MIN_COUNT           ; set init
        ld      PWM_COUNT,#TOTAL_PWM_COUNT      ;
        ld      RPMONES,#244d                   ; set the hold off
        ld      RS232DOCOUNT,#11D               ; turn off the rs232 output
        srp     #LEARNEE_GRP                    ;
        ld      learndb,#0FFH                   ; set the learn debouncer
        ld      zzwin,learndb                   ; turn off the learning
        ld      CMD_DEB,learndb                 ; in case of shorted switches
        ld      BCMD_DEB,learndb                ; in case of shorted switches
        ld      VAC_DEB,learndb                 ;
        ld      LIGHT_DEB,learndb               ;
        ld      ERASET,learndb                  ; set the erase timer
        ld      learnt,learndb                  ; set the learn timer
        ld      RTO,learndb                     ; set the radio time out
        ld      AUXLEARNSW,learndb              ; turn off the aux learn switch
        ld      RRTO,learndb                    ; set the radio timer

;*****************************************************************
; STACK INITILIZATION
;*****************************************************************

        clr     254
        ld      255,#238D                       ; set the start of the stack

;*****************************************************************
; TIMER INITILIZATION
;*****************************************************************

        ld      PRE0,#00001001B                 ; set the prescaler to / 2 for 8Mhz
        ld      PRE1,#01000010B                 ; one shot mode /16
        ld      T0,#000H                        ; set the counter to count FF through 0
        ld      T1,MIN_COUNT                    ; set init count
        ld      TMR,#00000011B                  ; turn on the timer

;*****************************************************************
; PORT INITILIZATION
;*****************************************************************

        ld      P0,#P01S_INIT                   ; RESET all ports
        ld      P2,#P2S_INIT                    ;
        ld      P3,#P3S_INIT                    ;
        ld      P01M,#P01M_INIT                 ; set mode p00-p03 out p04-p07in
        ld      P3M,#P3M_INIT                   ; set port3 p30-p33 input analog mode
                                                ; p34-p37 outputs
        ld      P2M,#(P2M_INIT+0)               ; set port 2 mode

;*****************************************************************
; READ THE MEMORY 2X AND GET THE VACFLAG
;*****************************************************************

        ld      SKIPRADIO,#0FFH                 ;
        ld      ADDRESS,#1EH                    ; set non vol address to the VAC flag
```

5,780,987

41 42

```
        call    READMEMORY          ; read the value 2X 1X INIT 2ND read
        call    READMEMORY          ; read the value
        ld      VACFLAG,MTEMPH      ; save into volital
        clr     SKIPRADIO

;*****************************************************************
; INITERRUPT INITILIZATION
;*****************************************************************
SETINTERRUPTS:
        ld      IPR,#00011010B      ; set the priority to timer
        ld      IMR,#ALL_ON_IMR     ; turn on the interrupt
        ld      IRQ,#01000000B      ; set the edge clear int
        ei                          ; enable interrupt
;*****************************************************************
; RESET SYSTEM REG
;*****************************************************************

        ld      RP,#WATCHDOG_GROUP
        ld      smr,#00100010B      ; reset the xtal / number
        ld      pcon,#01111110B     ; reset the pcon no comparator output
                                    ; no low emi mode
        ld      PRE0,#00001001B     ; set the prescaler to / 2 for 8Mhz
        ld      RS232DO,#0BBH       ; set the rs232 data
        jp      VACSWOPEN           ; start the transmission

;*****************************************************************
; MAIN LOOP
;*****************************************************************
MAINLOOP:
        clr     DOG2                ; clear the second watchdog
        ld      P01M,#P01M_INIT     ; set mode p00-p03 out p04-p07in
        ld      P3M,#P3M_INIT       ; set port3 p30-p33 input analog mode
                                    ; p34-p37 outputs
        ld      P2M,#(P2M_INIT+0)   ; set port 2 mode
        cp      VACCHANGE,#0AAH     ; test for the vacation change flag
        jr      nz,NOVACCHG         ; if no change the skip
        cp      VACFLAG,#0FFH       ; test for in vacation
        jr      z,MCLEARVAC         ; if in vac clear
        ld      VACFLAG,#0FFH       ; set vacation
        jr      SETVACCHANGE        ; set the change
MCLEARVAC:
        clr     VACFLAG             ; clear vacation mode
SETVACCHANGE:
        clr     VACCHANGE           ; one shot
        ld      SKIPRADIO,#0FFH     ; set skip flag
        ld      ADDRESS,#1EH        ; set the non vol address to the VAC flag
        ld      MTEMPH,VACFLAG      ; store the vacation flag
        ld      MTEMPL,VACFLAG      ;
        call    WRITEMEMORY         ; write the value
        clr     SKIPRADIO           ; clear skip flag
NOVACCHG:
```

5,780,987

43 44

```
            cp      STACKFLAG,#0FFH     ; test for the change flag
            jr      nz,NOCHANGEST       ; if no change skip updating

            srp     #LEARNEE_GRP        ; set the register pointer
            clr     STACKFLAG           ; clear the flag
            ld      SKIPRADIO,#0FFH     ; set skip flag
            ld      address,#1CH        ; set the non vol address to the cycle c
            call    READMEMORY          ; read the value
            inc     mtempl              ; increase the counter lower byte
            jr      nz,COUNTER1DONE     ;
            inc     mtemph              ; increase the counter high byte
            jr      nz,COUNTER2DONE     ;
            call    WRITEMEMORY         ; store the value
            inc     address             ; get the next bytes
            call    READMEMORY          ; read the data
            inc     mtempl              ; increase the counter low byte
            jr      nz,COUNTER2DONE     ;
            inc     mtemph              ; increase the vounter high byte
COUNTER2DONE:
            call    WRITEMEMORY         ; save the value
            ld      address,#1CH        ;
            call    READMEMORY          ; read the data

            and     mtemph,#00001111B   ; find the force address
            or      mtemph,#30H         ;
            ld      ADDRESS,MTEMPH      ; set the address
            ld      mtempl,DNFORCE      ; read the forces
            ld      mtemph,UPFORCE      ;
            call    WRITEMEMORY         ; write the value
            jr      CDONE               ; done set the back trace
COUNTER1DONE:
            call    WRITEMEMORY         ; got the new address
CDONE:
            ld      address,#1CH        ; get the first byte
            call    READMEMORY          ;
            and     mtempl,#00001111b   ; find the address
            ld      address,#20H        ;
            add     address,mtempl      ;
            ld      mtemph,STACKREASON  ;
            or      mtemph,STATE        ; or in the state
            call    WRITEMEMORY         ; write the value to stack
            clr     SKIPRADIO           ; clear skip flag

NOCHANGEST:
            call    LEARN               ; do the learn switch
            di
            cp      BRPM_COUNT,RPM_COUNT
            jr      z,TESTRPM
RESET:
            jp      START
TESTRPM:
            cp      BRPM_TIME_OUT,RPM_TIME_OUT
            jr      nz,RESET
            cp      BFORCE_IGNORE,FORCE_IGNORE
            jr      nz,RESET
            ei
```

5,780,987

45 46

```
            di
            cp      BAUTO_DELAY_HI,AUTO_DELAY_HI
            jr      nz,RESET
            cp      BAUTO_DELAY_LO,AUTO_DELAY_LO
            jr      nz,RESET
            cp      BCMD_DEB,CMD_DEB
            jr      nz,RESET
            cp      BSTATE,STATE
            jr      nz,RESET
            ei
TESTRS232:
            cp      RSSTART,#0FFH           ; test for starting a transmission
            jr      z,skiprs232             ; if starting a trans skip
            cp      RSCOMMAND,#0FFH         ; test for the off mode
            jr      z,skiprs232
            cp      RS232DOCOUNT,#11d       ; test for output done
            jr      nz,skiprs232            ; if not the skip
            cp      RSCOMMAND,#30H          ; test for switch data
            jr      nz,TEST31
            clr     RS232DO                 ; clear the data

            tm      p2,#UP_LIMIT            ; test for up limit
            jr      nz,UPLIMOPEN
            or      RS232DO,#00000001B      ; set the marking bit
UPLIMOPEN:
            tm      p2,#DN_LIMIT            ; test for the down limit
            jr      nz,DNLIMOPEN            ;
            or      RS232DO,#00000010B      ; set the marking bit
DNLIMOPEN:
            cp      CMD_DEB,#0FFH           ; test for the command set
            jr      nz,CMDSWOPEN
            or      RS232DO,#00000100B      ; set the marking bit
CMDSWOPEN:
            cp      LIGHT_DEB,#0FFH         ; test for the worklight set
            jr      nz,WLSWOPEN
            or      RS232DO,#00001000B      ; set the marking bit
WLSWOPEN:
            cp      VAC_DEB,#0FFH           ; test fir the vacation set
            jr      nz,VACSWOPEN            ;
            or      RS232DO,#00010000B      ; set the marking bit
VACSWOPEN:
            dec     RSSTART                 ; set the start flag
            ld      RSCOMMAND,#0FFH         ; turn off command
                                            ; return
skiprs232:
            jp      SKIPRS232

TEST31:
            cp      RSCOMMAND,#31H          ; test for status data
            jr      nz,TEST32
            ld      RS232DO,STATE           ; read the state
            cp      LEARNT,#0FFH            ; test for learn mode
            jr      z,NOTINLEARN
            or      RS232DO,#00010000B      ;
NOTINLEARN:
            cp      VACFLAG,#00H            ; test the vacation flag
```

5,780,987

47 48

```
            jr      z,NOTINVACATION
            or      RS232DO,#00100000B          ;
NOTINVACATION:
            tm      p0,#WORKLIGHT               ; test for the light on
            jr      z,LIGHTISOFF
            or      RS232DO,#01000000B          ; mark the bit
LIGHTISOFF:
            tm      AOBSF,#00000001B            ; test for aobs error
            jr      z,AOBSFINE
            or      RS232DO,#10000000B          ;
AOBSFINE:
            jr      VACSWOPEN

TEST32:
            cp      RSCOMMAND,#32H              ; test for rpm data
            jr      nz,TEST33
            ld      RS232DO,RPM_PERIOD_LO       ;
            cp      RSCCOUNT,#01H               ; test for on transmitted last cycle
            jr      z,LASTRPM
            ld      RS232DO,RPM_PERIOD_HI       ;
STARTOUT:
            dec     RSSTART                     ; set the start flag
            inc     RSCCOUNT                    ; increase the count
            jr      skiprs232                   ; return
LASTRPM:    clr     RSCCOUNT                    ; reset the counter
            jp      VACSWOPEN                   ; return

TEST33:
            cp      RSCOMMAND,#33H              ; test for force data
            jr      nz,TEST34
            ld      RS232DO,UPFORCE             ;
            cp      RSCCOUNT,#00                ; test for the first byte
            jr      z,STARTOUT                  ; output
            ld      RS232DO,DNFORCE
            jr      LASTRPM                     ; output

TEST34:
            cp      RSCOMMAND,#34H              ; test for radio page
            jr      nz,TEST35
            ld      RS232PAGE,#00H              ;
            jr      RS232PAGEOUT
TEST35:
            cp      RSCOMMAND,#35H              ; test for force page data
            jr      nz,TEST36
            ld      RS232PAGE,#10H              ;
            jr      RS232PAGEOUT
TEST36:
            cp      RSCOMMAND,#36H              ; test for history page 1data
            jr      nz,TEST37
            ld      RS232PAGE,#20H              ;
            jr      RS232PAGEOUT
TEST37:
            cp      RSCOMMAND,#37H              ; test for history page 2 data
            jr      nz,TEST38
```

5,780,987

49 50

```
            ld      RS232PAGE,#30H

RS232PAGEOUT:
            ld      SKIPRADIO,#0FFH         ; set the skip radio flag
            ld      ADDRESS,RSCCOUNT        ; find the address
            rcf
            rrc     ADDRESS
            or      ADDRESS,RS232PAGE
            call    READMEMORY              ; read the data
            ld      RS232DO,MTEMPH
            tm      RSCCOUNT,#01H           ; test which byte
            jr      z,RPBYTE
            ld      RS232DO,MTEMPL
RPBYTE:
            clr     SKIPRADIO               ; turn off the skip radio
            cp      RSCCOUNT,#1FH           ; test for the end
            jp      z LASTRPM
            jp      STARTOUT

TEST38:
            cp      RSCOMMAND,#38H          ; test memory
            jr      nz,TEST39
            ld      RS232DO,#0FFH           ; flag set to error to start
            ld      SKIPRADIO,#0FFH         ; set the skip radio flag
            ld      MTEMPH,#0FFH            ; set the data to write
            ld      MTEMPL,#0FFH
            ld      ADDRESS,#00             ; start at address 00
WRITELOOP1:
            WDT
            cal     WRITEMEMORY
            inc     ADDRESS                 ; do the next address
            cp      ADDRESS,#40H            ; test for the last address
            jr      nz,WRITELOOP1
            ld      ADDRESS,#00             ; start at address 0
READLOOP1:
            WDT
            call    READMEMORY              ; read the data
            inc     MTEMPH                  ; test the high
            jr      nz,MEMORYERROR          ; if error mark
            inc     MTEMPL                  ; test the low
            jr      nz,MEMORYERROR          ; if error mark
            inc     ADDRESS                 ; set the next address
            cp      ADDRESS,#40H            ; test for the last address
            jr      nz,READLOOP1

            ld      MTEMPH,#000H            ; set the data to write
            ld      MTEMPL,#000H
            ld      ADDRESS,#00             ; start at address 00
WRITELOOP2:
            WDT
            call    WRITEMEMORY
            inc     ADDRESS                 ; do the next address
            cp      ADDRESS,#40H            ; test for the last address
            jr      nz,WRITELOOP2
            ld      ADDRESS,#00             ; start at address 0
READLOOP2:
```

5,780,987

51 52

```
            WDT
            call    READMEMORY          ; read the data
            cp      MTEMPH,#00          ; test the high
            jr      nz,MEMORYERROR      ; if error mark
            cp      MTEMPL,#00          ; test the low
            jr      nz,MEMORYERROR      ; if error mark
            inc     ADDRESS             ; set the next address
            cp      ADDRESS,#40H        ; test for the last address
            jr      nz,READLOOP2
            call    CLEARCODES
            clr     SKIPRADIO           ; clear the skip radio flag
            clr     RS232DO             ; flag all ok
MEMORYERROR:
            jp      VACSWOPEN
TEST39:
            cp      RSCOMMAND,#39H      ; test memory
            jr      nz,SKIPRS232
            ld      RSCOMMAND,#0FFH     ; turn off command
            call    SETLEARN
SKIPRS232:
            cp      R_DEAD_TIME,#20     ; test for too long dead
            jp      nz,MAINLOOP         ; if not loop
            clr     RADIOC              ; clear the radio counter
            clr     RFLAG               ; clear the radio flag
            jp      MAINLOOP            ; loop forever


;*****************************************************************
; Radio interrupt from a edge of the radio signal
;*****************************************************************

RADIO_INT:
            push    RP                  ; save the radio pair
            srp     #RADIO_GRP          ; set the register pointer

            ld      rtemph,T0EXT        ; read the upper byte
            ld      rtempl,T0           ; read the lower byte
            tm      IRQ,#00010000B      ; test for pending int
            jr      z,RTIMEOK           ; if not then ok time
            tm      rtempl,#10^000000B  ; test for timer reload
            jr      z,RTIMEOK           ; if not reloaded then ok
            dec     rtemph              ; if reloaded then dec high for sync
RTIMEOK:
            clr     R_DEAD_TIME         ; clear the dead time
            and     IMR,#11111110B      ; turn off the radio interrupt
            ld      rtimedh,rtimeph     ; find the difference
            ld      rtimedl,rtimepl     ;
            sub     rtimedl,rtempl      ;
            sbc     rtimedh,rtemph      ; in the past time and the past time in temp
            tm      rtimedh,#10000000B  ; test for a negitive number
            jr      z,RTIMEDONE         ; if the number is not negitive then done
            ld      rtimedh,rtemph      ; find the difference
            ld      rtimedl,rtempl      ;
```

5.780.987

53 54

```
            sub     rtimedl,rtimepl         ;
            sbc     rtimedh,rtimeph         ; in the past time and the past time in temp
RTIMEDONE:
            tm      P3,#00000100B           ; test the port for the edge
            jr      nz,ACTIVETIME           ; if it was the active time then branch
INACTIVETIME:
            cp      RINFILTER,#0FFH         ; test for active last time
            jr      z,GOINACTIVE            ; if so continue
            jr      RADIO_EXIT              ; if not the return
GOINACTIVE:
            or      IRQ,#01000000B          ; set the bit setting direction to pos edge
            clr     RINFILTER               ; set flag to inactive
            ld      rtimeih,rtimedh         ; transfer difference to inactive
            ld      rtimeil,rtimedl         ;
            ld      rtimeph,rtemph          ; transfer temp into the past
            ld      rtimepl,rtempl          ;
            jr      RADIO_EXIT              ; return
ACTIVETIME:
            cp      RINFILTER,#00H          ; test for active last time
            jr      z,GOACTIVE              ; if so continue
            jr      RADIO_EXIT              ; if not the return
GOACTIVE:
            and     IRQ,#00111111B          ; clear the bit setting direction to neg edge
            ld      RINFILTER,#0FFH         ;
            ld      rtimeah,rtimedh         ; transfer difference to active
            ld      rtimeal,rtimedl         ;
            ld      rtimeph,rtemph          ; transfer temp into the past
            ld      rtimepl,rtempl          ;
            ei
            cp      radioc,#00H             ; test for blank time
            jr      nz,INSIGNAL             ; if the count is not zero then we are in signal
MEASUREBLANK:
            cp      rtimeih,#110D           ; test the timer for > 55mS
            jp      ugt,CLEARRADIO          ; if > 55 then clear the radio
            cp      rtimeih,#40D            ; test the timer for < 20mS
            jp      ult,CLEARRADIO          ; if < 20mS then clear the radio
            cp      rtimeah,#03H            ; test the sync pulse for a 3mS period first > 1
            jr      ugt SETREC3MS           ; if 2mS or greater then 3mS sync code
            jr      nz,SETREC1MS            ; if less then 1 then it is a 1mS sync code
            cp      rtimeal,#09DH           ; test for 1.85 "middle value 2"
            jr      ugt,SETREC3MS           ; if greater then set a 3
SETREC1MS:
            tm      RFLAG,#00010000B        ; test for the reception of the 1mS code
            jr      z,SETFIRST1MS           ; if the bit is not set then this is the first 1ms
            and     RFLAG,#10111111B        ; clear the flag so writing into 3mS word
            or      RFLAG,#00100000B        ; set the flag saying 2nd 1mS word
            clr     radio3h                 ; clear the last reception
            clr     radio3l                 ;
            jr      INCCOUNT                ; then inc the count for insignal
SETFIRST1MS:
            or      RFLAG,#01000000B        ; set the flag for the first 1mS word
            clr     radio1h                 ; clear the last reception
            clr     radio1l                 ;
            jr      INCCOUNT                ; then inc the count for insignal
SETREC3MS:
            and     RFLAG,#10111111B        ; clear the flag so writing into 3mS word
```

5,780,987

55 56

```
            clr     radio3h             ; clear the last reception
            clr     radio3l             ;
INCCOUNT:
            inc     radioc              ; set the counter to the next word
            jr      RADIO_EXIT

RADIO_EXIT: pop     RP                  ; reset the register pair
            iret

INSIGNAL:
            cp      rtimeah,#9D         ; test the radio pulse width for 4.5mS
            jp      ugt,CLEARRADIO      ; if greater then 4.5 then clear the radio
PULSEWOK:
            cp      rtimeih,#9D         ; test the radio blank width for 4.5mS
            jp      ugt,CLEARRADIO      ; if greater then 4.5 then clear the radio
BLANKWOK:
            ld      rtemph,rtimeih      ; transfer pulse time to temp reg
            ld      rtempl,rtimeil      ;
            sub     rtempl,rtimeal      ; subtract the pulse from the blank
            sbc     rtemph,rtimeah      ;
            jr      c,NEGDIFF           ; if the difference is negitive then branch
            cp      rtemph,#01H         ; test for a number 1
            jr      ugt,SETTO0          ; if greater then set 0
            jr      ult,SETTO1          ; if less then 1 set to 1
            tm      rtempl,#10000000B   ; test for 80 or greater
            jr      z,SETTO1            ; if the diff is less then 80h
            jr      SETTO0              ; else set to a zero
NEGDIFF:
            ld      rtemph,rtimeah      ; transfer pulse time to temp reg
            ld      rtempl,rtimeal      ;
            sub     rtempl,rtimeil      ; subtract the pulse from the blank
            sbc     rtemph,rtimeih      ;
            cp      rtemph,#01H         ; test for a number 1
            jr      ugt,SETTO2          ; if greater then set 2
            jr      ult,SETTO1          ; if less then 1 set to 1
            tm      rtempl,#10000000B   ; test for 80 or greater
            jr      z,SETTO1            ; if the diff is less then 80h one
            jr      SETTO2              ; else set to a two
SETTO0:
            ld      RTEMP,#00D          ; set the bit value to a 00
            jr      INCRECORD           ; goto adding into the record
SETTO1:
            ld      RTEMP,#01D          ; set the bit value to a 01
            jr      INCRECORD           ; goto adding into the record
SETTO2:
            ld      RTEMP,#02D          ; set the bit value to a 10
            jr      INCRECORD           ; goto adding into the record

INCRECORD:
            tm      RFLAG,#01000000B    ; test the radio flag for the area to be modifing
            jr      z,MS3RECORD         ; if the bit is cleared then working the 3ms
            ld      rtemph,radio1h      ; transfer the record to temp
            ld      rtempl,radio1l      ;
            add     radio1l,rtempl      ; add the number to it self 2* for for base 3
            adc     radio1h,rtemph      ;
            add     radio1l,rtempl      ;
```

```
            adc     radio1h,rtemph          ;
            add     radio1l,rtemp           ;
            adc     radio1h,#00h            ;
            inc     radioc                  ; increase the radio counter
            cp      radioc,#11D             ; test for the last bit
            jr      z,GOTAWORD              ; if so we got a word
            jp      ugt,CLEARRADIO          ; else garbage
            jr      RADIO_EXIT              ; else return till the next bit comes along
MS3RECORD:
            ld      rtemph,radio3h          ; transfer the record to temp
            ld      rtempl,radio3l          ;
            add     radio3l,rtempl          ; add the number to it self 2* for for base 3
            adc     radio3h,rtemph          ;
            add     radio3l,rtempl          ;
            adc     radio3h,rtemph          ;
            add     radio3l,rtemp           ; add in the new value
            adc     radio3h,#00D            ;
            inc     radioc                  ; increase the radio counter
            cp      radioc,#11D             ; test for the last bit
            jr      z,GOTAWORD              ; if so we got a word
            jp      RADIO_EXIT              ; else return till the next bit comes along
GOTAWORD:
            tm      RFLAG,#01000000B        ; test the radio flag for the area we just modifing
            jr      z,MARK3REC              ; if the bit is cleared then the 3ms is filled
            or      RFLAG,#00010000B        ; set the flag
            jr      TESTFORTWO              ; jump to test for two codes
MARK3REC:
            or      RFLAG,#00001000B        ; set the flag
            jr      TESTFORTWO              ; jump to test for two codes
DONEONE:
            clr     radioc                  ; clear the radio counter
            jp      RADIO_EXIT              ; return
TESTFORTWO:
            tm      RFLAG,#00010000B        ; test for the 1mS word
            jr      z,DONEONE               ; we just have one code done
            tm      RFLAG,#00001000B        ; test for the 3mS word
            jr      z,DONEONE               ; we just have one code done
            tm      RFLAG,#00100000B        ; test the flag for BC
            jr      z,KNOWCODE              ; if A code we do nothing
            or      RFLAG,#00000010B        ; set the B and C flag
            cp      rtemp,#00               ; test word 10 for a 0 "C" code
            jp      z,KNOWCODE              ; if a C code were done
            or      RFLAG,#00000100B        ; set the B code flag
brec:
            cp      ZZWIN,#64D              ; test for 8 seconds from known B code
            jr      ugt,KNOWCODE            ; if not skip test
            cp      STATE,#6                ; test for the stopped state
            jr      z,timezzwin             ; if stopped test zzwin
            cp      STATE,#5                ; test for the down limit
            jr      z,timezzwin             ; if at the down limit
            cp      STATE,#2                ; test for at up limit,
            jr      z,timezzwin             ; if at the limit jump
            jr      KNOWCODE                ; else no way
timezzwin:
```

5,780,987

59 60

```
        cp      radio3h,#90H        ; test for the 00 code
        jr      nz,KNOWCODE         ;
        cp      radio3l,#29H        ; test for the 00 code
        jr      nz,KNOWCODE         ;
;SETFB:
        push    RP
        srp     #LEARNEE_GRP
        call    SETLEARN
        pop     RP
        jp      CLEARRADIO
KNOWCODE:
        clr     RRTO                ; clear the got a radio flag
        cp      SKIPRADIO,#0FFH     ; test for the skip flag
        jp      z,CLEARRADIO        ; if skip flag is active then donot look at EE mem

        ld      ADDRESS,#1EH        ; set the non vol address to the VAC flag
        call    READMEMORY          ; read the value
        ld      VACFLAG,MTEMPH      ; save into volital
        cp      LEARNT,#0FFH        ; test for in learn mode
        jr      z,TESTCODE          ; if out of learn mode then test for matching
STORECODE:
        cp      PRADIO1H,radio1h    ; test for the match
        jr      nz,STORENOTMATCH    ; if not a match then loop again
        cp      PRADIO1L,radio1l    ; test for the match
        jr      nz,STORENOTMATCH    ; if not a match then loop again
        cp      PRADIO3H,radio3h    ; test for the match
        jr      nz,STORENOTMATCH    ; if not a match then loop again
        cp      PRADIO3L,radio3l    ; test for the match
        jr      nz,STORENOTMATCH    ; if not a match then loop again
        call    TESTCODES           ; test the code to see if in memory now
        cp      ADDRESS,#0FFH       ;
        jr      nz,NOWRITESTORE     ; if there is a match pretend to store

STOREMATCH:
        tm      RFLAG,#00000100B    ; test for the b code
        jr      nz,BCODE            ; if a B code jump
        tm      RFLAG,#00000010B    ; test for a C code
        jr      nz,CCODE            ; if a C code jump
ACODE:
        ld      ADDRESS,#1FH        ; set the address to read the last written
        call    READMEMORY          ; read the memory
        inc     MTEMPH              ; add 2 to the last written
        inc     MTEMPH              ;
        and     MTEMPH,#11111110B   ; set the address on a even number
        cp      MTEMPH,#17H         ; test for the last address
        jr      ult,GOTAADDRESS     ; if not the last address jump
        ld      MTEMPH,#00D         ; set the address to 0
GOTAADDRESS:
        ld      ADDRESS,#1FH        ; set the address to write the last written
        ld      RTEMP,MTEMPH        ; save the address
        LD      MTEMPL,MTEMPH       ; both bytes same
        call    WRITEMEMORY         ; write it
        ld      ADDRESS,rtemp       ; set the address
        jr      READYTOWRITE        ;
BCODE:
        cp      radio3h,#90H        ; test for the 00 code
```

5,780,987

61 62

```
        jr      nz,BCODEOK          ;
        cp      radio3l,#29H        ; test for the 00 code
        jr      nz,BCODEOK          ;
        jp      CLEARRADIO          ; SKIP MAGIC NUMBER
BCODEOK:
        ld      ADDRESS,#18H        ; set the address for the B code
        jr      READYTOWRITE        ;
CCODE:
        ld      ADDRESS,#1AH        ; set the address for the C code
READYTOWRITE:
        call    WRITECODE           ; write the code in radio1 and radio3
NOWRITESTORE:
        xor     p0,#WORKLIGHT       ; toggle light
        or      ledport,#ledh       ; turn off the LED for program mode
        ld      LIGHT1S,#244D       ; turn on the 1 second blink
        ld      LEARNT,#0FFH        ; set learnmode timer
        clr     RTO                 ; disallow cmd from learn
        jp      CLEARRADIO          ; return
STORENOTMATCH:
        ld      PRADIO1H,radio1h    ; transfer radio into past
        ld      PRADIO1L,radio1l    ;
        ld      PRADIO3H,radio3h    ;
        ld      PRADIO3L,radio3l    ;
        jp      CLEARRADIO          ; get the next code


TESTCODE:
        cp      FAULTFLAG,#0FFH     ; test for a active fault
        jr      z,FS1               ; if a avtive fault skip led set and reset
        and     ledport,#ledl       ; turn on the LED for flashing from signal
FS1:
        call    TESTCODES           ; test the codes
        cp      FAULTFLAG,#0FFH     ; test for a active fault
        jr      z,FS2               ; if a avtive fault skip led set and reset
        or      ledport,#ledh       ; turn off the LED for flashing from signal
FS2:
        cp      ADDRESS,#0FFH       ; test for the not matching state
        jr      nz,GOTMATCH         ; if matching the send a command if needed
        jp      CLEARRADIO          ; else clear the radio
GOTMATCH:
        or      RFLAG,#00000001B    ; set the flag for recieving without error
        cp      RTO,#101D           ; test for the timer time out
        jr      ult,NOTNEWMATCH     ; if the timer is active then donot reissue cmd
TESTVAC:
        cp      VACFLAG,#00B        ; test for the vacation mode
        jr      z,TSTSDISABLE       ; if not in vacation mode test the system disable

        cp      ADDRESS,#19H        ; test for the B code
        jr      nz,NOTNEWMATCH      ; if not a B not a match
TSTSDISABLE:
        cp      SDISABLE,#32D       ; test for 4 second
        jr      ult,NOTNEWMATCH     ; if 6 s not up not a new code
        clr     RTO                 ; clear the radio timeout
        cp      ONEP2,#00           ; test for the 1.2 second time out
        jr      nz,NOTNEWMATCH      ; if the timer is active then skip the command
```

5,780,987

63 64

```
RADIOCOMMAND:
        clr     RTO                     ; clear the radio timeout
        cp      ADDRESS,#19H            ; test for a B code
        jr      nz,BDONTSET             ; if not a b code donot set flag
zzwinclr:
        clr     ZZWIN                   ; flag got matching B code

        ld      BCODEFLAG,#077H         ; flag for aobs bypass
BDONTSET:

        clr     LAST_CMD                ; mark the last command as radio
        ld      RADIO_CMD,#0AAH         ; set the radio command
        jr      CLEARRADIO              ; return
TESTCODES:
        clr     ADDRESS                 ; start address is 0
NEXTCODE:
        call    READMEMORY              ; read the word at this address
        cp      MTEMPH,radio1h          ; test for the match
        jr      nz,NOMATCH              ; if not matching then do next address
        cp      MTEMPL,radio1l          ; test for the match
        jr      nz,NOMATCH              ; if not matching then do next address
        inc     ADDRESS                 ; set the second half of the code
        call    READMEMORY              ; read the word at this address
        cp      MTEMPH,radio3h          ; test for the match
        jr      nz,NOMATCH2             ; if not matching then do the next address
        cp      MTEMPL,radio3l          ; test for the match
        jr      nz,NOMATCH2             ; if not matching then do the next address
        ret                             ; return with the address of the match
NOMATCH:
        inc     ADDRESS                 ; set the address to the next code
NOMATCH2:
        inc     ADDRESS                 ; set the address to the next code
        cp      ADDRESS,#1CH            ; test for the last address
        jr      ult,NEXTCODE            ; if not the last address then try again
GOTNOMATCH:
        ld      ADDRESS,#0FFH           ; set the no match flag
        ret                             ; and return

NOTNEWMATCH:
        clr     RTO                     ; reset the radio time out
        and     RFLAG,#00000001B        ; clear radio flags leaving recieving w/o error
        clr     radioc                  ; clear the radio bit counter
        ld      LEARNT,#0FFH            ; set the learn timer "turn off" and backup
        jp      RADIO_EXIT              ; return
CLEARRADIO:
        and     IRQ,#00111111B          ; clear the bit setting direction to neg edge
        ld      RINFILTER,#0FFH         ; set flag to active
CLEARRADIOA:
        tm      RFLAG,#00000001B        ; test for receiving without error
        jr      z,SKIPRTO               ; if flag not set then donot clear timer
        clr     RTO                     ; clear radio timer
SKIPRTO:
```

```
            clr     radioc              ; clear the radio counter
            clr     RFLAG               ; clear the radio flag
            jp      RADIO_EXIT          ; return

;*****************************************************************
; LEARN DEBOUNCES THE LEARN SWITCH 80mS
; TIMES OUT THE LEARN MODE 30 SECONDS
; DEBOUNCES THE LEARN SWITCH FOR ERASE 6 SECONDS
;*****************************************************************
LEARN:
            srp     #LEARNEE_GRP        ; set the register pointer
            cp      STATE,#DN_POSITION  ; test for motor stoped
            jr      z,TESTLEARN         ;
            cp      STATE,#UP_POSITION  ; test for motor stoped
            jr      z,TESTLEARN         ;
            cp      STATE,#STOP         ; test for motor stoped
            jr      z,TESTLEARN         ;
            ld      learnt,#0FFH        ; set the learn timer
            cp      learnt,#240D        ; test for the learn 30 second timeout
            jr      nz,ERASETEST        ; if not then test erase
            jr      learnoff            ; if 30 seconds then turn off the learn mode
TESTLEARN:
            cp      learndb,#236D       ; test for the debounced release
            jr      nz,LEARNNOTRELEASED ; if the debouncer not released then jump

            clr     learndb             ; clear the debouncer

            ret                         ; return

LEARNNOTRELEASED:
            cp      learnt,#0FFH        ; test for learn mode
            jr      nz,INLEARN          ; if in learn jump
            cp      learndb,#20D        ; test for debounce period
            jr      nz,ERASETEST        ; if not then test the erase period
SETLEARN:
            clr     learnt              ; clear the learn timer
            ld      learndb,#0FFH       ; set the debouncer
            and     ledport,#ledi       ; turn on the led
            clr     VACFLAG             ; clear vacation mode
            ld      address,#1EH        ; set the non vol address for vacation
            clr     mtemph              ; clear the data for cleared vacation
            clr     mtempl              ;
            ld      skipradio,#0FFH     ; set the flag
            call    WRITEMEMORY         ; write the memory
            clr     skipradio           ; clear the flag
ERASETEST:
            cp      learndb,#0FFH       ; test for learn button active
            jr      nz,ERASERELEASE     ; if button released set the erase timer
            cp      eraset,#0FFH        ; test for timer active
            jr      nz,ERASETIMING      ; if the timer active jump
            clr     eraset              ; clear the erase timer
ERASETIMING:
            cp      eraset,#48D         ; test for the erase period
            jr      z,ERASETIME         ; if timed out the erase
            ret                         ; else we return
```

```
ERASETIME:
        or      ledport,#ledh           ; turn off the led
        ld      skipradio,#0FFH         ; set the flag to skip the radio read
        call    CLEARCODES              ; clear all codes in memory
        clr     skipradio               ; reset the flag to skip radio

        ld      learnt,#0FFH            ; set the learn timer
        ret                             ; return

ERASERELEASE:
        ld      erasel,#0FFH            ; turn off the erase timer
        ret                             ; return

INLEARN:
        cp      learndb,#20D            ; test for the debounce period
        jr      nz,TESTLEARNTIMER       ; if not then test the learn timer for time out
        ld      learndb,#0FFH           ; set the learn db
TESTLEARNTIMER:
        cp      learnt,#240D            ; test for the learn 30 second timeout
        jr      nz,ERASETEST            ; if not then test erase
learnoff:
        or      ledport,#ledh           ; turn off the led
        ld      learnt,#0FFH            ; set the learn timer
        ld      learndb,#0FFH           ; set the learn debounce
        jr      ERASETEST               ; test the erase timer

;*****************************************************************
; WRITE WORD TO MEMORY
; ADDRESS IS SET IN REG ADDRESS
; DATA IS IN REG MTEMPH AND MTEMPL
; RETURN ADDRESS IS UNCHANGED
;*****************************************************************
WRITEMEMORY:
        push    RP                      ; SAVE THE RP
        srp     #LEARNEE_GRP            ; set the register pointer

        call    STARTB                  ; output the start bit
        ld      serial,#00110000B       ; set byte to enable write
        call    SERIALOUT               ; output the byte
        and     csport,#csl             ; reset the chip select
        call    STARTB                  ; output the start bit
        ld      serial,#01000000B       ; set the byte for write
        or      serial,address          ; or in the address
        call    SERIALOUT               ; output the byte
        ld      serial,mtemph           ; set the first byte to write
        call    SERIALOUT               ; output the byte
        ld      serial,mtempl           ; set the second byte to write
        call    SERIALOUT               ; output the byte
        call    ENDWRITE                ; wait for the ready status
        call    STARTB                  ; output the start bit
        ld      serial,#00000000B       ; set byte to disable write
        call    SERIALOUT               ; output the byte
        and     csport,#csl             ; reset the chip select
```

5,780,987

69 70

```
            pop     RP                      ; reset the RP
            ret

;*****************************************************************
; READ WORD FROM MEMORY
; ADDRESS IS SET IN REG ADDRESS
; DATA IS RETURNED IN REG MTEMPH AND MTEMPL
; ADDRESS IS UNCHANGED
;*****************************************************************
READMEMORY:
            push    RP                      ;
            srp     #LEARNEE_GRP            ; set the register pointer

            call    STARTB                  ; output the start bit
            ld      serial,#10000000B       ; preamble for read
            or      serial,address          ; or in the address
            call    SERIALOUT               ; output the byte
            call    SERIALIN                ; read the first byte
            ld      mtemph,serial           ; save the value in mtemph
            call    SERIALIN                ; read teh second byte
            ld      mtempl,serial           ; save the value in mtempl
            and     csport,#csl             ; reset the chip select
            pop     RP                      ;
            ret

;*****************************************************************
; WRITE CODE TO 2 MEMORY ADDRESS
; CODE IS IN RADIO1H RADIO1L RADIO3H RADIO3L
;*****************************************************************
WRITECODE:
            push    RP                      ;
            srp     #LEARNEE_GRP            ; set the register pointer
            ld      mtemph,RADIO1H          ; transfer the data from radio 1 to the temps
            ld      mtempl,RADIO1L          ;
            call    WRITEMEMORY             ; write the temp bits
            inc     address                 ; next address
            ld      mtemph,RADIO3H          ; transfer the data from radio 3 to the temps
            ld      mtempl,RADIO3L          ;
            call    WRITEMEMORY             ; write the temps
            pop     RP                      ;
            ret                             ; return

;*****************************************************************
; CLEAR ALL RADIO CODES IN THE MEMORY
;*****************************************************************

CLEARCODES:
            push    RP                      ;
            srp     #LEARNEE_GRP            ; set the register pointer
            ld      RADIO1H,#0FFH           ; set the codes to illegal codes
            ld      RADIO1L,#0FFH           ;
            ld      RADIO3H,#0FFH           ;
            ld      RADIO3L,#0FFH           ;
            ld      address,#00H            ; clear address 0
CLEARC:
            call    WRITECODE               ; "A0"
```

```
            inc     address             ; set the next address
            cp      address,#1BH        ; test for the last address of radio
            jr      ult CLEARC
            clr     mtemph              ; clear data
            clr     mtempl
            ld      address,#1FH        ; clear address F
            call    WRITEMEMORY         ;
            pop     RP                  ;
            ret                         ; return

;*****************************************************************
; START BIT FOR SERIAL NONVOL
; ALSO SETS DATA DIRECTION AND AND CS
;*****************************************************************
STARTB:
            and     csport,#csl         ;
            and     clkport,#clockl     ; start by clearing the bits
            and     dioport,#dol        ;
            ld      P2M,#(P2M_INIT+0)   ; set port 2 mode forcing output mode data
            or      csport,#csh         ; set the chip select
            or      dioport,#doh        ; set the data out high
            or      clkport,#clockh     ; set the clock
            and     clkport,#clockl     ; reset the clock low
            and     dioport,#dol        ; set the data low
            ret                         ; return

;*****************************************************************
; END OF CODE WRITE
;*****************************************************************
ENDWRITE:
            and     csport,#csl         ; reset the chip select
            nop                         ; delay
            or      csport,#csh         ; set the chip select
            ld      P2M,#(P2M_INIT+4)   ; set port 2 mode forcing input mode data
ENDWRITELOOP:
            ld      temph,dioport       ; read the port
            and     temph,#doh          ; mask
            jr      z,ENDWRITELOOP      ; if the bit is low then loop till we are done
            and     csport,#csl         ; reset the chip select
            ld      P2M,#(P2M_INIT+0)   ; set port 2 mode forcing output mode
            ret

;*****************************************************************
; SERIAL OUT
; OUTPUT THE BYTE IN SERIAL
;*****************************************************************
SERIALOUT:
            ld      P2M,#(P2M_INIT+0)   ; set port 2 mode forcing output mode data
            ld      templ,#8H           ; set the count for eight bits
SERIALOUTLOOP:
            rlc     serial              ; get the bit to output into the carry
            jr      nc,ZEROOUT          ; output a zero if no carry
ONEOUT:
            or      dioport,#doh        ; set the data out high
```

5,780,987

73 74

```
            or      clkport,#clockh         ; set the clock high
            and     clkport,#clockl         ; reset the clock low
            and     dioport,#dol            ; reset the data out low
            djnz    templ,SERIALOUTLOOP
                                            ; loop till done
            ret                             ; return
ZEROOUT:
            and     dioport,#dol            ; reset the data out low
            or      clkport,#clockh         ; set the clock high
            and     clkport,#clockl         ; reset the clock low
            and     dioport,#dol            ; reset the data out low
            djnz    templ,SERIALOUTLOOP
                                            ; loop till done
            ret                             ; return

;*****************************************************************
; SERIAL IN
; INPUTS A BYTE TO SERIAL
;*****************************************************************
SERIALIN:
            ld      P2M,#(P2M_INIT+4)       ; set port 2 mode forcing input mode data
            ld      templ,#8H               ; set the count for eight bits
SERIALINLOOP:
            or      clkport,#clockh         ; set the clock high
            rcf                             ; reset the carry flag
            ld      temph,dioport           ; read the port
            and     temph,#don              ; mask out the bits
            jr      z,DONTSET
            scf                             ; set the carry flag
DONTSET:
            rlc     serial                  ; get the bit into the byte
            and     clkport,#clockl         ; reset the clock low
            djnz    templ,SERIALINLOOP
                                            ; loop till done
            ret                             ; return

;*****************************************************************
; TIMER UPDATE FROM INTERUPT EVERY 1mS
;*****************************************************************
TIMERUD:
            dec     T0EXT                   ; decrement the T0 extension
            inc     TASKSWITCH              ; set to the next switch
            and     TASKSWITCH,#00000111B   ; 0-7
            tm      TASKSWITCH,#00000001B   ; test for odd
            jr      nz,TK1357               ; if so then jump
            cp      TASKSWITCH,#2d          ; test for 2
            jr      z,TASK2
            cp      TASKSWITCH,#4d          ; test for 4
            jr      z,TASK4
            cp      TASKSWITCH,#6d          ; test for 6
            jr      z,TASK6
TASK0:
            or      IMR,#RETURN_IMR         ; turn on the interrupt
            ei
            push    rp                      ; save the rp
```

```
                srp     #TIMER_GROUP        ; set the rp for the switches
                call    switches            ; test the switches
                pop     rp
                iret

TASK2:
                or      IMR,#RETURN_IMR     ; turn on the interrupt
                ei
                push    rp                  ; save the rp
                srp     #TIMER_GROUP        ;
                call    STATEMACHINE        ; do the motor function
                pop     rp                  ; return the rp
                iret

TASK4:
                or      IMR,#RETURN_IMR     ; turn on the interrupt
                ei
                push    rp                  ; save the rp
                srp     #TIMER_GROUP        ; set the rp for the switches
                call    switches            ; test the switches
                pop     rp
                iret

TK1357:
                cp      TASKSWITCH,#05D     ; test for task 5
                jp      nz,TASK1357EXIT     ;
TASK5:
                cp      PWM_STATUS,#0FFH
                jr      ne,enable_t1        ;
                dec     PWM_OFF             ; discharge for at least 2x
                jr      nz,continue         ;
                ld      PWM_STATUS,#00H
enable_t1:
                ld      PWM_OFF,#14H        ;
                or      p3,#PWM_HI          ; take pwm pin high
                or      tmr,#TIMER_1_EN     ; enable t1
continue:
                jp      TASK1357EXIT        ; EXIT UPDATING TIMERS
TASK6:
                or      IMR,#RETURN_IMR     ; turn on the interrupt
                ei
                push    rp                  ; save the rp
                srp     #TIMER_GROUP        ;
                call    STATEMACHINE        ; do the motor function
                pop     rp                  ; return the rp
                iret

TASK1357EXIT
                push    RP
```

5,780,987

77 78

```
            or      IMR,#RETURN_IMR     ; turn on the interrupt
            ei
            call    RS232               ; do the rs232 buss
            tm      TASKSWITCH,#00000001B     ; test for state a 1 in b0
            jr      z,ONEMS
            tm      TASKSWITCH,#00000010B     ; test for state a 1 in b1
            jr      z,ONEMS
            srp     #TIMER_GROUP        ; if a 3 or 7 then do the auxlight
            call    AUXLIGHT            ;
ONEMS:
            srp     #LEARNEE_GRP        ; set the register pointer
            dec     AOBSTEST            ; decrease the aobs test timer
            jr      nz,NOFAIL           ; if the timer not at 0 then it didnot fail
            ld      AOBSTEST,#11d       ; if it failed reset the timer
            or      AOBSF,#00000001b    ; set the failed flag bit
NOFAIL:
            inc     t4ms                ; increment the 4mS timer
            inc     t125ms              ; increment the 125 mS timer
            cp      t4ms,#4D            ; test for the time out
            jp      nz,TEST125          ; if not true then jump
FOURMS:
            clr     t4ms                ; reset the timer
            cp      RPMONES,#00H        ; test for the end of the one sec timer
            jr      z,TESTPERIOD        ; if one sec over then test the pulses
                                        ; over the period
            dec     RPMONES             ; else decrease the timer
            di
            clr     RPM_COUNT           ; start with a count of 0
            clr     BRPM_COUNT          ; start with a count of 0
            ei
            jr      RPMTDONE
TESTPERIOD:
            cp      RPMCLEAR,#00H       ; test the clear test timer for 0
            jr      nz,RPMTDONE         ; if not timed out then skip
            ld      RPMCLEAR,#122d      ; set the clear test time for next cycle .5
            cp      RPM_COUNT,#50d      ; test the count for too many pulses
            jr      ugt,FAREV           ; if too man pulses then reverse
            di
            clr     RPM_COUNT           ; clear the counter
            clr     BRPM_COUNT_         ; clear the counter
            ei
;           clr     FAREVFLAG           ; clear the flag  temp test
            jr      RPMTDONE            ; continue
FAREV:
            ld      FAULTCODE,#06h      ; set the fault flag
            ld      FAREVFLAG,#088H     ; set the forced up flag
            and     p0,#^LB ^C WORKLIGHT ; turn off light
            ld      REASON,#80H         ; rpm forcing up motion
            call    SET_AREV_STATE      ; set the autorev state
RPMTDONE:
            dec     RPMCLEAR            ; decrement the timer
            cp      LIGHT1S,#00         ; test for the end
            jr      z,SKIPLIGHTE
            dec     LIGHT1S             ; down count the light time
SKIPLIGHTE:
```

5,780,987

79 80

```
            inc     R_DEAD_TIME
            cp      RTO,#101D           ; test for the radio time out
            jr      ult,DONOTCB         ; if not timed out donot clear b
            clr     BCODEFLAG           ; else clear the b code flag
DONOTCB:
            inc     RTO                 ; increment the radio time out
            jr      nz,RTOOK            ; if the radio timeout ok then skip
            dec     RTO                 ; back turn
RTOOK:
            cp      RRTO,#0FFH          ; test for roll
            jr      z,SKIPRRTO          ; if so then skip
            inc     RRTO
SKIPRRTO:                               ;
            ld      temp,psport         ; read the program switch
            and     temp,#psmask        ; mask for switch
            jr      z,PRSWCLOSED        ; if the switch is closed count up
            cp      learndb,#00         ; test for the non decrement point
            jr      z,LEARNDBOK         ; if at end skip dec
            dec     learndb             ;
            jr      LEARNDBOK           ;
PRSWCLOSED:
            inc     learndb             ; increase the learn debounce timer
            cp      learndb,#0H         ; test for overflow
            jr      nz,LEARNDBOK        ; if not 0 skip back turning
            dec     learndb             ;
LEARNDBOK:
TEST125:
            cp      t125ms,#125D        ; test for the time out
            jr      z,ONE25MS           ; if true the jump
            cp      t125ms,#63D         ; test for the other timeout
            jr      nz,N125
            call    FAULTB
N125:
            pop     RP
            iret
ONE25MS:
            cp      AUXLEARNSW,#0FFh    ; test for the rollover position
            jr      z,SKIPAUXLEARNSW    ; if so then skip
            inc     AUXLEARNSW          ; increase
SKIPAUXLEARNSW:
            cp      ZZWIN,#0FFH         ; test for the roll position
            jr      z,TESTFA            ; if so skip
            inc     ZZWIN               ; if not increase the counter
TESTFA:
            call    FAULTB              ; call the fault blinker
            clr     t125ms              ; reset the timer
            inc     DOG2                ; incrwease the second watch dog
            di
            inc     SDISABLE            ; count off the system disable timer
            jr      nz,DO12             ; if not rolled over then do the 1.2 sec
            dec     SDISABLE            ; else reset to FF
DO12:
            cp      ONEP2,#00           ; test for 0
            jr      z,INCLEARN          ; if counted down then increment learn
```

5,780,987

81 82

```
                dec     ONEP2           ; else down count
INCLEARN:
                inc     learnt          ; increase the learn timer
                cp      learnt,#0H      ; test for overflow
                jr      nz,LEARNTOK     ; if not 0 skip back turning
                dec     learnt          ;
LEARNTOK:
                ei
                inc     eraset          ; increase the erase timer
                cp      eraset,#0H      ; test for overflow
                jr      nz,ERASETOK     ; if not 0 skip back turning
                dec     eraset          ;
ERASETOK:
                pop     RP
                iret

;       fault blinker

FAULTB:
                inc     FAULTTIME       ; increase the fault timer
                cp      FAULTTIME,#80h  ; test for the end
                jr      nz,FIRSTFAULT   ; if not timed out
                clr     FAULTTIME       ; reset the clock
                clr     FAULT           ; clear the fault
                cp      FAULTCODE,#05h  ; test for call dealer code
                jr      UGE,GOTFAULT    ; set the fault
                cp      CMD_DEB,#0FFH   ; test the debouncer
                jr      nz,TESTAOBSM    ; if not set test aobs
                cp      FAULTCODE,#03h  ; test for command shorted
                jr      z,GOTFAULT      ; set the error
                ld      FAULTCODE,#03h  ; set the code
                jr      FIRSTFAULT      ;
TESTAOBSM:
                tm      AOBSF,#00000001b ; test for the skiped aobs pulse
                jr      z,NOAOBSFAULT   ; if no skips then no faults
                tm      AOBSF,#00000010b ; test for any pulses
                jr      z,NOPULSE       ; if no pulses find if hi or low
                                        ; else we are intermittent
                ld      FAULTCODE,#04h  ; set the fault
                jr      GOTFAULT        ; if same got fault
;               cp      FAULTCODE,#04h  ; test the last fault
;               jr      z,GOTFAULT      ; if same got fault
;               ld      FAULTCODE,#04h  ; set the fault
;               jr      FIRSTFC         ;
NOPULSE:        tm      P3,#00000001b   ; test the input pin
                jr      z,AOBSSH        ; jump if aobs is stuck hi
                cp      FAULTCODE,#01h  ; test for stuck low in the past
                jr      z,GOTFAULT      ; set the fault
                ld      FAULTCODE,#01h  ; set the fault code
                jr      FIRSTFC         ;
AOBSSH:         cp      FAULTCODE,#02h  ; test for stuck high in past
                jr      z,GOTFAULT      ; set the fault
                ld      FAULTCODE,#02h  ; set the code
                jr      FIRSTFC         ;
GOTFAULT:       ld      FAULT,FAULTCODE ; set the code
```

5,780,987

83 84

```
                swap    FAULT                   ;
                jr      FIRSTFC                 ;
NOAOBSFAULT:
                clr     FAULTCODE               ; clear the fault code
FIRSTFC:        clr     AOBSF                   ; clear flags
FIRSTFAULT:
                cp      FAULT,#00               ; test for no fault
                jr      z,NOFAULT
                ld      FAULTFLAG,#0FFH         ; set the fault flag
                cp      LEARNT,#0FFH            ; test for not in learn mode
                jr      nz,TESTSDI              ; if in learn then skip setting
                cp      FAULT,FAULTTIME         ;
                jr      ULE,TESTSDI

                tm      FAULTTIME,#00001000b            ; test the 1 sec bit
                jr      nz,BITONE
                and     ledport,#ledl           ; turn on the led
                ret
BITONE:
                or      ledport,#ledh           ; turn off the led
TESTSDI:
                ret
NOFAULT:        clr     FAULTFLAG               ; clear the flag
                ret
;-----------------------------------------------------------------
; MOTOR STATE MACHINE
;-----------------------------------------------------------------

STATEMACHINE:
        call    RS232
        xor     p0,#00001000b           ; toggle aux output
        dec     FORCE_PRE               ; dec the prescaler
        cp      DOG2,#8d                ; test the 2nd watchdog for problem
        jp      ugt,START               ; if problem reset
        cp      STATE,#06d              ; test for legal number
        jp      ugt,start               ; if not the reset
        jp      z,stop                  ; stop motor            6
        cp      STATE,#03d              ; test for legal number
        jp      z,start                 ; if not the reset
        cp      STATE,#00d              ; test for autorev
        jp      z,auto_rev              ; auto reversing        0
        cp      STATE,#01d              ; test for up
        jp      z,up_direction          ; door is going up      1
        cp      STATE,#02d              ; test for autorev
        jp      z,up_position           ; door is up            2
        cp      STATE,#04d              ; test for autorev
        jp      z,dn_direction          ; door is going down    4
        jp      dn_position             ; door is down          5
;-----------------------------------------------------------------
; AUX OBSTRUCTION OUTPUT AND LIGHT FUNCTION
```

5,780,987

85 86

```
;-----------------------------------------------------------------
AUXLIGHT:
test_light_on:
        cp      LIGHT_FLAG,#LIGHT               ;
        jr      z,dec_pre_light                 ;
        cp      LIGHT1S,#00                     ; test for no flash
        jr      z,NO1S                          ; if not skip
        cp      LIGHT1S,#01d                    ; test for timeout
        jr      nz,NO1S                         ; if not skip
        xor     p0,#WORKLIGHT                   ; toggle light
        clr     LIGHT1S                         ; oneshoted
NO1S:
        cp      FLASH_FLAG,#FLASH               ;
        jr      nz,dec_pre_light                ;
        decw    FLASH_DELAY                     ; 250 ms period
        jr      nz,dec_pre_light                ;
        xor     p0,#WORKLIGHT                   ; toggle light
        ld      FLASH_DELAY_HI,#FLASH_HI
        ld      FLASH_DELAY_LO,#FLASH_LO
        dec     FLASH_COUNTER                   ;
        jr      nz,dec_pre_light                ;
        clr     FLASH_FLAG                      ;
dec_pre_light:
        cp      LIGHT_TIMER_HI,#0FFH            ; test for the timer ignore
        jr      z,exit_light                    ; if set then ignore
        dec     PRE_LIGHT                       ; dec 3 byte light timer
        jr      nz,exit_light                   ;
        decw    LIGHT_TIMER                     ;
        jr      nz,exit_light                   ; if timer 0 turn off the light
        and     p0,#^C LIGHT_ON                 ; turn off the light
exit_light:
        ret                                     ; return
;-----------------------------------------------------------------
;       AUTO_REV ROUTINE
;-----------------------------------------------------------------

auto_rev:
        cp      FAREVFLAG,#088H                 ; test for the forced up flag
        jr      nz,LEAVEREV
        and     p0,#^LB ^C WORKLIGHT            ; turn off light
        clr     FAREVFLAG                       ; one shot temp test
;
LEAVEREV:
        WDT                                     ; kick the dog
        call    HOLDFREV                        ; hold off the force reverse
        ld      LIGHT_FLAG,#LIGHT               ; force the light on no blink
        and     p0,#^LB ^C MOTOR_UP ^& #^C MOTOR_DN   ; disable motor
        di
        decw    AUTO_DELAY                      ; wait for .5 second
        decw    BAUTO_DELAY                     ; wait for .5 second
        ei
        jr      nz,arswitch                     ; test switches

        or      p0,#00001000b                   ; set aux output for FEMA
```

5,780,987

87 88

```
            tm      p2 #UP_LIMIT            ; test the limit
            jr      nz,NOUPLIM              ; if limit set stop
            LD      REASON,#60H             ; set the reason as early limit
            jp      SET_STOP_STATE          ; set stop
NOUPLIM
            ld      REASON,#40H             ; set the reason for the change
            jp      SET_UP_DIR_STATE        ; set the state
arswitch
            ld      REASON,#00H             ; set the reason to command
            cp      SW_DATA,#CMD_SW         ; test for a command
            jp      z,SET_STOP_STATE        ; if so then stop
            ld      REASON,#10H             ; set the reason as radio command
            cp      RADIO_CMD,#0AAH         ; test for a radio command
            jp      z,SET_STOP_STATE        ; if so the stop
exit_auto_rev
            ret                             ; return

HOLDFREV
            ld      RPMONES,#244d           ; set the hold off
            ld      RPMCLEAR,#122d          ; clear rpm reverse .5 sec
            di
            clr     RPM_COUNT               ; start with a count of 0
            clr     BRPM_COUNT              ; start with a count of 0
            ei
            ret

;------------------------------------------------------------------------
            DOOR GOING UP
;------------------------------------------------------------------------

up_direction
            WDT                             ; kick the dog
            call    HOLDFREV                ; hold off the force reverse
            ld      LIGHT_FLAG,#LIGHT       ; force the light on no blink
            and     p0,#^LB ^C MOTOR_DN     ; disable down relay

            cp      MOTDEL,#0FFH            ; test for done
            jr      z,UPON                  ; if done skip delay
            inc     MOTDEL                  ; increase the delay timer
            or      p0,#LIGHT_ON            ; turn on the light
            cp      MOTDEL,#20d             ; test for 40 seconds
            jr      ule,UPOFF               ; if not timed
UPON
            or      p0,#MOTOR_UP ^| #LIGHT_ON  ; turn on the motor and light
UPOFF
            cp      FORCE_IGNORE,#01        ; test fro the end of the force ignore
            jr      nz,SKIPUPRPM            ; if not donot test rpmcount
            cp      RPM_ACOUNT,#02H         ; test for less the 2 pulses
            jr      ugt,SKIPUPRPM           ;
            ld      FAULTCODE,#05h
SKIPUPRPM:
            cp      FORCE_IGNORE,#00        ; test timer for done
            jr      nz,test_up_sw_pre       ; if timer not up do not test force
```

5,780,987

89 90

```
TEST_UP_FORCE
            di
            dec     RPM_TIME_OUT                ; decrease the timeout
            dec     BRPM_TIME_OUT               ; decrease the timeout
            ei
            jr      z,failed_up_rpm
            di                                  ; turn off the interrupt
            ld      RPM_SET_DIFF_LO,UP_FORCE_LO
            ld      RPM_SET_DIFF_HI,UP_FORCE_HI
            sub     RPM_SET_DIFF_LO,RPM_PERIOD_LO
            sbc     RPM_SET_DIFF_HI,RPM_PERIOD_HI
            tm      RPM_SET_DIFF_HI,#10000000B      ; test high bit for sign
            jr      z,test_up_sw                ; if the rpm period is ok then switch
failed_up_rpm
            ld      REASON,#20H                 ; set the reason as force
            jp      SET_STOP_STATE
test_up_sw_pre
            tm      FORCE_PRE,#00000001B        ; test for odd /2
            jr      nz,test_up_sw               ; if odd skip
            di
            dec     FORCE_IGNORE
            dec     BFORCE_IGNORE
test_up_sw
            ei                                  ; enable interrupt
            tm      p2,#UP_LIMIT                ; have we reached the limit?
            jr      z,up_limit_dec              ;
            ld      limit,#LIMIT_COUNT          ;
            jr      get_sw                      ;
up_limit_dec
            djnz    limit,get_sw                ; dec debounce count
            ld      REASON,#50H                 ; set the reason as limit
            jp      SET_UP_POS_STATE            ;
get_sw
            ld      REASON,#10H                 ; set the radio command reason
            cp      RADIO_CMD,#0AAH             ; test for a radio command
            jp      z,SET_STOP_STATE            ; if so stop
            ld      REASON,#00H                 ; set the reason as a command
            cp      SW_DATA,#CMD_SW             ; test for a command condition
            jr      ne,test_up_time             ;
            jp      SET_STOP_STATE              ;
test_up_time:
            ld      REASON,#70H                 ; set the reason as a time out
            decw    MOTOR_TIMER                 ; decrement motor timer
            jp      z,SET_STOP_STATE            ;
exit_up_dir
            ret                                 ; return to caller
;-----------------------------------------------------------------
;           DOOR UP
;-----------------------------------------------------------------

up_position:
            WDT                                 ; kick the dog
            cp      FAREVFLAG,#088H             ; test for the forced up flag
            jr      nz,LEAVELIGHT
            and     p0,#^LB ^C WORKLIGHT        ; turn off light
            jr      UPNOFLASH                   ; skip clearing the flash flag
```

5,780,987

91 92

```
LEAVELIGHT:
            ld      LIGHT_FLAG,#00H             ; allow blink
UPNOFLASH:
            ld      limit,#LIMIT_COUNT          ;
            and     p0,#^LB ^C MOTOR_UP ^& #^C MOTOR_DN   ; disable motor
            cp      SW_DATA,#LIGHT_SW           ; light sw debounced?
            jr      z,work_up                   ;
            ld      REASON,#10H                 ; set the reason as  a radio command
            cp      RADIO_CMD,#0AAH             ; test for a radio cmd
            jr      z,SETDNDIRSTATE             ; if so start down
            ld      REASON,#00H                 ; set the reason as a command
            cp      SW_DATA,#CMD_SW             ; command sw debounced?
            jr      z,SETDNDIRSTATE             ; if command
            ret
SETDNDIRSTATE:
            ld      ONEP2,#10D                  ; set the 1.2 sec timer
            jp      SET_DN_DIR_STATE

work_up:
            xor     p0,#WORKLIGHT               ; toggle work light
            ld      LIGHT_TIMER_HI,#0FFH        ; set the timer ignore
up_pos_ret:
            ret                                 ; return
;-----------------------------------------------------------------
;           DOOR GOING DOWN
;-----------------------------------------------------------------

dn_direction:
            WDT                                 ; kick the dog
            call    HOLDFREV                    ; hold off the force reverse
            clr     FLASH_FLAG                  ; turn off the flash
            ld      LIGHT_FLAG,#LIGHT           ; force the light on no blink
            and     p0,#^LB ^C MOTOR_UP         ; turn off motor up
            cp      MOTDEL,#0FFH                ; test for done
            jr      z,DNON                      ; if done skip delay
            inc     MOTDEL                      ; increase the delay timer
            or      p0,#LIGHT_ON                ; turn on the light
            cp      MOTDEL,#20d                 ; test for 40 seconds
            jr      ule,DNOFF                   ; if not timed
DNON:

            or      p0,#MOTOR_DN ^| #LIGHT_ON   ; turn on the motor and light
DNOFF:
            cp      FORCE_IGNORE,#01            ; test fro the end of the force ignore
            jr      nz,SKIPDNRPM                ; if not donot test rpmcount
            cp      RPM_ACOUNT,#02H             ; test for less the 2 pulses
            jr      ugt,SKIPDNRPM               ;
            ld      FAULTCODE,#05h
SKIPDNRPM:
            cp      FORCE_IGNORE,#00            ; test timer for done
            jr      nz,test_dn_sw_pre           ; if timer not up do not test force
            cp      ForcedDown,#1h              ; test the flag to skip rpm if forcing down
            jr      z,test_dn_sw_pre

TEST_DOWN_FORCE:
            di
```

5,780,987

93 94

```
            dec     RPM_TIME_OUT                    ; decrease the timeout
            dec     BRPM_TIME_OUT                   ; decrease the timeout
            ei
            jr      z,failed_dn_rpm
            di                                      ; turn off the interrupt
            ld      RPM_SET_DIFF_LO,DN_FORCE_LO
            ld      RPM_SET_DIFF_HI,DN_FORCE_HI
            sub     RPM_SET_DIFF_LO,RPM_PERIOD_LO
            sbc     RPM_SET_DIFF_HI,RPM_PERIOD_HI
            tm      RPM_SET_DIFF_HI,#10000000B      ; test high bit for sign
            jr      z,test_dn_sw                    ; if the rpm period is ok then switch
failed_dn_rpm:
            ld      REASON,#20H                     ; set the reason as force
            jp      SET_AREV_STATE                  ; set the state
test_dn_sw_pre:
            tm      FORCE_PRE,#00000001B            ; test for odd /2
            jr      nz,test_dn_sw                   ; if odd skip
            di
            dec     FORCE_IGNORE
            dec     BFORCE_IGNORE
test_dn_sw:
            ei                                      ; turn on the interrupt
            tm      p2,#DN_LIMIT                    ; are we at down limit?
            jr      z,dn_limit_dec                  ;
            ld      limit,#LIMIT_COUNT              ; reset the limit
            jr      call_sw_dn                      ;
dn_limit_dec:
            djnz    limit,call_sw_dn                ; dec debounce counter
            ld      REASON,#50H                     ; set the reason as a limit
            cp      CMD_DEB,#0FFH                   ; test for the switch still held
            jr      nz,TESTRADIO                    ;
            ld      REASON,#90H                     ; closed with the control held
            jr      TESTFORCEIG
TESTRADIO:
            cp      LAST_CMD,#00                    ; test for the last command being radio
            jr      nz,TESTFORCEIG                  ; if not test force
            cp      BCODEFLAG,#077H                 ; test for the b code flag
            jr      nz,TESTFORCEIG                  ;
            ld      REASON,#0A0H                    ; set the reason as b code to limit
TESTFORCEIG:
            cp      ForcedDown,#00                  ; test for force down action
            jr      nz,NOAREVDN                     ; if set skip early limits
            cp      FORCE_IGNORE,#00H               ; test the force ignore for done
            jr      z,NOAREVDN                      ; a rev if limit before force enabled
            ld      REASON,#60h                     ; early limit
            jp      SET_AREV_STATE                  ; set autoreverse
NOAREVDN:
            and     p0,#^LB ^C MOTOR_DN             ;
            jp      SET_DN_POS_STATE                ; set the state
call_sw_dn:
            ld      REASON,#10H                     ; set the reason as radio command
            cp      RADIO_CMD,#0AAH                 ; test for a radio command
            jp      z,SET_AREV_STATE                ; if so arev
            ld      REASON,#00H                     ; set the reason as command
            cp      SW_DATA,#CMD_SW                 ; test for command
```

5,780,987

95 96

```
                jp      z,SET_AREV_STATE        ;
test_dn_time:
                ld      REASON,#70H             ; set the reason as timeout
                decw    MOTOR_TIMER             ; decrement motor timer
                jp      z,SET_AREV_STATE        ;
dec_obs_count:
                djnz    obs_count,exit_dn_dir   ; dec aux obs count
                cp      LAST_CMD,#00            ; test for the last command from radio
                jr      z,OBSTESTB              ; if last command was a radio test b
                cp      CMD_DEB,#0FFH           ; test for the command switch holding
                jr      nz,OBSAREV              ; if the command switch is not holding
                                                ; do the autorev
                ret                             ; otherwise skip
OBSAREV:
                ld      FLASH_FLAG,#0FFH        ; set flag
                ld      FLASH_COUNTER,#20       ; set for 10 flashes
                ld      FLASH_DELAY_HI,#FLASH_HI; set for .5 Hz period
                ld      FLASH_DELAY_LO,#FLASH_LO
                ld      REASON,#30H             ; set the reason as autoreverse
                jp      SET_AREV_STATE          ;
OBSTESTB:
                cp      BCODEFLAG,#077H         ; test for the b code flag
                jr      nz,OBSAREV              ; if not b code then arev
exit_dn_dir:
;               ld      REASON,#0B0H            ; set the reason as command not held
;               cp      FAREVFLAG,#088H         ; test forced up flag
;               jr      nz,exit_2_dn            ; if the forced up flag clear skip
;               cp      CMD_DEB,#0FFH           ; test for a held command
;               jr      z,exit_2_dn             ; if the command is held keep going
;               cp      LAST_CMD,#00            ; test for the last command being radio
;               jr      nz,do_reverse           ; if not do reverse
;               cp      BCODEFLAG,#077H         ; test for the b code flag
;               jr      z,exit_2_dn             ; if set skip till either is released
;do_reverse:
;               jp      SET_AREV_STATE          ; set the autoreverse state
;exit_2_dn:
                ret                             ; return

;-----------------------------------------------------------------
;               DOOR DOWN
;-----------------------------------------------------------------

dn_position:
                WDT                             ; kick the dog
;               cp      FAREVFLAG,#088H         ; test for the forced up flag
;               jr      nz,DNLEAVEL             ;
;               and     p0,#^LB ^C WORKLIGHT    ; turn off light
;               jr      DNNOFLASH               ; skip clearing the flash flag

                cp      ForcedDown,#01d         ; test for force in past
                jr      z,TestMotorRev          ; if so the test motor motion
                cp      MOTOR_TIMER,#00d        ; test for timed out
                jr      z,TestMotorRev          ; if timed out then test rev.
                decw    MOTOR_TIMER             ; decrement motor timer
                clr     RPM_ACOUNT              ; clear the rpm counter
```

```
            jr      SkipLock                    ; skip the lock till 27 sec timeout
TestMotorRev:
            tm      p2,#DN_LIMIT                ; is the down limit still set
            jr      z,SkipLock                  ; then skip the lock down
            cp      RPM_ACOUNT,#10d             ; test for 2 rev
            jr      ule,SkipLock                ; if less skip the lock down
            ld      ForcedDown,#1h              ; set the flag to skip early limits
            jp      SET_DN_DIR_STATE            ; force the door down to lim
SkipLock
DNLEAVEL:
            ld      LIGHT_FLAG,#00H             ; allow blink
DNNOFLASH:
            ld      limit,#LIMIT_COUNT          ;
            and     p0,#^LB ^C MOTOR_UP ^&-#^C MOTOR_DN   ; disable motor
            cp      SW_DATA,#LIGHT_SW           ; debounced? light
            jr      z,work_dn                   ;
            ld      REASON,#10H                 ; set the reason as a radio command
            cp      RADIO_CMD,#0AAH             ; test for a radio command
            jr      z,SETUPDIRSTATE             ; if so go up
            ld      REASON,#00H                 ; set the reason as a command
            cp      SW_DATA,#CMD_SW             ; command sw pressed?
            jr      z,SETUPDIRSTATE             ; if so go up
            ret

SETUPDIRSTATE:
            ld      ONEP2,#10D                  ; set the 1.2 sec timer
            jp      SET_UP_DIR_STATE

work_dn:
            xor     p0,#WORKLIGHT               ; toggle work light
            ld      LIGHT_TIMER_HI,#0FFH        ; set the timer ignore
dn_pos_ret:
            ret                                 ; return
;-----------------------------------------------------------------
;           STOP
;-----------------------------------------------------------------

stop:
            WDT                                 ; kick the dog
            cp      FAREVFLAG,#088H             ; test for the forced up flag
            jr      nz,LEAVESTOP
            and     p0,#^LB ^C WORKLIGHT        ; turn off light
LEAVESTOP:
            ld      LIGHT_FLAG,#00H             ; allow blink
            and     p0,#^LB ^C MOTOR_UP ^& #^C MOTOR_DN   ; disable motor
            cp      SW_DATA,#LIGHT_SW           ; debounced? light
            jr      z,work_stop                 ;
            ld      REASON,#10H                 ; set the reason as radio command
            cp      RADIO_CMD,#0AAH             ; test for a radio command
            jp      z,SET_DN_DIR_STATE          ; if so go down
            ld      REASON,#00H                 ; set the reason as a command
            cp      SW_DATA,#CMD_SW             ; command sw pressed?
            jp      z,SET_DN_DIR_STATE          ; if so go down
            ret
work_stop:
            xor     p0,#WORKLIGHT               ; toggle work light
```

5,780,987

99 100

```
            ld      LIGHT_TIMER_HI,#0FFH        ; set the timer ignore
stop_ret:
            ret                                 ; return

;-----------------------------------------------------------------
;       SET THE AUTOREV STATE
;-----------------------------------------------------------------
SET_AREV_STATE:
            di                                  ;
            ld      STATE,#AUTO_REV             ; if we got here, then reverse motor
            jr      SET_ANY

;-----------------------------------------------------------------
;       SET THE STOPPED STATE
;-----------------------------------------------------------------
SET_STOP_STATE:
            di
            ld      STATE,#STOP                 ;
            jr      SET_ANY

;-----------------------------------------------------------------
;       SET THE DOWN DIRECTION STATE
;-----------------------------------------------------------------
SET_DN_DIR_STATE:
            di
            ld      STATE,#DN_DIRECTION         ; energize door
            clr     FAREVFLAG                   ; one shot the forced reverse
            tm      p2,#DN_LIMIT                ; are we at down limit?
            jr      nz,SET_ANY                  ; if not at limit set dn
                                                ; else set the dn position
;-----------------------------------------------------------------
;       SET THE DOWN POSITION STATE
;-----------------------------------------------------------------
SET_DN_POS_STATE:
            di
            ld      STATE,#DN_POSITION          ; load new state
            jr      SET_ANY

;-----------------------------------------------------------------
;       SET THE UP DIRECTION STATE
;-----------------------------------------------------------------
SET_UP_DIR_STATE:
            di
            clr     ForcedDown                  ; clear the flag for skiping early limit
            ld      STATE,#UP_DIRECTION         ;
            tm      p2,#UP_LIMIT                ; have we reached the limit?
            jr      nz,SET_ANY                  ; if not set the state
                                                ; else fall throught and set pos state
;-----------------------------------------------------------------
;       SET THE UP POSITION STATE
;-----------------------------------------------------------------
SET_UP_POS_STATE:
            di
            ld      STATE,#UP_POSITION          ;

;-----------------------------------------------------------------
```

```
;       SET ANY STATE
;-----------------------------------------------------------
SET_ANY:
        ld      BSTATE,STATE                    ; set the backup state
        di
        clr     RPM_COUNT                       ; clear the rpm counter
        clr     BRPM_COUNT                      ;
        ld      AUTO_DELAY_HI,#AUTO_HI          ; set the .5 second auto rev timer
        ld      AUTO_DELAY_LO,#AUTO_LO          ;
        ld      BAUTO_DELAY_HI,#AUTO_HI         ; set the .5 second auto rev timer
        ld      BAUTO_DELAY_LO,#AUTO_LO         ;
        ld      FORCE_IGNORE,#ONE_SEC           ; set the force ignore timer to one sec
        ld      BFORCE_IGNORE,#ONE_SEC          ; set the force ignore timer to one sec
        ei
        clr     RADIO_CMD                       ; one shot
        clr     RPM_ACOUNT                      ; clear the rpm active counter
        ld      LIMIT,#LIMIT_COUNT              ;
        ld      MOTOR_TIMER_HI,#MOTOR_HI        ;
        ld      MOTOR_TIMER_LO,#MOTOR_LO        ;
        ld      STACKREASON,REASON              ; save the temp reason
        ld      STACKFLAG,#0FFH                 ; set the flag
TURN_ON_LIGHT:
        ld      LIGHT_TIMER_HI,#SET_TIME_HI     ; set the light period
        ld      LIGHT_TIMER_LO,#SET_TIME_LO     ;
        ld      PRE_LIGHT,#SET_TIME_PRE         ;
        ld      LIGHTS,P0                       ; read the light state
        and     LIGHTS,#WORKLIGHT               ;
        jr      nz,lighton                      ; if the light is on skip clearing
lightoff:
        clr     MOTDEL                          ; clear the motor delay
lighton:
        ret

;-----------------------------------------------------------
;       THIS THE AUXILARY OBSTRUCTION INTERRUPT ROUTINE
;-----------------------------------------------------------

AUX_OBS:
        ld      OBS_COUNT,#6D                   ; reset pulse counter (no obstruction)
        and     imr,#11110111b                  ; turn off the interupt for up to 500uS
        ld      AOBSTEST,#11D                   ; reset the test timer
        or      AOBSF,#00000010B                ; set the flag for got a aobs
        iret                                    ; return from int .

;-----------------------------------------------------------
;       THIS IS THE MOTOR RPM INTERRUPT ROUTINE
;-----------------------------------------------------------
RPM:
        push    rp                              ; save current pointer
        srp     #RPM_GROUP                      ;point to these reg
        ld      rpm_temp_hi,T0EXT               ; read the timer extension
        ld      rpm_temp_lo,T0                  ; read the timer
        tm      IRQ,#00010000B                  ; test for a pending interrupt
        jr      z,RPMTIMEOK                     ; if not then time ok
RPMTIMEERROR:
```

5,780,987

103 104

```
            tm      rpm_temp_lo,#10000000B      ; test for timer reload
            jr      z,RPMTIMEOK                 ; if no reload time is ok
            dec     rpm_temp_hi                 ; if reloaded then dec the hi to resync
RPMTIMEOK:
            and     imr,#11111011b              ; turn off the interupt for up to 500uS

            ld      rpm_2past_hi,rpm_past_hi    ; save the past for testing
            ld      rpm_2past_lo,rpm_past_lo    ;
            ld      rpm_past_hi,rpm_temp_hi     ; transfer the present into the past
            ld      rpm_past_lo,rpm_temp_lo     ;
            ld      rpm_diff_hi,rpm_2past_hi    ; transfer the past into the difference
            ld      rpm_diff_lo,rpm_2past_lo    ;
            sub     rpm_diff_lo,rpm_past_lo     ; find the difference
            sbc     rpm_diff_hi,rpm_past_hi     ;
            tm      rpm_diff_hi,#10000000b      ; test for neg number
            jr      z,RPM_TIME_FOUND            ; if the time is correct then jump
            ld      rpm_diff_hi,rpm_past_hi     ; transfer the temp into the difference
            ld      rpm_diff_lo,rpm_past_lo     ;
            sub     rpm_diff_lo,rpm_2past_lo    ; find the difference
            sbc     rpm_diff_hi,rpm_2past_hi    ;
RPM_TIME_FOUND:
            ld      rpm_period_hi,rpm_diff_hi   ; transfer the difference to the period
            ld      rpm_period_lo,rpm_diff_lo   ;
            ei
            di
            cp      rpm_period_hi,#12D          ; test for a period of at least 6.144mS
            jr      ult,SKIPC                   ; if the period is less then skip counting
            cp      STATE,#05h                  ; test for the down limit state
            jr      z,CLRC                      ; if set clear the counter
TULS:
            cp      STATE,#02H                  ; test for the up limit state
            jr      nz,INCRPM                   ; if not then increment the rpm state
            tm      P2,#UP_LIMIT                ; test for the up limit still set
            jr      nz,INCRPM                   ; if not then set
CLRC:
            clr     RPM_COUNT                   ; clear the rpm counter
            clr     BRPM_COUNT                  ;
            ei
            jr      SKIPC                       ;
INCRPM:
            inc     RPM_COUNT                   ; increase the rpm count
            inc     BRPM_COUNT                  ; increase the rpm count
            inc     RPM_ACOUNT                  ; increase the rpm count
SKIPC:
            inc     RPM_ACOUNT                  ; increase the rpm count
            di
            ld      rpm_time_out,#15D           ; set the rpm max period as 30mS
            ld      BRPM_TIME_OUT,#15D          ; set the rpm max period as 30mS
                                                ; if rpm not updated by then reverse
            ei
SKIPPEDGE:
            pop     rp                          ; return the rp
            iret                                ; return
```

5,780,987

105 106

```
;.....................................................
;          THIS IS THE SWITCH TEST SUBROUTINE
;
;     STATUS
;     0 => COMMAND TEST
;     1 => WORKLIGHT TEST
;     2 => VACATION TEST
;     3 => CHARGE
;
;     SWITCH DATA
;     0 => OPEN
;     1 => COMMAND        CMD_SW
;     2 => WORKLIGHT      LIGHT_SW
;     4 => VACATION       VAC_SW
;.....................................................

switches:
        call    RS232
        ei
        clr     SW_DATA                 ; set the default to open "idle"
        cp      STATUS,#03d             ; test for illegal number
        jp      ugt,start               ; if so reset
        jp      z,charge                ; if it is 3 then goto charge
        cp      STATUS,#02d             ; test for vacation
        jp      z,VACATION_TEST         ; if so then jump
        cp      STATUS,#01d             ; test for worklight
        jp      z,WORKLIGHT_TEST        ; if so then jump
COMMAND_TEST:                           ; else it id command
        cp      VACFLAG,#00H            ; test for vacation mode
        jr      z,COMMAND_TEST1         ; if not vacation skip flash

        inc     VACFLASH                ; increase the vacation flash timer
        cp      VACFLASH,#10            ; test the vacation flash period
        jr      ult,COMMAND_TEST1       ; if lower period skip flash
        and     p3,#CCHARGE_SW          ; turn off wall switch
        or      p3,#DIS_SW              ; enable discharge
        cp      VACFLASH,#60d           ; test the time delay for max
        jr      nz,NOTFLASHED           ; if the flash is not done jump and ret
        clr     VACFLASH                ; restart the timer
NOTFLASHED:
        ret                             ; return


COMMAND_TEST1:
        tm      p0,#SWITCHES            ; command sw pressed?
        jr      nz,CMDOPEN              ; open command
        tm      P0,#10000000B           ; test the second command input
        jr      nz,CMDOPEN
CMDCLOSED:                              ; closed command
        call    DECVAC                  ; decrease vacation debounce
        call    DECLIGHT                ; decrease light debounce
        cp      CMD_DEB,#0FFH           ; test for the max number
```

```
            jr      z,SKIPCMDINC            ; if at the max skip inc
            di
            inc     CMD_DEB                 ; increase the debouncer
            inc     BCMD_DEB                ; increase the debouncer
            ei
SKIPCMDINC:
            cp      CMD_DEB,#CMD_MAKE       ;
            jr      nz,CMDEXIT              ; if not made then exit
GOT_A_CMD:
            di
            ld      LAST_CMD,#055H          ; set the last command as command
cmd         ld      SW_DATA,#CMD_SW         ; set the switch data as command
            cp      AUXLEARNSW,#100d        ; test the time
            jr      ugt,SKIP_LEARN
            push    RP
            srp     #LEARNEE_GRP
            call    SETLEARN                ; set the learn mode
            clr     SW_DATA                 ; clear the cmd
            pop     RP
            or      p0,#LIGHT_ON            ; turn on the light
            call    TURN_ON_LIGHT           ; turn on the light
SKIP_LEARN:
            ld      CMD_DEB,#0FFH           ; set the debouncer to ff one shot
            ld      BCMD_DEB,#0FFH          ; set the debouncer to ff one shot
CMDEXIT:
            ei
            or      p3,#CHARGE_SW           ; turn on the charge system
            and     p3,#CDIS_SW             ;
            ld      SWITCH_DELAY,#CMD_DEL_EX        ; set the delay time to 8mS
            ld      STATUS,#CHARGE          ; charge time
CMDDELEXIT:
            ret                             ;

CMDOPEN:                                    ; command switch open
            and     p3,#^LB ^C CHARGE_SW    ; turn off charging sw
            or      p3,#DIS_SW              ; enable discharge
            ld      DELAYC,#16d             ; set the time delay
DELLOOP:
            dec     DELAYC
            jr      nz,DELLOOP              ; loop till delay is up
            tm      p0,#SWITCHES            ; command line still high
            jr      nz,TESTWL               ; if so return later
            call    DECVAC                  ; if not open line dec all debouncers
            call    DECLIGHT                ;
            call    DECCMD                  ; •
            ld      AUXLEARNSW,#0FFH        ; turn off the aux learn switch
            jr      CMDEXIT                 ; and exit

TESTWL:
            ld      STATUS,#WL_TEST         ; set to test for a worklight
            ret                             ; return

WORKLIGHT_TEST:
            tm      p0,#SWITCHES            ; command line still high
```

5,780,987

109 110

```
            jr      nz,TESTVAC2                 ; exit setting to test for vacation
            call    DECVAC                      ; decrease the vacation debouncer
            call    DECCMD                      ; and the command debouncer
            cp      LIGHT_DEB,#0FFH             ; test for the max
            jr      z,SKIPLIGHTINC              ; if at the max skip inc
            inc     LIGHT_DEB                   ; inc debouncer
SKIPLIGHTINC:
            cp      LIGHT_DEB,#LIGHT_MAKE       ; test for the light make
            jr      nz,CMDEXIT                  ; if [illegible] then recharge delay
GOT_A_LIGHT:
            ld      LIGHT_DEB,#0FFH             ; set the debouncer to max
            ld      SW_DATA,#LIGHT_SW           ; set the data as worklight
            cp      RRTO,#101d                  ; test for code reception
            jr      ugt,CMDEXIT                 ; if not then skip the seting of flag
            clr     AUXLEARNSW                  ; start the learn timer
            jr      CMDEXIT                     ; then recharge
TESTVAC2:
            ld      STATUS,#VAC_TEST            ; set the next test as vacation
            ld      switch_delay,#VAC_DEL       ; set the delay
LIGHTDELEXIT:
            ret                                 ; return
VACATION_TEST:
            djnz    switch_delay,VACDELEXIT     ;
            tm      p0,#SWITCHES                ; command line still high
            jr      nz,EXIT_ERROR               ; exit with a error setting open state
            call    DECLIGHT                    ; decrease the light debouncer
            call    DECCMD                      ; decrease the command debouncer
            cp      VAC_DEB,#0FFH               ; test for the max
            jr      z,VACINCSKIP                ; skip the incrementing
            inc     VAC_DEB                     ; inc vacation debouncer
VACINCSKIP:
            cp      VACFLAG,#00H                ; test for vacation mode
            jr      z,VACOUT                    ; if not vacation use out time
VACIN:
            cp      VAC_DEB,#VAC_MAKE_IN        ; test for the vacation make point
            jr      nz,VACATION_EXIT            ; exit if not made
            jr      GOT_A_VAC                   ;
VACOUT:
            cp      VAC_DEB,#VAC_MAKE_OUT       ; test for the vacation make point
            jr      nz,VACATION_EXIT            ; exit if not made
GOT_A_VAC:
            ld      VACCHANGE,#0AAH             ; set the toggle data
            ld      VAC_DEB,#0FFH               ; set vacation debouncer to max
VACATION_EXIT:
            ld      SWITCH_DELAY,#VAC_DEL_EX    ; set the delay
            ld      STATUS,#CHARGE              ; set the next test as charge
VACDELEXIT:
            ret
EXIT_ERROR:
            call    DECCMD                      ; decrement the debouncers
            call    DECVAC                      ;
```

5,780,987

111 112

```
            call    DECLIGHT
            ld      SWITCH_DELAY,#VAC_DEL_EX ; set the delay
            ld      STATUS,#CHARGE           ; set the next test as charge
            ret

charge:
            or      p3,#CHARGE_SW            ;
            and     p3,#CDIS_SW              ;
            dec     SWITCH_DELAY             ;
            jr      nz,charge_ret            ;
            ld      STATUS,#CMD_TEST         ;
charge_ret
            ret

DECCMD:
            cp      CMD_DEB,#00H             ; test for the min number
            jr      z,SKIPCMDDEC             ; if at the min skip dec
            di
            dec     CMD_DEB                  ; decrement debouncer
            dec     BCMD_DEB                 ; decrement debouncer
            ei
SKIPCMDDEC:
            cp      CMD_DEB,#CMD_BREAK       ; if not at break then exit
            jr      nz,DECCMDEXIT            ; if not break then exit
            di
            clr     CMD_DEB                  ; reset the debouncer
            clr     BCMD_DEB                 ; reset the debouncer
            ei
DECCMDEXIT:
            ret                              ; and exit

DECLIGHT:
            cp      LIGHT_DEB,#00H           ; test for the min number
            jr      z,SKIPLIGHTDEC           ; if at the min skip dec
            dec     LIGHT_DEB                ; decrement debouncer
SKIPLIGHTDEC:
            cp      LIGHT_DEB,#LIGHT_BREAK   ; if not at break then exit
            jr      nz,DECLIGHTEXIT          ; if not break then exit
            clr     LIGHT_DEB                ; reset the debouncer
DECLIGHTEXIT:
            ret                              ; and exit

DECVAC:
            cp      VAC_DEB,#00H             ; test for the min number
            jr      z,SKIPVACDEC             ; if at the min skip dec
            dec     VAC_DEB                  ; decrement debouncer
SKIPVACDEC:
            cp      VACFLAG,#00H             ; test for vacation mode
            jr      z,DECVACOUT              ; if not vacation use out time
DECVACIN:
            cp      VAC_DEB,#VAC_BREAK_IN    ; test for the vacation break point
```

```
            jr      nz DECVACEXIT               ; exit if not
            jr      CLEARVACDEB                 ;

DECVACOUT:
            cp      VAC_DEB,#VAC_BREAK_OUT      ; test for the vacation break point
            jr      nz,DECVACEXIT               ; exit if not
CLEARVACDEB:
            clr     VAC_DEB                     ; reset the debouncer
DECVACEXIT:
            ret                                 ; and exit


;-----------------------------------------------------------------
;           THIS ROUTINE GENERATES THE RAMP FOR THE COMPARATORS
;-----------------------------------------------------------------

PWM:
            push    rp                          ; save current pointer
            srp     #PWM_GROUP                  ;
            and     p3,#^C PWM_HI               ; take pwm output low
            tm      p0,#DOWN_COMP               ; was it down force?
            jr      nz test_up                  ; no, test up force
            ld      dn_temp,pulsewidth          ; save setting
test_up:
            tm      p0,#UP_COMP                 ; up force trip?
            jr      nz,update_pwm               ; should be high
            ld      up_temp,pulsewidth          ; save setting
update_pwm:
            add     pulsewidth,#4               ; increase pulsewidth
            djnz    pwm_count,pwm_exit          ;

GOT_FORCE_ADDRESS:
            ei                                  ; turn on stacked interrupts
            rcf                                 ;
            rrc     dn_temp                     ; /2
            rcf                                 ;
            rrc     dn_temp                     ; /2
            rcf                                 ;
            rrc     up_temp                     ; /2
            rcf                                 ;
            rrc     up_temp                     ; /2
            ld      DNFORCE,dn_temp             ; save the values
            ld      UPFORCE,up_temp

            cp      dn_temp,#064d               ; test the last address
            jr      ult,DN_ADDRESS_OK           ; if in the range ok
            ld      dn_temp,#064d               ; if out of the range set to the top
DN_ADDRESS_OK:

            ld      force_add_hi,dn_temp        ; REVERSE THE ROTATION
            ld      dn_temp,#64d                ;
            sub     dn_temp,force_add_hi

            ld      force_add_hi,#^hb force_table_60
            ld      force_add_lo,#^lb force_table_60
```

5,780,987

115 116

```
        tm      p2,#00100000b           ; test the 50/60 bit
        jr      nz,DN60
        ld      force_add_hi,#^hb force_table_50
        ld      force_add_lo,#^lb force_table_50
DN60:
        add     force_add_lo,dn_temp    ; calculate the address add 2X temp
        adc     force_add_hi,#00h       ;
        add     force_add_lo,dn_temp    ; calculate the address add 2X temp
        adc     force_add_hi,#00h       ;

        di
        ldc     dn_force_hi,@force_add  ; get hi byte
        incw    force_add               ; get low byte
        ldc     dn_force_lo,@force_add  ;
        ei

        cp      up_temp,#064d           ; test the last address
        jr      ult,UP_ADDRESS_OK       ; if in the range ok
        ld      up_temp,#064d           ; if out of the range set to the top
UP_ADDRESS_OK:

        ld      force_add_hi,up_temp    ; REVERSE THE ROTATION
        ld      up_temp,#64d            ;
        sub     up_temp,force_add_hi

        ld      force_add_hi,#^hb force_table_60
        ld      force_add_lo,#^lb force_table_60
        tm      p2,#00100000b           ; test the 50/60 bit
        jr      nz,UP60
        ld      force_add_hi,#^hb force_table_50
        ld      force_add_lo,#^lb force_table_50
UP60:

        add     force_add_lo,up_temp    ; calculate the address add 2X temp
        adc     force_add_hi,#00h       ;
        add     force_add_lo,up_temp    ; calculate the address add 2X temp
        adc     force_add_hi,#00h       ;

        di
        ldc     up_force_hi,@force_add  ; get hi byte
        incw    force_add               ; get low byte
        ldc     up_force_lo,@force_add  ;
        ei

GOT_FORCE:

        ld      PWM_STATUS,#0FFH        ;
        ld      pwm_count,#TOTAL_PWM_COUNT   ; max count
        ld      pulsewidth,#MIN_COUNT   ; set initial pulsewidth
        ld      dn_temp,#MIN_COUNT      ; start initial pw
        ld      up_temp,#MIN_COUNT      ;
pwm_exit:
        ld      t1,pulsewidth           ; load timer with pulse
        pop     rp                      ; restore pointer
        iret                            ; return from int
```

5,780,987

117 118

```
;-----------------------------------------------------------
;66          FORCE TABLE
;-----------------------------------------------------------
force_table_60:
S_0:        .word       0DACH
S_1:        .word       0DACH
S_2:        .word       0DC5H
S_3:        .word       0DDEH
S_4:        .word       0DF7H
S_5:        .word       0E10H
S_6:        .word       0E29H
S_7:        .word       0E42H
S_8         .word       0E5BH
S_9:        .word       0E6DH
S_10:       .word       0E7FH
S_11        .word       0E91H
S_12:       .word       0E9BH
S_13:       .word       0EA5H
S_14:       .word       0EAFH
S_15:       .word       0EB9H
S_16:       .word       0EC3H
S_17:       .word       0ECDH
S_18:       .word       0ED7H
S_19        .word       0EE1H
S_20:       .word       0EEBH
S_21.       .word       0EF5H
S_22:       .word       0EFFH
S_23        .word       0F09H
S_24:       .word       0F13H
S_25:       .word       0F1DH
S_26:       .word       0F27H
S_27:       .word       0F31H
S_28:       .word       0F3BH
S_29:       .word       0F45H
S_30:       .word       0F4FH
S_31:       .word       0F59H
S_32:       .word       0F63H
S_33:       .word       0F6DH
S_34:       .word       0F86H
S_35:       .word       0F9FH
S_36:       .word       0FB8H
S_37:       .word       0FD0H
S_38:       .word       0FEAH
S_39:       .word       1003H
S_40:       .word       101CH
S_41:       .word       1035H
S_42:       .word       104EH
S_43:       .word       1067H
S_44:       .word       1099H
S_45:       .word       10CBH
S_46:       .word       10FDH
S_47:       .word       112FH
S_48:       .word       1161H
```

5,780,987

119 120

```
S_49:     .word     1193H
S_50:     .word     11C5H
S_51:     .word     1229H
S_52:     .word     125BH
S_53:     .word     12BFH
S_54:     .word     1323H
S_55:     .word     13C1H
S_56:     .word     14FCH
S_57:     .word     16D6H
S_58:     .word     194DH
S_59:     .word     1C62H
S_60:     .word     2014H
S_61:     .word     2465H
S_62:     .word     2954H
S_63:     .word     2EE0H
S_64:     .word     2EE0H

      FILL
      FILL
      FILL
      FILL
      FILL
      FILL
      FILL
      FILL
      FILL
      FILL
      FILL

.end
```

What is claimed is:

1. A barrier operator for opening and closing a movable barrier, comprising:

a barrier drive;

means for detecting motion of the movable barrier;

means for detecting when a barrier command signal has been given to the barrier drive;

means for storing a commanded state of the barrier drive;

means for comparing the commanded state with the motion indicated by said barrier motion detection means, and for indicating if the motion conflicts with the commanded state; and means for generating an alarm signal in response to the conflict indication of said comparing means.

2. A barrier operator for opening and closing a movable barrier according to claim 1, further comprising means for enabling the alarm signal generating means a preselected time interval following closure of the barrier.

3. A barrier operator for opening and closing a movable barrier according to claim 2, further comprising means for optically detecting the presence of an obstacle adjacent the barrier and producing an obstacle detection signal in response thereto, said obstacle detection means being inhibited in response to the means for enabling alarm signal generation.

4. A barrier operator for opening and closing a movable barrier according to claim 1, further comprising a barrier position detection switch for generating a barrier closure signal when the barrier is substantially closed and providing the barrier closure signal to the means for generating the alarm signal indicative of the fact that the barrier has been closed.

5. A barrier operator for opening and closing a movable barrier according to claim 1, further comprising means for causing the barrier drive to supply a closing force to the movable barrier in response to the alarm signal from the means for generating the alarm signal.

6. A barrier operator for opening and closing a movable barrier according to claim 5, further comprising means for the barrier drive to cease supplying a closing force after a predetermined time interval.

7. A barrier operator for controlling a movable barrier, comprising, a down limit detector disposed to indicate whether said barrier is at a closed position or not;

memory means for storing one of a set of states of said barrier, the set of states including a CLOSED state indicating said barrier is closed;

alarm generation means, responsive to the barrier state stored by said memory means and said down limit detector, for generating an alarm signal when the stored barrier state is CLOSED and said down limit detector indicates said barrier is not at a closed position; and alarm enabling means for enabling said alarm generation means a preselected time interval after said barrier is closed.

8. A barrier operator according to claim 7, wherein said alarm enabling means is responsive to an indication from said down limit detector that said barrier is closed for initiating the preselected time interval.

9. A barrier operator according to claim 7, further comprising:

down motor signal means, for providing a down motor signal in response to said alarm signal; and a barrier drive responsive to said down motor signal for closing said barrier.

10. A barrier operator according to claim 9, further comprising:

obstacle detector for detecting an obstacle to movement of said barrier, and for generating an obstacle signal in response thereto; and means for disabling said barrier drive in response to the obstacle signal.

11. A barrier operator according to claim 10, wherein said obstacle detector comprises:

an optical light emitter for emitting light; and an optical light detector for receiving the light from said emitter, and generating a signal indicative of whether light is received from said emitter or not.

12. A barrier operator according to claim 9, wherein said alarm enabling means is disposed to continuously enable without a preselected time delay said alarm generation means after said alarm generation means has generated an alarm signal, and after said barrier drive has closed said barrier in response to said alarm signal.

13. A barrier operator according to claim 9, further comprising:

a barrier drive motion detector for detecting actual motion of said barrier drive and generating a motion signal indicative thereof; wherein said alarm generation means receives the motion signal and generates the alarm signal when the stored barrier state is CLOSED, said down limit detector indicates said barrier is not at a closed position, and said motion detector indicates motion of said barrier drive.

14. A barrier operator according to claim 9, further comprising:

a command signal receiver for receiving a signal commanding said barrier to open, and generating an indication thereof; and means for providing an up motor signal in response to the receiver indication; wherein said barrier drive responds to the up motor signal by opening said barrier; and said memory means stores a state selected from the set of barrier states, other than the CLOSED state, in response to the receiver indication.

15. A garage door operator for opening and dosing a garage door, comprising:

a motor for moving the garage door;

a down limit detector, for indicating when the garage door is moved to a closed position by said motor;

timer means enabled by the indication from said down limit detector that the garage door is closed, disposed to indicate when a preselected interval has expired;

command signal means for receiving a commanded state of the garage door; and a microprocessor responsive to said command signal means for causing said motor to move the garage door to the commanded state, disposed to cause the motor to close the garage door when said timer means indicates the preselected interval has expired, said down limit detector indicates the garage door is not closed, and said command signal means has not received a new commanded state.

16. A garage door operator according to claim 15, further comprising:

a tachometer for detecting rotation of said motor, and for providing an indication thereof to said microprocessor, wherein said microprocessor is disposed to cause said motor to close the garage door when said timer means indicates the preselected interval has expired, said tachometer indicates said motor has rotated beyond a preselected threshold, and said command signal means has not received a new commanded state.

17. A garage door operator according to claim 15, further comprising:

an optical obstacle detector, for optically detecting the presence of an obstacle adjacent the garage door and producing an obstacle detection signal in response thereto, wherein said microprocessor is responsive to the obstacle detection signal to cease causing said motor to close the garage door.

18. A garage door operator according to claim 15, wherein said command signal means comprises a radio frequency receiver.

*19. A barrier operator for opening and closing a movable barrier, comprising:*

*a barrier drive;*

*a motion detector for detecting motion of the movable barrier;*

*a command signal detector for detecting when a barrier command signal has been given to the barrier drive;*

*circuitry for storing a commanded state of the barrier drive;*

*a controller for comparing the commanded state with the motion indicated by said barrier motion detector, and for indicating if the motion conflicts with the commanded state; and*

*a signal generator for generating an alarm signal in response to the conflict indication of said controller.*

*20. A barrier operator for opening and closing a movable barrier according to claim 19, further comprising apparatus for enabling the alarm signal generator a preselected time interval following closure of the barrier.*

*21. A barrier operator for opening and closing a movable barrier according to claim 20, further comprising an obstacle detector for optically detecting the presence of an obstacle adjacent the barrier and producing an obstacle detection signal in response thereto, said obstacle detector being inhibited in response to the signal generator for enabling alarm signal generation.*

*22. A barrier operator for opening and closing a movable barrier according to claim 19, further comprising a barrier position detection switch for generating a barrier closure signal when the barrier is substantially closed and providing the barrier closure signal to the signal generator indicative of the fact that the barrier has been closed.*

*23. A barrier operator for opening and closing a movable barrier according to claim 19, further comprising apparatus for enabling the barrier drive to supply a closing force to the movable barrier in response to the alarm signal from the signal generator for generating the alarm signal.*

*24. A barrier operator for opening and closing a movable barrier according to claim 23, wherein the barrier drive ceases supplying a closing force after a predetermined time interval.*

*25. A barrier operator for controlling a movable barrier, comprising:*

*a down limit detector disposed to indicate whether said barrier is at a closed position or not;*

*memory for storing one of a set of states of said barrier, the set of states including a CLOSED state indicating said barrier is closed;*

*an alarm generator, responsive to the barrier state stored by said memory and said down limit detector, for generating an alarm signal when the stored barrier state is CLOSED and said down limit detector indicates said barrier is not at a closed position; and*

*an alarm enabler for enabling said alarm signal generator a preselected time interval after said barrier is closed.*

*26. A barrier operator according to claim 25, wherein said alarm enabler is responsive to an indication from said down limit detector that said barrier is closed for initiating the preselected time interval.*

*27. A barrier operator according to claim 25, further comprising:*

*down motor circuitry, for providing a down motor signal in response to said alarm signal; and*

*barrier drive responsive to said down motor signal for closing said barrier.*

*28. A barrier operator according to claim 27, further comprising:*

*obstacle detector for detecting an obstacle to movement of said barrier, and for generating an obstacle signal in response thereto; and for disabling said barrier drive in response to the obstacle signal.*

*29. A barrier operator according to claim 28, wherein said obstacle detector comprises:*

*an optical light emitter for emitting light; and*

*an optical light detector for receiving the light from said emitter, and generating a signal indicative of whether light is received from said emitter or not.*

*30. A barrier operator according to claim 27, wherein said alarm enabler is disposed to continuously enable without a preselected time delay said alarm generator after said alarm generator has generated an alarm signal, and after said barrier drive has closed said barrier in response to said alarm signal.*

*31. A barrier operator according to claim 27, further comprising:*

*a barrier drive motion detector for detecting actual motion of said barrier drive and generating a motion signal indicative thereof;*

*wherein said alarm generator receives the motion signal and generates the alarm signal when the stored barrier state is CLOSED, said down limit detector indicates said barrier is not at a closed position and said motion detector indicates motion of said barrier drive.*

*32. A barrier operator according to claim 27, further comprising:*

*a command signal receiver for receiving a signal commanding said barrier to open, and generating an indication thereof; and*

*circuitry for providing an up motor signal in response to the receiver indication: wherein*

*said barrier drive responds to the up motor signal by opening said barrier; and*

*said memory stores a state selected from the set of barrier states, other than the CLOSED state, in response to the receiver indication.*

*33. A garage door operator for opening and closing a garage door comprising:*

*a motor for moving the garage door;*

*a down limit detector, for indicating when the garage door is moved to a closed position by said motor;*

*a timer enabled by the indication from said down limit detector that the garage door is closed, disposed to indicate when a preselected interval has expired;*

*a command signal receiver for receiving a commanded state of the garage door; and*

*a microprocessor responsive to said command signal receiver for causing said motor to move the garage door to the commanded state, disposed to cause the motor to close the garage door when said timer indicates the preselected interval has expired, said down limit detector indicates the garage door is not closed, and said command signal receiver has not received a new commanded state.*

*34. A garage door operator according to claim 33, further comprising:*

*a tachometer for detecting rotation of said motor, and for providing an indication thereof to said microprocessor; wherein*

*said microprocessor is disposed to cause said motor to close the garage door when said timer indicates the preselected interval has expired, said tachometer indicates said motor has rotated beyond a preselected threshold, and said command signal receiver has not received a new commanded state.*

*35. A garage door operator according to claim 33, further comprising:*

*an optical obstacle detector, for optically detecting the presence of an obstacle adjacent the garage door and producing an obstacle detection signal in response thereto, wherein*

*said microprocessor is responsive to the obstacle detection signal to cease causing said motor to close the garage door.*

*36. A garage door operator according to claim 33, wherein said command signal receiver comprises a radio frequency receiver.*

*37. A barrier operator for opening and closing a barrier comprising:*

*a command signal receiver for receiving barrier open and barrier close signals directing the opening or closing respectively of the barrier;*

*a barrier drive responsive to barrier open and barrier close signals for opening and closing the barrier, respectively;*

*a closed limit detector for sensing the closed state of the barrier; and*

*a barrier controller responsive to received command signals and the closed limit detector for generating an alarm signal when the barrier has been in the closed position and an attempt is made to raise the door when no door open command has been received.*

*38. A barrier operator according to claim 37 comprising a timer enabled by the closed limit detector for indicating that a predetermined period of time has passed.*

*39. A barrier operator according to claim 37 wherein the barrier drive responds to the alarm signal by applying a closing force to the barrier.*

*40. A method of controlling a movable barrier for movement between an open position and a closed position comprising:*

*receiving barrier movement commands including barrier open commands directing opening movement of the barrier and barrier close commands directing a closing movement of the barrier;*

*moving the barrier to the closed position in response to a barrier close command;*

*sensing that the barrier has been moved to the closed position; and*

*generating an alarm signal when the sensing step indicates that the barrier has moved from the closed position, and the receiving step does not indicate that a barrier open command has been received.*

*41. The method of claim 40 comprising directing closing movement of the barrier in response to the alarm signal.*

* * * * *